US008383014B2

(12) United States Patent
Vanheusden et al.

(10) Patent No.: US 8,383,014 B2
(45) Date of Patent: Feb. 26, 2013

(54) METAL NANOPARTICLE COMPOSITIONS

(75) Inventors: Karel Vanheusden, Placitas, NM (US); Klaus Kunze, Albuquerque, NM (US); Hyungrak Kim, Albuquerque, NM (US); Aaron D. Stump, Albuquerque, NM (US); Allen B. Schult, Albuquerque, NM (US); Mark J. Hampden-Smith, Albuquerque, NM (US); Chuck Edwards, Rio Rancho, NM (US); Anthony R. James, Rio Rancho, NM (US); James Caruso, Albuquerque, NM (US); Toivo T. Kodas, Albuquerque, NM (US); Scott Thomas Haubrich, Albuquerque, NM (US); Mark H. Kowalski, Albuquerque, NM (US)

(73) Assignee: Cabot Corporation, Boston, MA (US)

( * ) Notice: Subject to any disclaimer, the term of this patent is extended or adjusted under 35 U.S.C. 154(b) by 16 days.

(21) Appl. No.: 12/816,210

(22) Filed: Jun. 15, 2010

(65) Prior Publication Data
US 2011/0303885 A1 Dec. 15, 2011

(51) Int. Cl.
*H01B 1/02* (2006.01)

(52) U.S. Cl. .................. 252/512; 252/514; 252/519.13; 252/519.33; 977/773; 977/777

(58) Field of Classification Search .................. 252/514, 252/512, 519.13, 519.33; 977/773, 777
See application file for complete search history.

(56) References Cited

U.S. PATENT DOCUMENTS

| | | |
|---|---|---|
| 2,785,964 A | 3/1957 | Pollock |
| 3,313,632 A | 4/1967 | Langley et al. |
| 3,401,020 A | 9/1968 | Kester et al. |
| 3,683,382 A | 8/1972 | Ballinger |
| 3,814,696 A | 6/1974 | Verdone et al. |
| 3,922,355 A | 11/1975 | Kotthoff |
| 3,922,388 A | 11/1975 | Schebalin |
| 3,957,694 A | 5/1976 | Bolon et al. |
| RE28,972 E | 9/1976 | Weber et al. |
| 4,019,188 A | 4/1977 | Hochberg et al. |
| 4,051,074 A | 9/1977 | Asada |
| 4,105,483 A | 8/1978 | Lin |
| 4,122,062 A | 10/1978 | Monte et al. |
| 4,130,671 A | 12/1978 | Nagesh et al. |
| 4,170,480 A | 10/1979 | Ikenoue et al. |
| 4,186,244 A | 1/1980 | Deffeyes et al. |
| 4,211,668 A | 7/1980 | Tate |
| 4,255,291 A | 3/1981 | Needes et al. |
| 4,266,229 A | 5/1981 | Mansukhani |
| 4,289,534 A | 9/1981 | Deffeyes et al. |
| 4,333,966 A | 6/1982 | Deffeyes et al. |
| 4,370,308 A | 1/1983 | Williams et al. |
| 4,381,945 A | 5/1983 | Nair |
| 4,388,346 A | 6/1983 | Bickler |
| 4,407,674 A | 10/1983 | Ehrreich |
| 4,416,932 A | 11/1983 | Nair |
| 4,418,099 A | 11/1983 | Cuevas et al. |
| 4,419,383 A | 12/1983 | Lee |
| 4,463,030 A | 7/1984 | Deffeyes et al. |
| 4,487,811 A | 12/1984 | Eichelberger et al. |
| 4,508,753 A | 4/1985 | Stepan |
| 4,517,252 A | 5/1985 | Hugh |
| 4,539,041 A | 9/1985 | Figlarz et al. |
| 4,548,879 A | 10/1985 | St. John et al. |
| 4,594,311 A | 6/1986 | Frisch et al. |
| 4,599,277 A | 7/1986 | Brownlow et al. |
| 4,622,069 A | 11/1986 | Akai et al. |
| 4,627,875 A | 12/1986 | Kobayashi et al. |
| 4,650,108 A | 3/1987 | Gallagher |
| 4,668,533 A | 5/1987 | Miller |
| 4,697,041 A | 9/1987 | Okaniwa et al. |
| 4,720,418 A | 1/1988 | Kuo |
| 4,746,838 A | 5/1988 | Kay |
| 4,753,821 A | 6/1988 | Giesecke et al. |
| 4,775,439 A | 10/1988 | Seeger, Jr. et al. |
| 4,808,274 A | 2/1989 | Nguyen |
| 4,857,241 A | 8/1989 | Straw et al. |
| 4,859,241 A | 8/1989 | Grundy |
| 4,877,451 A | 10/1989 | Winnik et al. |
| 4,877,647 A | 10/1989 | Klabunde |
| 4,879,104 A | 11/1989 | List et al. |
| 4,891,242 A | 1/1990 | Ito et al. |
| 4,892,798 A | 1/1990 | Lamanna et al. |
| 4,931,168 A | 6/1990 | Watanabe et al. |
| 4,931,323 A | 6/1990 | Manitt et al. |
| 4,948,623 A | 8/1990 | Beach et al. |
| 4,959,430 A | 9/1990 | Jonas et al. |

(Continued)

FOREIGN PATENT DOCUMENTS

| | | |
|---|---|---|
| EP | 0410765 | 7/1990 |
| EP | 0449309 | 3/1991 |

(Continued)

OTHER PUBLICATIONS

Production of Metal Nanoparticles, Vanheusden, et al. U.S. Appl. No. 11/331,230 (Jan. 13, 2006).
Printable Electronic Conductors, Vanheusden et al. U.S. Appl. No. 11/231,231 (Jan. 13, 2006).
Replacement of Passive Electrical Components, Howarth et al. U.S. Appl. No. 11/331,186 (Jan. 13, 2006).
Circuit Modeling and Selective Deposition, Howarth et al. U.S. Appl. No. 11/331,188 (Jan. 13, 2006).

(Continued)

*Primary Examiner* — Mark Kopec
*Assistant Examiner* — Haidung Nguyen

(57) ABSTRACT

A metal nanoparticle composition for the fabrication of conductive features. The metal nanoparticle composition advantageously has a low viscosity permitting deposition of the composition by direct-write tools. The metal nanoparticle composition advantageously also has a low conversion temperature, permitting its deposition and conversion to an electrical feature on polymeric substrates.

20 Claims, 1 Drawing Sheet

U.S. PATENT DOCUMENTS

| | | |
|---|---|---|
| 5,011,627 A | 4/1991 | Lutz et al. |
| 5,028,473 A | 7/1991 | Vitriol et al. |
| 5,039,552 A | 8/1991 | Riemer |
| 5,045,141 A | 9/1991 | Salensky et al. |
| 5,049,434 A | 9/1991 | Wasulko |
| 5,057,363 A | 10/1991 | Nakanishi |
| 5,059,242 A | 10/1991 | Firmstone et al. |
| 5,075,262 A | 12/1991 | Nguyen et al. |
| 5,091,003 A | 2/1992 | Boaz |
| 5,121,127 A | 6/1992 | Toriyama |
| 5,132,248 A | 7/1992 | Drummond et al. |
| 5,139,818 A | 8/1992 | Mance |
| 5,148,355 A | 9/1992 | Lowe et al. |
| 5,153,023 A | 10/1992 | Orlowski et al. |
| 5,160,366 A | 11/1992 | Shibata |
| 5,167,271 A | 12/1992 | Lange et al. |
| 5,173,330 A | 12/1992 | Asano et al. |
| 5,176,744 A | 1/1993 | Muller |
| 5,176,764 A | 1/1993 | Abbott et al. |
| 5,183,784 A | 2/1993 | Nguyen et al. |
| 5,215,820 A | 6/1993 | Hosokawa et al. |
| 5,216,207 A | 6/1993 | Prabhu et al. |
| 5,244,538 A | 9/1993 | Kumar |
| 5,250,229 A | 10/1993 | Hara et al. |
| 5,270,368 A | 12/1993 | Lent et al. |
| 5,281,261 A | 1/1994 | Lin |
| 5,312,480 A | 5/1994 | Lotze et al. |
| 5,312,674 A | 5/1994 | Haertling et al. |
| 5,329,293 A | 7/1994 | Liker |
| 5,332,646 A | 7/1994 | Wrigt et al. |
| 5,366,760 A | 11/1994 | Fujii et al. |
| 5,378,408 A | 1/1995 | Carroll et al. |
| 5,378,508 A | 1/1995 | Castro et al. |
| 5,384,953 A | 1/1995 | Economikos et al. |
| 5,395,452 A | 3/1995 | Kobayashi et al. |
| 5,403,375 A | 4/1995 | Konig et al. |
| 5,421,909 A | 6/1995 | Ishikawa et al. |
| 5,421,926 A | 6/1995 | Yukonobu et al. |
| 5,433,893 A | 7/1995 | Jost et al. |
| 5,444,453 A | 8/1995 | Lalezari |
| 5,463,057 A | 10/1995 | Graetzel et al. |
| 5,494,550 A | 2/1996 | Benge |
| 5,501,150 A | 3/1996 | Leenders et al. |
| 5,539,041 A | 7/1996 | Arnold et al. |
| 5,559,057 A | 9/1996 | Goldstein |
| 5,565,143 A | 10/1996 | Chan |
| 5,571,311 A | 11/1996 | Belmont et al. |
| 5,587,111 A | 12/1996 | Watanabe et al. |
| 5,599,046 A | 2/1997 | Behm et al. |
| 5,601,638 A | 2/1997 | Fukuda et al. |
| 5,604,027 A | 2/1997 | Sheridon |
| 5,604,673 A | 2/1997 | Washburn et al. |
| 5,628,945 A | 5/1997 | Riman et al. |
| 5,645,932 A | 7/1997 | Uchibori |
| 5,661,041 A | 8/1997 | Kano |
| 5,665,472 A | 9/1997 | Tanaka et al. |
| 5,679,724 A | 10/1997 | Sacripante et al. |
| 5,712,673 A | 1/1998 | Hayashi et al. |
| 5,716,663 A | 2/1998 | Capote et al. |
| 5,725,647 A | 3/1998 | Carlson et al. |
| 5,725,672 A | 3/1998 | Schmitt et al. |
| 5,746,868 A | 5/1998 | Abe |
| 5,747,222 A | 5/1998 | Ryu |
| 5,747,562 A | 5/1998 | Mahmud et al. |
| 5,750,194 A | 5/1998 | Watanabe et al. |
| 5,751,325 A | 5/1998 | Leenders et al. |
| 5,756,008 A | 5/1998 | Slutsky et al. |
| 5,759,230 A | 6/1998 | Chow et al. |
| 5,759,712 A | 6/1998 | Hockaday |
| 5,767,810 A | 6/1998 | Hagiwara et al. |
| 5,781,158 A | 7/1998 | Ko et al. |
| 5,801,108 A | 9/1998 | Huang et al. |
| 5,814,683 A | 9/1998 | Branham |
| 5,826,329 A | 10/1998 | Roth |
| 5,828,271 A | 10/1998 | Stitzer |
| 5,837,041 A | 11/1998 | Bean et al. |
| 5,837,045 A | 11/1998 | Johnson et al. |
| 5,838,271 A | 11/1998 | Park |
| 5,838,567 A | 11/1998 | Boggio, Jr. |
| 5,846,615 A | 12/1998 | Sharma et al. |
| 5,853,470 A | 12/1998 | Martin et al. |
| 5,879,715 A | 3/1999 | Higgins et al. |
| 5,882,722 A | 3/1999 | Kydd |
| 5,894,038 A | 4/1999 | Sharma et al. |
| 5,909,083 A | 6/1999 | Asano et al. |
| 5,930,026 A | 7/1999 | Jacobson et al. |
| 5,932,280 A | 8/1999 | Roth |
| 5,953,037 A | 9/1999 | Hayashi et al. |
| 5,962,085 A | 10/1999 | Hayashi et al. |
| 5,966,580 A | 10/1999 | Watanabe et al. |
| 5,992,320 A | 11/1999 | Kosaka et al. |
| 5,997,044 A | 12/1999 | Behm et al. |
| 5,998,085 A | 12/1999 | Isberg et al. |
| 6,019,926 A | 2/2000 | Southward et al. |
| 6,025,026 A | 2/2000 | Smith et al. |
| 6,027,762 A | 2/2000 | Tomita et al. |
| 6,036,889 A | 3/2000 | Kydd |
| 6,042,643 A | 3/2000 | Belmont et al. |
| 6,074,725 A | 6/2000 | Kennedy |
| 6,080,261 A | 6/2000 | Popat et al. |
| 6,080,928 A | 6/2000 | Nakagawa |
| 6,099,897 A | 8/2000 | Sayo et al. |
| 6,103,393 A | 8/2000 | Kodas et al. |
| 6,103,868 A | 8/2000 | Heath et al. |
| 6,109,175 A | 8/2000 | Kinoshita |
| 6,118,426 A | 9/2000 | Albert et al. |
| 6,124,851 A | 9/2000 | Jacobson |
| 6,133,147 A | 10/2000 | Rhee et al. |
| 6,143,356 A | 11/2000 | Jablonski |
| 6,153,348 A | 11/2000 | Kydd et al. |
| 6,156,837 A | 12/2000 | Branan, Jr. et al. |
| 6,159,267 A | 12/2000 | Hampden-Smith et al. |
| 6,165,247 A | 12/2000 | Kodas et al. |
| 6,169,129 B1 | 1/2001 | Mahmud et al. |
| 6,169,837 B1 | 1/2001 | Kato et al. |
| 6,177,151 B1 | 1/2001 | Chrisey et al. |
| 6,184,457 B1 | 2/2001 | Tsuzuki et al. |
| 6,187,157 B1 | 2/2001 | Chen et al. |
| 6,190,731 B1 | 2/2001 | Tecle |
| 6,197,147 B1 | 3/2001 | Bonsel et al. |
| 6,197,366 B1 | 3/2001 | Takamatsu |
| 6,200,405 B1 | 3/2001 | Nakazawa et al. |
| 6,207,268 B1 | 3/2001 | Kosaka et al. |
| 6,214,259 B1 | 4/2001 | Oda et al. |
| 6,214,520 B1 | 4/2001 | Wolk et al. |
| 6,238,734 B1 | 5/2001 | Senzaki et al. |
| 6,245,494 B1 | 6/2001 | Andriessen et al. |
| 6,251,471 B1 | 6/2001 | Granoff et al. |
| 6,251,488 B1 | 6/2001 | Miller et al. |
| 6,268,014 B1 | 7/2001 | Eberspacher et al. |
| 6,270,389 B1 | 8/2001 | Kobayashi et al. |
| 6,274,412 B1 | 8/2001 | Kydd et al. |
| 6,277,169 B1 | 8/2001 | Hampden-Smith et al. |
| 6,277,740 B1 | 8/2001 | Goldstein |
| 6,294,401 B1 | 9/2001 | Jacobson et al. |
| 6,296,896 B1 | 10/2001 | Takahashi et al. |
| 6,316,100 B1 | 11/2001 | Kodas et al. |
| 6,317,023 B1 | 11/2001 | Felten |
| 6,323,096 B1 | 11/2001 | Saia et al. |
| 6,328,894 B1 | 12/2001 | Chan et al. |
| 6,329,899 B1 | 12/2001 | Hunt et al. |
| RE37,512 E | 1/2002 | Szlufcik et al. |
| 6,338,809 B1 | 1/2002 | Hampden-Smith et al. |
| 6,348,295 B1 | 2/2002 | Griffith et al. |
| 6,356,234 B1 | 3/2002 | Harrison et al. |
| 6,358,567 B2 | 3/2002 | Pham et al. |
| 6,358,611 B1 | 3/2002 | Nagasawa et al. |
| 6,368,378 B2 | 4/2002 | Sasaki |
| 6,372,158 B1 | 4/2002 | Hashimoto et al. |
| 6,379,742 B1 | 4/2002 | Behm et al. |
| 6,379,745 B1 | 4/2002 | Kydd et al. |
| 6,380,778 B2 | 4/2002 | Uehara et al. |
| 6,395,053 B1 | 5/2002 | Fau et al. |
| 6,399,230 B1 | 6/2002 | Tormey et al. |
| 6,413,790 B1 | 7/2002 | Duthaler et al. |
| 6,416,150 B1 | 7/2002 | Kimura |
| 6,458,327 B1 | 10/2002 | Vossmeyer |

| | | |
|---|---|---|
| 6,458,431 B2 | 10/2002 | Hill et al. |
| 6,467,897 B1 | 10/2002 | Wu et al. |
| 6,487,774 B1 | 12/2002 | Nakao et al. |
| 6,501,663 B1 | 12/2002 | Pan |
| 6,503,831 B2 | 1/2003 | Speakman |
| 6,506,438 B2 | 1/2003 | Duthaler et al. |
| 6,537,359 B1 | 3/2003 | Spa |
| 6,541,433 B2 | 4/2003 | Schultz et al. |
| 6,548,036 B2 | 4/2003 | Iida et al. |
| 6,599,631 B2 | 7/2003 | Kambe et al. |
| 6,645,569 B2 | 11/2003 | Cramer et al. |
| 6,649,138 B2 | 11/2003 | Adams et al. |
| 6,660,680 B1 | 12/2003 | Hampden-Smith et al. |
| 6,667,360 B1 | 12/2003 | Ng et al. |
| 6,697,694 B2 | 2/2004 | Mogensen |
| 6,713,389 B2 | 3/2004 | Speakman |
| 6,730,400 B1 | 5/2004 | Komatsu et al. |
| 6,743,319 B2 | 6/2004 | Kydd |
| 6,753,108 B1 | 6/2004 | Hampden-Smith et al. |
| 6,773,614 B2 | 8/2004 | Field |
| 6,774,036 B2 | 8/2004 | Goldstein |
| 6,780,765 B2 | 8/2004 | Goldstein |
| 6,811,885 B1 | 11/2004 | Andriessen et al. |
| 6,814,795 B2 | 11/2004 | McVicker et al. |
| 6,827,772 B2 | 12/2004 | Foster |
| 6,830,778 B1 | 12/2004 | Schultz et al. |
| 6,855,196 B2 | 2/2005 | Kawamura et al. |
| 6,880,909 B2 | 4/2005 | King et al. |
| 6,881,239 B2 | 4/2005 | Uchida |
| 6,933,331 B2 | 8/2005 | Yadav et al. |
| 6,939,576 B2 | 9/2005 | Deshpande et al. |
| 6,951,666 B2 | 10/2005 | Kodas et al. |
| 6,958,095 B2 | 10/2005 | Kakimoto et al. |
| 7,115,218 B2 | 10/2006 | Kydd et al. |
| 7,306,845 B2 | 12/2007 | Horne et al. |
| 7,524,528 B2 | 4/2009 | Kodas et al. |
| 7,533,361 B2 | 5/2009 | Edwards |
| 7,553,512 B2 | 6/2009 | Kodas et al. |
| 7,585,349 B2 | 9/2009 | Xia et al. |
| 7,597,769 B2 | 10/2009 | Hampden-Smith et al. |
| 7,625,420 B1 | 12/2009 | Kodas et al. |
| 7,629,017 B2 | 12/2009 | Kodas et al. |
| 2001/0004477 A1 | 6/2001 | Fukunaga et al. |
| 2001/0017085 A1 | 8/2001 | Kubo |
| 2002/0006723 A1 | 1/2002 | Goldstein |
| 2002/0014182 A1 | 2/2002 | Yadav et al. |
| 2002/0018861 A1 | 2/2002 | Hill et al. |
| 2002/0020491 A1 | 2/2002 | Price et al. |
| 2002/0058143 A1 | 5/2002 | Hunt et al. |
| 2002/0079832 A1 | 6/2002 | Van Tongeren et al. |
| 2002/0131254 A1 | 9/2002 | Schaper |
| 2002/0146564 A1 | 10/2002 | Takai et al. |
| 2002/0148640 A1 | 10/2002 | Holl et al. |
| 2002/0150678 A1 | 10/2002 | Cramer et al. |
| 2002/0151161 A1 | 10/2002 | Furusawa |
| 2002/0160685 A1 | 10/2002 | Kodas et al. |
| 2002/0176987 A1 | 11/2002 | Yadav et al. |
| 2003/0003231 A1 | 1/2003 | Kiguchi et al. |
| 2003/0009726 A1 | 1/2003 | Chang et al. |
| 2003/0020768 A1 | 1/2003 | Renn |
| 2003/0060038 A1 | 3/2003 | Sirringhaus et al. |
| 2003/0063155 A1 | 4/2003 | Nakao et al. |
| 2003/0070569 A1 | 4/2003 | Bulthaup et al. |
| 2003/0070747 A1 | 4/2003 | Kydd |
| 2003/0073042 A1 | 4/2003 | Cernigliaro et al. |
| 2003/0082485 A1 | 5/2003 | Bulthaup et al. |
| 2003/0083203 A1 | 5/2003 | Hashimoto |
| 2003/0085057 A1 | 5/2003 | Hashimoto |
| 2003/0096056 A1 | 5/2003 | Kawamura et al. |
| 2003/0102099 A1 | 6/2003 | Yadav et al. |
| 2003/0108664 A1 | 6/2003 | Kodas et al. |
| 2003/0110978 A1 | 6/2003 | Abe et al. |
| 2003/0116057 A1 | 6/2003 | Suzuki et al. |
| 2003/0123259 A1 | 7/2003 | Furuya et al. |
| 2003/0124259 A1 | 7/2003 | Kodas et al. |
| 2003/0145680 A1 | 8/2003 | Ichida |
| 2003/0146019 A1 | 8/2003 | Hirai |
| 2003/0148024 A1 | 8/2003 | Kodas et al. |
| 2003/0151030 A1 | 8/2003 | Gurin |
| 2003/0161959 A1 | 8/2003 | Kodas et al. |
| 2003/0168639 A1 | 9/2003 | Cheon et al. |
| 2003/0175411 A1 | 9/2003 | Kodas et al. |
| 2003/0180451 A1 | 9/2003 | Kodas et al. |
| 2003/0183165 A1 | 10/2003 | Kakimoto et al. |
| 2003/0185739 A1 | 10/2003 | Mangold et al. |
| 2003/0185889 A1 | 10/2003 | Yan et al. |
| 2003/0201244 A1 | 10/2003 | Ogawa |
| 2003/0207949 A1 | 11/2003 | Klabunde et al. |
| 2003/0211246 A1 | 11/2003 | Kydd et al. |
| 2003/0213614 A1 | 11/2003 | Furusawa et al. |
| 2003/0215565 A1 | 11/2003 | Chang et al. |
| 2003/0224104 A1 | 12/2003 | Fukunaga |
| 2003/0228748 A1 | 12/2003 | Nelson et al. |
| 2004/0004209 A1 | 1/2004 | Matsuba et al. |
| 2004/0030019 A1 | 2/2004 | Kim et al. |
| 2004/0038808 A1 | 2/2004 | Hampden-Smith |
| 2004/0043691 A1 | 3/2004 | Abe et al. |
| 2004/0058457 A1 | 3/2004 | Huang et al. |
| 2004/0074336 A1 | 4/2004 | Daimon et al. |
| 2004/0126708 A1 | 7/2004 | Jing et al. |
| 2004/0140549 A1 | 7/2004 | Miyagawa |
| 2004/0142165 A1 | 7/2004 | Fujii |
| 2004/0144958 A1 | 7/2004 | Conaghan et al. |
| 2004/0144959 A1 | 7/2004 | Conaghan et al. |
| 2004/0145858 A1 | 7/2004 | Sakurada |
| 2004/0151893 A1 | 8/2004 | Kydd et al. |
| 2004/0160465 A1 | 8/2004 | Baker-Smith et al. |
| 2004/0173144 A1 | 9/2004 | Edwards et al. |
| 2004/0182533 A1 | 9/2004 | Blum et al. |
| 2004/0191695 A1 | 9/2004 | Ray et al. |
| 2004/0196329 A1 | 10/2004 | Ready |
| 2004/0201648 A1 | 10/2004 | Sekiya |
| 2004/0206941 A1 | 10/2004 | Gurin |
| 2004/0223926 A1 | 11/2004 | Kobayashi |
| 2004/0231594 A1 | 11/2004 | Edwards et al. |
| 2004/0239730 A1 | 12/2004 | Kurosawa |
| 2004/0247842 A1 | 12/2004 | Koyama et al. |
| 2004/0250750 A1 | 12/2004 | Reda et al. |
| 2004/0261700 A1 | 12/2004 | Edwards |
| 2004/0263564 A1 | 12/2004 | Maekawa |
| 2004/0265549 A1 | 12/2004 | Kydd |
| 2005/0037614 A1 | 2/2005 | Fukuchi |
| 2005/0056118 A1 | 3/2005 | Xia et al. |
| 2005/0078158 A1 | 4/2005 | Magdassi et al. |
| 2005/0116203 A1 | 6/2005 | Takahashi et al. |
| 2005/0207930 A1 | 9/2005 | Yamaguchi |
| 2005/0215689 A1 | 9/2005 | Garbar et al. |
| 2005/0238804 A1 | 10/2005 | Garbar |
| 2006/0001726 A1 | 1/2006 | Kodas et al. |
| 2006/0047014 A1 | 3/2006 | Hopper et al. |
| 2006/0083694 A1 | 4/2006 | Kodas et al. |
| 2006/0158497 A1 | 7/2006 | Vanheusden et al. |
| 2006/0159603 A1 | 7/2006 | Vanheusden et al. |
| 2006/0162497 A1 | 7/2006 | Kodas et al. |
| 2006/0163744 A1 | 7/2006 | Vanheusden et al. |
| 2006/0165898 A1 | 7/2006 | Kodas et al. |
| 2006/0165910 A1 | 7/2006 | Kodas et al. |
| 2006/0166057 A1 | 7/2006 | Kodas et al. |
| 2006/0176350 A1 | 8/2006 | Howarth et al. |
| 2006/0189113 A1 | 8/2006 | Vanheusden et al. |
| 2007/0034052 A1* | 2/2007 | Vanheusden et al. ........... 75/362 |
| 2008/0145633 A1 | 6/2008 | Kodas et al. |
| 2008/0193667 A1* | 8/2008 | Garbar et al. .................. 427/532 |
| 2008/0318757 A1 | 12/2008 | Fotou et al. |
| 2009/0053400 A1 | 2/2009 | la Vega et al. |

FOREIGN PATENT DOCUMENTS

| | | |
|---|---|---|
| EP | 0537502 | 9/1992 |
| EP | 0641670 | 8/1994 |
| EP | 0696515 | 5/1995 |
| EP | 0824138 | 7/1997 |
| EP | 0930641 | 1/1999 |
| EP | 0977212 | 2/2000 |
| EP | 0982090 | 3/2000 |
| EP | 0995718 | 4/2000 |
| EP | 1083578 | 3/2001 |
| EP | 2270872 | 5/2001 |
| EP | 1107298 | 6/2001 |

| | | |
|---|---|---|
| EP | 1339073 | 9/2001 |
| EP | 1302895 | 4/2002 |
| EP | 1335393 | 4/2002 |
| EP | 1426978 | 8/2002 |
| EP | 1244168 | 9/2002 |
| EP | 1493780 | 4/2003 |
| EP | 1323793 | 7/2003 |
| EP | 1340568 | 9/2003 |
| EP | 1342760 | 9/2003 |
| EP | 1544905 | 9/2003 |
| EP | 1571186 | 2/2005 |
| EP | 1515348 | 3/2005 |
| EP | 1801890 | 3/2010 |
| JP | 62-113164 | 5/1987 |
| JP | 01-303787 | 7/1989 |
| JP | 2002-124016 | 5/1990 |
| JP | 2000-011875 | 1/2000 |
| JP | 2000-182889 | 6/2000 |
| JP | 2001-167633 | 6/2001 |
| JP | 2004-311725 | 4/2004 |
| JP | 2004235272 | 8/2004 |
| JP | 2005-191059 | 7/2005 |
| JP | 2005-219873 | 8/2005 |
| WO | 89-05567 | 6/1989 |
| WO | 97-48257 | 12/1997 |
| WO | 98-08362 | 2/1998 |
| WO | 98-37133 | 8/1998 |
| WO | 99-16556 | 4/1999 |
| WO | 99-16601 | 4/1999 |
| WO | 99-17351 | 4/1999 |
| WO | 9919900 | 4/1999 |
| WO | 99-61911 | 12/1999 |
| WO | 00-10197 | 2/2000 |
| WO | 00-10736 | 3/2000 |
| WO | 00-29208 | 5/2000 |
| WO | 00-69235 | 11/2000 |
| WO | 00-72224 | 11/2000 |
| WO | 01-54203 | 7/2001 |
| WO | 01-56736 | 8/2001 |
| WO | 01-82315 | 11/2001 |
| WO | 01-87503 | 11/2001 |
| WO | 02-04698 | 1/2002 |
| WO | 02-05294 | 1/2002 |
| WO | 02-087749 | 7/2002 |
| WO | 02087749 | 11/2002 |
| WO | 02-098576 | 12/2002 |
| WO | 03016961 | 2/2003 |
| WO | 03-018645 | 3/2003 |
| WO | 03-032084 | 4/2003 |
| WO | 03-035279 | 5/2003 |
| WO | 03-038002 | 5/2003 |
| WO | 03-051562 | 6/2003 |
| WO | 03-206573 | 12/2003 |
| WO | 2004-005413 | 1/2004 |
| WO | 2004-030072 | 4/2004 |
| WO | 2004-207787 | 4/2004 |
| WO | 2004-050260 | 6/2004 |
| WO | 2004-050350 | 6/2004 |
| WO | 2004-062890 | 7/2004 |
| WO | 2004-063295 | 7/2004 |
| WO | 2004-068918 | 8/2004 |
| WO | 2004-075211 | 9/2004 |
| WO | 2004-078641 | 9/2004 |
| WO | 2004-104153 | 12/2004 |
| WO | 2004-105985 | 12/2004 |
| WO | 2005-044451 | 5/2005 |
| WO | 2006-061557 | 6/2006 |
| WO | 2006078825 | 7/2006 |
| WO | 2007053408 | 5/2007 |
| WO | 2007149883 | 12/2007 |

OTHER PUBLICATIONS

Ink-Jet Printing of Compositionially Non-Uniform Features, Vanheusden et al. U.S. Appl. No. 11/331,237 (Jan. 13, 2006).
Printable Electronic Features on Non-Uniform Substrate and Processes for Making Same, Vanheusden et al. U.S. Appl. No. 11/331,190 (Jan. 13, 2006).
Controlling Ink Migration During the Formation of Printable Electronic Features, Kowalski et al. U.S. Appl. No. 11/331,185 (Jan. 13, 2006).
Process for Planarizing Substrates and Enapsulating Printable Electronic Features, Mark Kowalski, U.S. Appl. No. 11/331,239 (Jan. 13, 2006).
Optimized Multi-Layer Printing of Electronics and Displays, Edwards et al. U.S. Appl. No. 11/331,187 (Jan. 13, 2006).
A System and Process for Manufacturing Application Specific Printable Circuits (ASPC's) and Other Custom Electronic Devices, Chuck Edwards, U.S. Appl. No. 11/331,189 (Jan. 13, 2006).
A System and Process for Manufacturing Custom Electronics by Combining Traditional Electronics With Printable Electronics, Chuck Edwards, U.S. Appl. No. 11/331,191 (Jan. 13, 2006).
Security Features, Their Use, and Processes for Making Them, Hampden-Smith et al. U.S. Appl. No. 11/331,233 (Jan. 13, 2006).
Kwon, Viscosity of magnetic particle suspension, Journal of Molecular Liquids 75 (1998) 115-126.
Palchik et al., Preparation and Characterization of Ni/NiO Composite using Microwave Irradiation and Sonication, NanoStructured Materials, vol. 11. No. 3, pp. 415-420, 1999.
International Preliminary Report on Patentability, for International Application PCT/US2006/001301, dated Jan. 22, 2007, 5 pgs.
International Search Report, for International Application PCT/US2006/001301, dated Sep. 19, 2006, 6 pgs.
Advanced Materials Systems for Ultra-Low-Temperature, Direct-Write Technologies, Digital Direct Write Technologies, Vanheusden, et al., "Direct-Write Technologies for Rapid Prototyping Applications", pp. 123-173 (2001).
Dispersion and Stability of Silver Inks, Tay, et al., "Journal of Materials Science" vol. 37, pp. 4653-4661 (2002).
Ethylene Glycol-Mediated Synthesis of Metal Oxide Nanowires, X. Jiang, Y. Wang, T. Herricks, Y. Xia, "Journal of Materials Chemistry" 14, 695-703 (2004).
Fine Line Conductor Manufacturing Using Drop-On-Demand PZT Printing Technology, Szczech, et al. "IEEE Transactions on Electronics Packaging Manufacturing" vol. 25, No. 1 (2002).
Gold and Silver Nanoparticles: A Class of Chromophores with Colors Tunable in the Range from 400 to 750 nm, Y. Sun, Y. Xia, "The Analyst, The Royal Society of Chemistry" 128, 686-691 (2003).
Ink Jet Printing of Hybrid Circuits, R.W. Vest, Tweedell and B.C. Buchanan, "Hybrid Microelectronics" 6, 261, 267 (1983).
Ink-Jet Printed Nanoparticle Microelectromechanical Systems, Fuller, et al., "Journal of Microelectromechnical Systems", vol. 11, No. 1 (2002).
Ink-Jet Printing of Catalyst Patterns for Electroless Metal Deposition, Shah, et al., "American Chemical Society" 15, 1584-1587 (1999).
Large-Scale Synthesis of Monodisperse, Nanorods of Se/Te Alloys Through a Homogeneous Nucleation and Solution Growth Process B. Mayers, B. Gates, Y. Yin, Y. Xia, "Advanced Materials" 13, No. 18 (2001).
Large-Scale Synthesis of Silver Nanocubes: :"The Role of H1C1 in Promoting Cube Perfection and Monodispersity, S.H. Im, Y.T. Lee, B. Wiley, Y Xia" Angewandte Chemical International Edition 44, 2154-2157 (2005).
Large-Scale Synthesis of Uniform Silver Nanowires through A Soft, Self Seeding, Polyol Process "Advanced Materials" 14 No. 11 (2002).
Late-News Paper: Inkjet-Printed Bus and Address Electrodes for Plasma Display, Furusawa, et al., "SID 02 Digest" pp. 753-755, (2002).
Liquid Ink Jet Printing With MOD Inks for Hybrid Microcircuits, K.F. Teng, R.W. Vest "IEEE Transaction on Components, Hybrids and Manufacturing Technology" vol. CHMT-12, No. 4, 545-549 (1987).
Materials, Silver Ink for Jet Printing "NASA Tech Briefs" Aug. 1989.
Microwave-polyol Process for Metal Nanophases, S. Komarneni, H. Katsuki, D. Li, A.S. Bhalla "Journal of Physics, Condensed Matter" 16, S1305-S1312 (2004).
New Development of Nonlinear Optical Cyrstals for the Ultraviolet Region with Molecular Engineering Approach, C. Chen, Y. Wang, Y. Xia, B. Wu, D. Tang, K. Wu, Z. Wenrong, L. Yu, L. Mei "Journal of Applied Physics" 77, (6) (1995).

New Nonlinear Optical Crystals for UV and VUV Harmonic Generation, Y. Xia, C. Chen, D. Tang, B. Wu "Advanced Materials" 7, No. 1 (1995).

Physical Mechanisms Governing Pattern Fidelity in Microscale Offset Printing, Darhuber, et al. "Journal of Applied Physics", vol. 90, No. 7, pp. 3602-3609 (2001).

Polyol Synthesis of Uniform Silver Nanowires: A Plausible Growth Mechanism and the Supporting Evidence, Y. Sun, B. Mayers, T. Herricks, Y. Xia "Nano Letters" vol. 3, No. 7, 955-960 (2003).

Polyol Synthesis of Silver Nanoparticles: Use of Choloride and Oxygen to Promote the Formation of Single-Crystal, Truncated Cubes and Tetrahedrons B. Wiley, T. Herricks, Y. Sun, Y. Xia "Nano Letters" vol. 4, No. 9, 1733-1739 (2004).

Polyol Synthesis of Platinum Nanoparticles: Control of Morphology with Sodium Nitrate, T. Herricks, J. Chen, Y. Xia "Nano Letters" vol. 4, No. 12, 2367-2371 (2004).

Polyol Synthesis of Plantinum Nanostructures: Control of Morphology Through the Manipulation of Reduction Kinetics, J. Chen, T. Herricks, Y. Xia "Angewandte Chemical International Edition" 44, 2589-2592 (2005).

Polyol Synthesis of Silver Nanostructures: Control of Product Morphology with Fe(II) or Fe(III) Species, B. Wiley, Y. Sun, Y. Xia "Langmuir The ACS Journal of Surfaces and Colloids" vol. 21, No. 18 (2005).

Preparation and Characterization of Nano-Sized Ag/PVP Composites for Optical Applications, G. Carotenuto, G.P. Pepe, L Nicolais "The European Physical Journal B" 16, 11-17 (2000).

Preparation of Colloidal Silver Dispersions by the Polyol Process Part 1—Synthesis and Characterization, P.Y. Silvert, R. Herrera-Urbina, N. Duvauchelle, V. Vijayakrishan, K. Tekaia-Elhsissen "Journal of Materials Chemistry" 6(4), 573-577 (1996).

Preparation of Colloidal Silver Dispersions by the Polyol Process Part 2—Mechanism of Particle Formation, P.Y. Silvert, R. Herrera-Urbina, K. Tekaia-Elhsissen "Journal of Materials Chemistry" 7(2), 293-299 (1997).

Preparation of Gold, Platinum Palladium and Silver Nanoparticles by the Reduction of their Salts with a Weak Reductant-Potassium Bitratrate, Y. Tan, X. Dai, Y. Li, D. Zhu "Journal of Materials Chemistry" 13, 1069-1075 (2003).

Preparation of Polychrome Silver Nanoparticles in Different Solvents, R. He, X. Qian, J. Yin, Z. Zhu "Journal of Materials Chemistry" 12, 3783-3786 (2002).

PVP Protective Mechanism of Ultrafine Silver Powder Synthesized by Chemical Reduction Processes, Z. Zhang, B. Zhao, L. Hu "Journal of Solid State Chemistry" 121, 105-110, Article No. 0015 (1996).

Shape-Controlled Synthesis of Gold and Silver Nanoparticles, Y. Sun, Y. Xia "Science Magazine" vol. 298, pp. 2176-2179 (2002).

Shape-Controlled Synthesis of Silver and Gold Nanostructures, B. Wiley, Y. Sun, J. Chen, H. Cang, Z.Y. Li, X. Li, Y. Xia "MRS Bulletin" vol. 30 (2005).

Silver Nanowires Can Be Directly Coated with Amorphous Silica to Generate Well-Controlled Coaxial Nanocables of Silver/Silica, Y. Yin, Y. Lu, Y. Sun, Y. Xia "Nano Letters" vol. 2, No. 4, 427-430 (2002).

Site Selective Copper and Silver Electroless Metallization Facilitated by a Photolithographically Patterned Hydrogen Silsesquioxane Mediated Seed Layer, Harness, et al. "American Chemical Society" 14, 1448-1451 (2002).

Synthesis of Monodisperse Au, Pt, Pd, Ru and Ir-Nanoparticles in Ethylene Glycol, F. Bonet, V. Delmas, S. Grugeon, R. Herrera-Urbina, P.Y. Silvert, K. Tekaia-Elhsessen, "NanoStructured Materials", vol. 11, No. 8, pp. 1277-1284 (1999).

Synthesis of Monodisperse Submicronic Gold Particles by the Polyol Process, P.Y. Silvert, K. Tekaia-Elhsissen "Solid State Ionics" 82, 53-60 (1995).

Tape Compositions for the Deposition of Electronic Features, T. Kodas, U.S. Appl. No. 10/274,495 (Oct. 18, 2002).

Transformation of Silver Nanospheres into Nanobelts andTriangular Nanoplates Through a Thermal Process, Y. Sun, B. Mayers, Y. Xia "Nano Letters" vol. 3, No. 5, 675-679 (2003).

Triangular Nanoplates of Silver: Synthesis, Characterization, and Use as Sacrificial Templates for Generating Triangular Nanorings of Gold, Y. Sun, Y. Xia "Advanced Materials" 15, No. 9 (2003).

Uniform Silver Nanowires Synthesis by Reducing $AgNO_3$ with Ethylene Glycol in the Presence of Seeds and Poly (Vinyl Pyrrolidone), Y. Sun, Y. Yin, B.T. Mayers, T. Herricks, Y. Xia "Chemical Materials" 14, 4736-4745 (2002).

ITT Cuts Costs of PC Board Manufacturing, K. Dreyfack, "Electronics" vol. 52, No. 17 (1979).

(2005) "How Printable Computers Will Work", Worldwide Web Reference Source, http://computer.howstuffworks.com/printable-computer.htm/printable Date Retrieved: May 23, 2005.

(2005) "Definitions of inkjet printer on the Web:", Worldwide Web Reference Source, http://www.google.com/search? hl=en&Ir=&oi+defmore&q=deifine:inkjet+printer Date Retrieved May 23, 2005.

(2005) "Screen Printing Technology, Principles of Screen-Printing", Worldwide Web Reference Source, http://www.spauk.co.uk/TechnicalPages/Screen%20TP.pdf Date Retrieved: May 3, 2006.

(Unknown) "Lithography—definition of Lithography in Encyclopedia", Worldwide Web Reference Source, http://encyclopedia.laborlawtalk.com/Lithography Date Retrieved: May 25, 2005.

(2006) "Photolithography: Definition and Much More From Answers.com", Worldwide Web Reference Source, http://www.answers.com/topic/photolithography Date Retrieved: May 25, 2005.

(Dec. 3, 2002) "Printing Drawings and Photographic Images", Worldwide Web Reference Source, http://histclo.hispeed.com/photo/photo-print.html Date Retrieved: May 25, 2005.

(Apr. 5, 2006) "Photolithography", Worldwide Web Reference Source, http://www.ece.gatech.edu/research/labs/vc/theory/photolith.html Date Retrieved: May 25, 2005.

Measurement of Clay Surface Areas by Polyvinylpyrrolidone (PVP) Sorption and Its Use for quantifying Illite and Smectite Abundance, A.E. Blum, D.D. Eberl, "Clays and Clay Mineals", vol. 52, No. 5, 589-602 (2004).

Metal Nanoparticle Compositions, Vanheusden, et al. U.S. Appl. No. 11/331,211 (Jan. 13, 2006).

Separation of Metal Nanoparticles, Vanheusden, et al. U.S. Appl. No. 11/331,238 (Jan. 13, 2006).

* cited by examiner

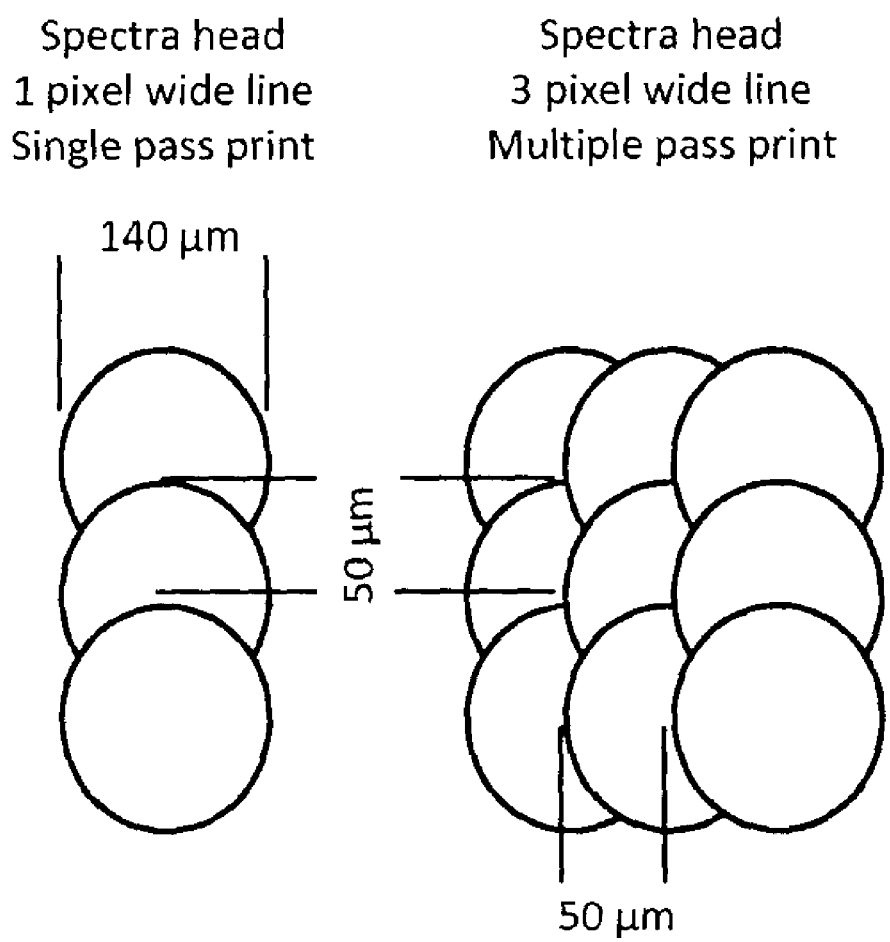

US 8,383,014 B2

METAL NANOPARTICLE COMPOSITIONS

STATEMENT REGARDING FEDERALLY-SPONSORED RESEARCH/DEVELOPMENT

This invention was made with Government support under Agreement No. MDS972-93-2-0014 or DAAD19-02-3-0001 awarded by the Army Research Laboratory. The Government has certain rights to this invention.

CROSS-REFERENCE TO RELATED APPLICATIONS

This application is a continuation of U.S. application Ser. No. 11/331,211, filed on Jan. 13, 2006, which claims the benefit of U.S. Provisional Application Ser. Nos. 60/643,577; 60/643,629; and 60/643,578, all filed Jan. 14, 2005. The entireties of all of these applications are incorporated by reference herein.

BACKGROUND OF THE INVENTION

1. Field of the Invention

The present invention relates to metal nanoparticle compositions that are useful for the production of electrically conductive features. The compositions may advantageously be deposited on a variety of substrates and processed into electrically conductive features at low temperatures. The compositions can also have a viscosity which allows the deposition of the compositions using direct-write tools, such as ink jet devices.

2. Discussion of Background Information

The electronics, display and energy industries rely on the formation of coatings and patterns of conductive materials to form circuits on organic and inorganic substrates. The primary methods for generating these patterns are screen printing for features larger than about 100 µm and thin film and etching methods for features smaller than about 100 µm. Other subtractive methods to attain fine feature sizes include the use of photo-patternable pastes and laser trimming.

One consideration with respect to patterning of conductors is cost. Non-vacuum, additive methods generally entail lower costs than vacuum and subtractive approaches. Some of these printing approaches utilize high viscosity flowable liquids. Screen-printing, for example, uses flowable mediums with viscosities of thousands of centipoise. At the other extreme, low viscosity compositions can be deposited by methods such as ink jet printing. However, low viscosity compositions are not as well developed as the high viscosity compositions.

Ink-jet printing of conductors has been explored, but the approaches to date have been inadequate for producing well-defined features with good electrical properties, particularly at relatively low temperatures.

There exists a need for compositions for the fabrication of conductive features for use in electronics, displays, and other applications. Further, there is a need for compositions that have low processing temperatures to allow deposition onto organic substrates and subsequent thermal treatment. It would also be advantageous if the compositions could be deposited with a fine feature size, such as not greater than about 100 µm, while still providing electronic features with adequate electrical and mechanical properties.

An advantageous metal nanoparticle composition and its associated deposition technique for the fabrication of electrically conductive features would combine a number of attributes. The conductive feature would have high conductivity, preferably close to that of the pure bulk metal. The processing temperature would be low enough to allow formation of conductors on a variety of organic substrates (polymers). The deposition technique would allow deposition onto surfaces that are non-planar (e.g., not flat). The conductor would also have good adhesion to the substrate. The composition would desirably be inkjet printable, allowing the introduction of cost-effective material deposition for production of devices such as flat panel displays (PDP, AMLCD, OLED). The composition would desirably also be flexo, gravure, or offset printable, again enabling lower cost and higher yield production processes as compared to screen printing.

Further, there is a need for electronic circuit elements and complete electronic circuits fabricated on inexpensive, thin and/or flexible substrates, such as paper, using high volume printing techniques such as reel-to-reel printing. Recent developments in organic thin film transistor (TFT) technology and organic light emitting device (OLED) technology have accelerated the need for complimentary circuit elements that can be written directly onto low cost substrates. Such elements include conductive interconnects, electrodes, conductive contacts and via fills.

BRIEF DESCRIPTION OF THE DRAWING

The FIGURE shows the basic principle of continuous feature ink-jet printing by adequate drop placement, taking into account various printing parameters, in accordance with an embodiment of the present invention.

SUMMARY OF THE INVENTION

The present invention is directed to metal nanoparticle compositions that can be deposited onto a substrate using, for example, direct-write methods such as ink-jet deposition. The metal nanoparticle compositions preferably exhibit a low processing (curing) temperature, thereby permitting the formation of electrically conductive features on a variety of substrates, including organic substrates. The metal nanoparticle compositions can be deposited onto a substrate and processed by heating and/or irradiation to form features with good electrical and/or mechanical properties.

In particular, the present invention provides a composition which is suitable for the fabrication of an electrically conductive feature by using a direct-write tool. The composition comprises metal nanoparticles which carry thereon a substance that is capable of substantially preventing an agglomeration of the nanoparticles (hereafter referred to as "anti-agglomeration substance") and a vehicle that is capable of forming a dispersion with the metal nanoparticles.

The present invention also provides a composition for the fabrication of a conductive feature by ink-jet printing, which composition comprises at least about 5 weight percent of metal nanoparticles which carry thereon an organic substance that is capable of substantially preventing an agglomeration of the nanoparticles, and a vehicle that comprises a mixture of organic solvents. The composition has a surface tension at 20 c of from about 20 dynes/cm to about 40 dynes/cm and a viscosity at 20° C. of from about 5 cP to about 15 cP.

The present invention also provides a composition for providing a substrate with a metal structure (e.g., a discrete feature, a metal layer, etc.). The composition comprises at least about 10 weight percent of substantially non-agglomerated metal nanoparticles which have adsorbed thereon a polymer, and a vehicle which comprises an organic solvent that is capable of dissolving the polymer. The composition has a surface tension at 20° C. of not higher than about 60 dynes/cm and a viscosity at 20° C. of not higher than about 30 cP.

The present invention further provides a composition for ink-jet printing, which composition comprises metal nanoparticles and is capable of being deposited on a substrate by ink-jet printing of the composition in not more than two passes (e.g., a single pass) of an ink-jet printing head as a line that can be rendered electrically conductive.

The present invention also provides a printed metallic feature which comprises a metal and a vinyl pyrrolidone polymer in a weight ratio of from about 100:1 to about 5:1.

Further, the present invention provides a substrate which has a metal structure thereon. The metal structure comprises voids that are at least partially filled with an organic polymer, e.g., a vinyl pyrrolidone polymer.

The present invention also provides a method for the fabrication of a conductive feature on a substrate, which method comprises forming the feature by applying a composition according to the present invention to the substrate and subjecting the feature to heat and/or radiation and/or pressure to render the feature electrically conductive.

The present invention also provides a method for the fabrication of a conductive feature on a substrate. The method comprises (a) depositing on the substrate a composition comprising (i) metal nanoparticles which carry thereon a substance that is capable of substantially preventing an agglomeration of the nanoparticles and (ii) a liquid vehicle that comprises a solvent that is capable of dissolving the agglomeration-preventing substance; and (b) converting the deposited composition to a conductive feature by subjecting it to heat and/or pressure and/or radiation.

The present invention also provides a further method for the fabrication of a conductive feature on a substrate. This method comprises (a) ink-jet printing on the substrate a composition comprising (i) at least about 10% by weight of substantially non-agglomerated silver nanoparticles which carry thereon a vinyl pyrrolidone polymer and (ii) a liquid vehicle; and (b) converting the printed composition to a conductive feature by subjecting the composition to heat and/or pressure and/or radiation.

The present invention also provides the use of a composition for the fabrication of an electrically conductive feature, wherein the composition comprises (a) metal nanoparticles which carry thereon a substance that is capable of substantially preventing an agglomeration of the nanoparticles and (b) a vehicle that is capable of forming a dispersion with the metal nanoparticles, the composition being suitable for the fabrication of an electrically conductive feature by using a direct-write tool.

The present invention also provides a security feature which comprises a metal and is both semi-transparent and reflective in the visible light range. In one embodiment, the security feature is ink-jet printed and may additionally be luminescent. In another embodiment, when the security feature is ink-jet printed, the feature is made by a process which comprises ink-jet printing a composition which comprises substantially non-agglomerated metal nanoparticles on a substrate.

The present invention also provides an optically variable security feature, wherein the security feature comprises a metal and is ink jet printed. In one embodiment, the feature is made by a process which comprises ink-jet printing a composition which comprises substantially non-agglomerated metal nanoparticles on a substrate.

The present invention also provides a security feature which comprises a metal pattern, wherein the metal pattern is made by a process which comprises ink-jet printing. In one embodiment, the metal pattern is made by a process which comprises ink-jet printing a composition which comprises substantially non-agglomerated metal nanoparticles on a substrate.

The present invention also provides an ink, comprising: liquid vehicle; and metallic nanoparticles in an amount greater than about 40 weight percent, based on the total weight of the ink.

The present invention also provides a process for making an ink-jet printable ink for the fabrication of electric and electronic devices. The process comprises combining metal nanoparticles which carry thereon an anti-agglomeration substance with at a liquid vehicle to form a dispersion having a nanoparticle concentration of at least about 5% by weight and a surface tension at 20° C. of from about 20 dynes/cm to about 60 dynes/cm and a viscosity at 20° C. of from about 3 cP to about 15 cP.

The metal nanoparticle compositions of the present invention can, for example, be utilized to form complex, high precision circuitry having good electrical properties. For example, the compositions and methods of the present invention can be utilized to form conductive features on a substrate, wherein the features have a feature size (i.e., average width of the smallest dimension) of not greater than about 200 micrometers (μm), e.g., not greater than about 150 μm, not greater than about 100 μm, not greater than about 75 μm, not greater than about 50 μm, or not greater than about 25 μm.

The electrically conductive features formed according to the present invention can have good electrical properties. By way of non-limiting example, they may have a resistivity that is not greater than about 30 times the resistivity of the pure bulk metal, e.g., not greater than about 20 times, not greater than about 10 times, not greater than about 5 times, or not greater than about 3 times the resistivity of the pure bulk metal.

The method for forming the electronic features according to the present invention can also involve a relatively low processing temperature (i.e., the minimum temperature that is required to impart electrical conductivity to a deposited composition). In one aspect, the processing temperature may be not greater than about 250° C., e.g., not greater than about 225° C., not greater than about 200° C., or not greater than about 185° C. In some aspects, the processing temperature may be not greater than about 150° C., e.g., not greater than about 125° C., or not greater than about 100° C.

DETAILED DESCRIPTION OF THE PRESENT INVENTION

Nanoparticles

The metal of the nanoparticles of the compositions of the present invention preferably is a metal which exhibits a low bulk resistivity such as, e.g., a bulk resistivity of less than about 15 micro-Ωcm, e.g., less than about 10 micro-Ωcm, or less than about 5 micro-Ωcm. Non-limiting examples of metals for use in the present invention include transition metals as well as main group metals such as, e.g., silver, gold, copper, nickel, cobalt, palladium, platinum, indium, tin, zinc, titanium, chromium, tantalum, tungsten, iron, rhodium, iridium, ruthenium, osmium and lead. Non-limiting examples of preferred metals for use in the present invention include silver, gold, copper, nickel, cobalt, rhodium, palladium and platinum. Silver, copper and nickel are particularly preferred metals for the purposes of the present invention. Silver is the most preferred metal.

The compositions of the present invention also may comprise mixtures of two or more different metal nanoparticles and/or may comprise nanoparticles wherein two or more metals are present in a single nanoparticle, for example, in the form of an alloy or a mixture of these metals. Non-limiting examples of alloys include Ag/Ni, Ag/Cu, Pt/Cu, Ru/Pt, Ir/Pt and Ag/Co. Also, the nanoparticles may have a core-shell structure made of two different metals such as, e.g., a core of silver and a shell of nickel (e.g. a silver core having a diameter of about 20 nm surrounded by an about 15 nm thick nickel shell).

The composition of the present invention may comprise metallic nanoparticles in an amount greater than about 50 weight percent, based on the total weight of the composition. In another embodiment, the composition of the present invention may comprise metallic nanoparticles in an amount greater than about 60 weight percent, based on the total weight of the composition. In yet another embodiment, the composition of the present invention may comprise metallic nanoparticles in an amount greater than about 40 weight percent and less than about 90 weight percent, based on the total weight of the composition. In still another embodiment, the composition of the present invention may comprise metallic nanoparticles in an amount from about 50 to about 80 weight percent, based on the total weight of the composition.

The anti-agglomeration substance that is present on the metal nanoparticles of the present invention is used to prevent a substantial agglomeration of the nanoparticles. Due to their small size and the high surface energy associated therewith, nanoparticles usually show a strong tendency to agglomerate and form larger secondary particles (agglomerates). The anti-agglomeration substance shields (e.g., sterically and/or through charge effects) the nanoparticles from each other to at least some extent and thereby substantially prevents a direct contact between individual nanoparticles. The anti-agglomeration substance is preferably adsorbed on the surface of the metal nanoparticles. The term "adsorbed" as used herein includes any kind of interaction between the anti-agglomeration substance and a nanoparticle surface (e.g., the metal atoms on the surface of a nanoparticle) that manifests itself in an at least (and preferably) weak bond between the anti-agglomeration substance and the surface of a nanoparticle. Preferably, the bond is a non-covalent bond, but still strong enough for the nanoparticle/anti-agglomeration substance combination to withstand a washing operation with a solvent that is capable of dissolving the anti-agglomeration substance. In other words, merely washing the metal nanoparticles with the solvent at room temperature will preferably not remove more than a minor amount (e.g., less than about 10%, less than about 5%, or less than about 1%) of the anti-agglomeration substance that is in intimate contact with (and (weakly) bonded to) the nanoparticle surface. Of course, any anti-agglomeration substance that is not in intimate contact with a nanoparticle surface but merely accompanies the bulk of the nanoparticles (e.g., as an impurity/contaminant), i.e., without any significant interaction therewith, will preferably be removable from the nanoparticles by washing the latter with a solvent for the anti-agglomeration substance.

The anti-agglomeration substance does not have to be present as a continuous coating (shell) on the entire surface of a metal nanoparticle. Rather, in order to prevent a substantial agglomeration of the nanoparticles it will often be sufficient for the anti-agglomeration substance to be present on only a part of the surface of a metal nanoparticle.

While the anti-agglomeration substance will usually be a single substance or at least comprise two or more substances of the same type, the present invention also contemplates the use of two or more different types of anti-agglomeration substances. For example, a mixture of two or more different low molecular weight compounds or a mixture of two or more different polymers may be used, as well as a mixture of one or more low molecular weight compounds and one or more polymers. The term "anti-agglomeration substance" as used herein includes all of these possibilities.

A preferred and non-limiting example of an anti-agglomeration substance for use in the present invention includes a substance that is capable of electronically interacting with a metal atom of a nanoparticle. Usually, a substance that is capable of this type of interaction will comprise one or more atoms (e.g., one or two atoms) with one or more free electron pairs such as, e.g., oxygen, nitrogen and sulfur. Particularly preferred anti-agglomeration substances comprise one or two O and/or N atoms (per monomer unit in the case of a polymer). The atoms with a free electron pair will usually be present in the substance in the form of a functional group such as, e.g., a hydroxy group, a carbonyl group, an ether group and an amino group, or as a constituent of a functional group that comprises one or more of these groups as a structural element thereof. Non-limiting examples of functional groups include —COO—, —O—CO—O—, —CO—O—CO—, —C—O—C—, CONR—, —NR—CO—O—, —NR$^1$—CO—NR$^2$—, —CO—NR—CO—, —SO$_2$—NR— and —SO$_2$—O—, wherein R, R$^1$ and R$^2$ each independently represent hydrogen or an organic radical (e.g., an aliphatic or aromatic, unsubstituted or substituted radical comprising from about 1 to about 20 carbon atoms). Such functional groups may comprise the above (and other) structural elements as part of a cyclic structure (e.g., in the form of a cyclic ester, amide, anhydride, imide, carbonate, urethane, urea, and the like).

The anti-agglomeration substance may be inorganic or organic and may comprise a low molecular weight compound, preferably a low molecular weight organic compound, e.g., a compound having a molecular weight of not higher than about 500, more preferably not higher than about 300, and/or may comprise an oligomeric or polymeric, preferably organic compound having a (weight average) molecular weight of a least about 1,000, for example, at least about 3,000, at least about 5,000, or at least about 8,000, but preferably not higher than about 500,000, e.g., not higher than about 200,000, or not higher than about 100,000. By way of non-limiting example, in the case of polyvinylpyrrolidone, which is a non-limiting example of a preferred anti-agglomeration substance for use in the present invention, the preferred weight average molecular weight is in the range of from about 3,000 to about 60,000 and a particularly preferred average molecular weight is about 10,000.

In general, it is preferred for the anti-agglomeration substance to have a total of at least about 10 atoms per molecule which are selected from C, N and O, e.g., at least about 20 such atoms or at least about 50 such atoms. More preferably, the anti-agglomeration substance has a total of at least about 100 C, N and O atoms per molecule, e.g., at least about 200, at least about 300, or at least about 400 C, N and O atoms per molecule. In the case of polymers these numbers refer to the average per polymer molecule.

Non-limiting examples of the low molecular weight anti-agglomeration substance for use in the present invention include fatty acids, in particular, fatty acids having at least about 8 carbon atoms. Non-limiting examples of oligomers/polymers for use as the anti-agglomeration substance in the process of the present invention include homo- and copolymers (including polymers such as, e.g., random copolymers, block copolymers and graft copolymers) which comprise units of at least one monomer which comprises one or more O atoms and/or one or more N atoms. A non-limiting class of preferred polymers for use as anti-agglomeration substance in the present invention are polymers that form a dative bond to the metal nanoparticle surface. Such a dative bond is advantageously weak enough to break during heating after the nanoparticles have been applied to a substrate (e.g., by ink-jet printing). Thereby this dative bond will enable the nanoparticles to neck and form a conductive network, without the need to remove the polymer form the printed layer by combustion or volatilization. Another non-limiting class of preferred polymers for use in the present invention (which overlaps with the former class of preferred polymers) is constituted by polymers which comprise at least one monomer unit which includes at least two atoms which are selected from O and N atoms. Corresponding monomer units may, for example, comprise at least one hydroxyl group, carbonyl group, ether linkage and/or amino group and/or one or more structural elements of formula —COO—, —O—CO—O—, —CO—O—CO—, —C—O—C—, —CONR—, —NR—CO—O—, —NR$^1$—CO—NR$^2$—, —SO$_2$—NR— and —SO$_2$—O—, wherein R, R$^1$ and R$^2$ each independently represent hydrogen or an organic radical (e.g., an aliphatic or aromatic, unsubstituted or substituted radical comprising from about 1 to about 20 carbon atoms).

Non-limiting examples of corresponding polymers include polymers which comprise one or more units derived from the following groups of monomers:

(a) monoethylenically unsaturated carboxylic acids of from about 3 to about 8 carbon atoms and salts thereof. This group of monomers includes, for example, acrylic acid, methacrylic acid, dimethylacrylic acid, ethacrylic acid, maleic acid, citraconic acid, methylenemalonic acid, allylacetic acid, vinylacetic acid, crotonic acid, fumaric acid, mesaconic acid and itaconic acid. The monomers of group (a) can be used either in the form of the free carboxylic acids or in partially or completely neutralized form. For the neutralization alkali metal bases, alkaline earth metal bases, ammonia or amines, e.g., sodium hydroxide, potassium hydroxide, sodium carbonate, potassium carbonate, sodium bicarbonate, magnesium oxide, calcium hydroxide, calcium oxide, ammonia, triethylamine, methanolamine, diethanolamine, triethanolamine, morpholine, diethylenetriamine or tetraethylenepentamine may, for example, be used;

(b) the esters, amides, anhydrides and nitriles of the carboxylic acids stated under (a) such as, e.g., methyl acrylate, ethyl acrylate, methyl methacrylate, ethyl methacrylate, n-butyl acrylate, hydroxyethyl acrylate, 2- or 3-hydroxypropyl acrylate, 2- or 4-hydroxybutyl acrylate, hydroxyethyl methacrylate, 2- or 3-hydroxypropyl methacrylate, hydroxyisobutyl acrylate, hydroxyisobutyl methacrylate, monomethyl maleate, dimethyl maleate, monoethyl maleate, diethyl maleate, maleic anhydride, 2-ethylhexyl acrylate, 2-ethylhexyl methacrylate, acrylamide, methacrylamide, N,N-dimethylacrylamide, N-tert-butylacrylamide, acrylonitrile, methacrylonitrile, 2-dimethylaminoethyl acrylate, 2-dimethylaminoethyl methacrylate, 2-diethylaminoethyl acrylate, 2-diethylaminoethyl methacrylate and the salts of the last-mentioned monomers with carboxylic acids or mineral acids and the quaternized products;

(c) acrylamidoglycolic acid, vinylsulfonic acid, allylsulfonic acid, methallylsulfonic acid, styrenesulfonic acid, 3-sulfopropyl acrylate, 3-sulfopropyl methacrylate and acrylamidomethylpropanesulfonic acid and monomers containing phosphonic acid groups, such as, e.g., vinyl phosphate, allyl phosphate and acrylamidomethylpropanephosphonic acid; and esters, amides and anhydrides of these acids;

(d) N-vinyllactams such as, e.g., N-vinylpyrrolidone, N-vinyl-2-piperidone and N-vinylcaprolactam;

(e) vinyl acetal, vinyl butyral, vinyl alcohol and ethers and esters thereof (such as, e.g., vinyl acetate; vinyl propionate and methylvinylether), allyl alcohol and ethers and esters thereof, N-vinylimidazole, N-vinyl-2-methylimidazoline, and the hydroxystyrenes.

Corresponding polymers may also contain additional monomer units, for example, units derived from monomers without functional group, halogenated monomers, aromatic monomers etc. Non-limiting examples of such monomers include olefins such as, e.g., ethylene, propylene, the butenes, pentenes, hexenes, octenes, decenes and dodecenes, styrene, vinyl chloride, vinylidene chloride, tetrafluoroethylene, etc. Further, the polymers for use as adsorptive substance in the process of the present invention are not limited to addition polymers, but also comprise other types of polymers, for example, condensation polymers such as, e.g., polyesters, polyamides, polyurethanes and polyethers, as well as polysaccharides such as, e.g., starch, cellulose and derivatives thereof, etc.

Other non-limiting examples of polymers which are suitable for use as anti-agglomeration substance in the present invention are disclosed in e.g., U.S. Patent Application Publication 2004/0182533 A1, the entire disclosure whereof is expressly incorporated by reference herein.

Preferred polymers for use as anti-agglomeration substance in the present invention include those which comprise units derived from one or more N-vinylcarboxamides of formula (I)

$$CH_2=CH-NR^3-CO-R^4 \qquad (I)$$

wherein $R^3$ and $R^4$ each independently represent hydrogen, optionally substituted alkyl (including cycloalkyl) or optionally substituted aryl (including alkaryl and aralkyl) or heteroaryl (e.g., $C_{6-20}$ aryl such as phenyl, benzyl, tolyl and phenethyl, and $C_{4-20}$ heteroaryl such as pyrrolyl, furyl, thienyl and pyridinyl).

$R^3$ and $R^4$ may, e.g., independently represent hydrogen or $C_{1-12}$ alkyl, particularly $C_{1-6}$ alkyl such as methyl and ethyl. $R^3$ and $R^4$ together may also form a straight or branched chain containing from about 2 to about 8, preferably from about 3 to about 6, particularly preferably from about 3 to about 5 carbon atoms, which chain links the N atom and the C atom to which $R^3$ and $R^4$ are bound to form a ring which preferably has about 4 to about 8 ring members. Optionally, one or more carbon atoms may be replaced by heteroatoms such as, e.g., oxygen, nitrogen or sulfur. Also optionally, the ring may contain a carbon-carbon double bond.

Non-limiting specific examples of $R^3$ and $R^4$ are methyl, ethyl, isopropyl, .n-propyl, n-butyl, isobutyl, sec-butyl, tert-butyl, n-hexyl, n-heptyl, 2-ethylhexyl, n-octyl, n-decyl, n-undecyl, n-dodecyl, n-tetradecyl, n-hexadecyl, n-octadecyl and n-eicosyl. Non-limiting specific examples of $R^3$ and $R^4$ which together form a chain are 1,2-ethylene, 1,2-propylene, 1,3-propylene, 2-methyl-1,3-propylene, 2-ethyl-1,3-propylene, 1,4-butylene, 1,5-pentylene, 2-methyl-L5-pentylene, 1,6-hexylene and 3-oxa-1,5-pentylene.

Non-limiting specific examples of N-vinylcarboxamides of formula (I) are N-vinylformamide, N-vinylacetamide, N-vinylpropionamide, N-vinylbutyramide, N-vinylisobutyramide, N-vinyl-2-ethylhexanamide, N-vinyldecanamide, N-vinyldodecanamide, N-vinylstearamide, N-methyl-N-vinylformamide, N-methyl-N-vinylacetamide, N-methyl-N- vinylpropionamide, N-methyl-N-vinylbutyramide, N-methyl-N-vinylisobutyramide, N-methyl-N-vinyl-2-ethylhexanamide, N-methyl-N-vinyldecanamide, N-methyl-N-vinyldodecanamide, N-methyl-N-vinylstearamide, N-ethyl-N-vinylformamide, N-ethyl-N-vinylacetamide, N-ethyl-N-vinylpropionamide, N-ethyl-N-vinylbutyramide, N-ethyl-N-vinylisobutyramide, N-ethyl-N-vinyl-2-ethylhexanamide, N-ethyl-N-vinyldecanamide, N-ethyl-N-vinyldodecanamide, N-ethyl-N-vinylstearamide, N-isopropyl-N-vinylformamide, N-isopropyl-N-vinylacetamide, N-isopropyl-N-vinylpropionamide, N-isopropyl-N-vinylbutyramide, N-isopropyl-N-vinylisobutyramide, N-isopropyl-N-vinyl-2-ethylhexanamide, N-isopropyl-N-vinyldecanamide, N-isopropyl-N-vinyldodecanamide, N-isopropyl-N-vinylstearamide, N-n-butyl-N-vinylformamide, N-n-butyl-N-vinylacetamide, N-n-butyl-N-vinylpropionamide, N-n-butyl-N-vinylbutyramide, N-n-butyl-N-vinylisobutyramide, N-n-butyl-N-vinyl-2-ethylhexanamide, N-n-butyl-N-vinyldecanamide, N-n-butyl-N-vinyldodecanamide, N-n-butyl-N-vinylstearamide, N-vinylpyrrolidone, N-vinyl-2-piperidone and N-vinylcaprolactam.

Particularly preferred polymers for use as anti-agglomeration substance in the present invention include polymers which comprise monomer units of one or more unsubstituted or substituted N-vinyllactams, preferably those having from about 4 to about 8 ring members such as, e.g., N-vinylcaprolactam, N-vinyl-2-piperidone and N-vinylpyrrolidone. These polymers include homo- and copolymers. In the case of copolymers (including, for example, random, block and graft copolymers), the N-vinyllactam (e.g., N-vinylpyrrolidone) units are preferably present in an amount of at least about 10 mole-%, e.g., at least about 30 mole-%, at least about 50 mole-%, at least about 70 mole-%, at least about 80 mole-%, or at least about 90 mole-%. By way of non-limiting-example, the comonomers may comprise one or more of those mentioned in the preceding paragraphs, including monomers without functional group (e.g., ethylene, propylene, styrene, etc.), halogenated monomers, etc.

If the vinyllactam (e.g., vinylpyrrolidone) monomers (or at least a part thereof) carry one or more substituents on the heterocyclic ring, non-limiting examples of such substituents include alkyl groups (for example, alkyl groups having from 1 to about 12 carbon atoms, e.g., from 1 to about 6 carbon atoms such as, e.g., methyl, ethyl, propyl and butyl), alkoxy groups (for example, alkoxy groups having from 1 to about 12 carbon atoms, e.g., from 1 to about 6 carbon atoms such as, e.g., methoxy, ethoxy, propoxy and butoxy), halogen atoms (e.g., F, Cl and Br), hydroxy, carboxy and amino groups (e.g., dialkylamino groups such as dimethylamino and diethylamino) and any combinations of these substituents.

Non-limiting specific examples of vinyllactam polymers for use in the present invention include homo- and copolymers of vinylpyrrolidone which are commercially available from, e.g., International Specialty Products (www.ispcorp.com). In particular, these polymers include
(a) vinylpyrrolidone homopolymers such as, e.g., grades K-15 and K-30 with K-value ranges of from 13-19 and 26-35, respectively, corresponding to average molecular weights (determined by GPC/MALLS) of about 10,000 and about 67,000;
(b) alkylated polyvinylpyrrolidones such as, e.g., those commercially available under the trade mark GANEX® which are vinylpyrrolidone-alpha-olefin copolymers that contain most of the alpha-olefin (e.g., about 80% and more) grafted onto the pyrrolidone ring, mainly in the 3-position thereof; the alpha-olefins may comprise those having from about 4 to about 30 carbon atoms; the alpha-olefin content of these copolymers may, for example, be from about 10% to about 80% by weight;
(c) vinylpyrrolidone-vinylacetate copolymers such as, e.g., random copolymers produced by a free-radical polymerization of the monomers in a molar ratio of from about 70/30 to about 30/70 and having weight average molecular weights of from about 14,000 to about 58,000;
(d) vinylpyrrolidone-dimethylaminoethylmethacrylate copolymers;
(e) vinylpyrrolidone-methacrylamidopropyl trimethylammonium chloride copolymers such as, e.g., those commercially available under the trade mark GAFQUAT®;
(f) vinylpyrrolidone-vinylcaprolactam-dimethylaminoethylmethacrylate terpolymers such as, e.g., those commercially available under the trade mark GAFFIX®;
(g) vinylpyrrolidone-styrene copolymers such as, e.g., those commercially available under the trade mark POLECTRON®; a specific example thereof is a graft emulsion copolymer of about 70% vinylpyrrolidone and about 30% styrene polymerized in the presence of an anionic surfactant;
(h) vinylpyrrolidone-acrylic acid copolymers such as, e.g., those commercially available under the trade mark ACRYLIDONE® which are produced in the molecular weight range of from about 80,000 to about 250,000.

The weight ratio of metal in the metal nanoparticles and anti-agglomeration substance(s) carried thereon can vary over a wide range. The most advantageous ratio depends, inter alia, on factors such as the nature of the anti-agglomeration substance (polymer, low molecular weight substance, etc.) and the size of the metal cores of the nanoparticles (the smaller the size the higher the total surface area thereof and the higher the amount of anti-agglomeration substance that will desirably be present). Usually, the weight ratio will be not higher than about 100:1, e.g., not higher than about 50:1, or not higher than about 30:1. On the other hand, the weight ratio will usually be not lower than about 5:1, e.g., not lower than about 10:1, not lower than about 15:1, or not lower than about 20:1.

Metal nanoparticles suitable for use in the present invention can be produced by a number of methods. A non-limiting example of such a method, commonly known as the polyol process, is disclosed in U.S. Pat. No. 4,539,041. A modification of this method is described in, e.g., P.-Y. Silvert et al., "Preparation of colloidal silver dispersions by the polyol process" Part 1-Synthesis and characterization, J. Mater. Chem., 1996, 6(4), 573-577; Part 2—Mechanism of particle formation, J. Mater. Chem., 1997, 7(2), 293-299. The entire disclosures of these documents are expressly incorporated by reference herein. Briefly, in the polyol process a metal compound is dissolved in, and reduced by a polyol such as, e.g., a glycol at elevated temperature to afford corresponding metal particles. In the modified polyol process the reduction is carried out in the presence of a dissolved polymer, i.e., polyvinylpyrrolidone.

A particularly preferred modification of the polyol process for producing metal nanoparticles which carry an anti-agglomeration substance such as polyvinylpyrrolidone thereon is described in U.S. Provisional Application Ser. Nos. 60/643,578 and 60/643,629 entitled "Production of Metal Nanoparticles," and "Separation of Metal Nanoparticles," respectively, the entire disclosures of which are expressly incorporated by reference herein. In a preferred aspect of this modified process, a dissolved metal compound (e.g.; a silver compound such as silver nitrate) is combined with and reduced by a polyol (e.g., ethylene glycol, propylene glycol and the like) at an elevated temperature (e.g., at about 120° C.)

and in the presence of a heteroatom containing polymer (e.g., polyvinylpyrrolidone) which serves as anti-agglomeration substance.

According to a preferred aspect of the present invention, the metal nanoparticles exhibit a narrow particle size distribution. A narrow particle size distribution is particularly advantageous for direct-write applications because it results in a reduced clogging of the orifice of a direct-write device by large particles and provides the ability to form features having a fine line width, high resolution and high packing density.

The metal nanoparticles for use in the present invention preferably also show a high degree of uniformity in shape. Preferably, the metal nanoparticles for use in the compositions of the present invention are substantially spherical in shape. Spherical particles are particularly advantageous because they are able to disperse more readily in a liquid suspension and impart advantageous flow characteristics to the metal nanoparticle composition, particularly for deposition using an ink-jet device or similar tool. For a given level of solids loading, a low viscosity metal nanoparticle composition having spherical particles will have a lower viscosity than a composition having non-spherical particles, such as flakes. Spherical particles are also less abrasive than jagged or plate-like particles, reducing the amount of abrasion and wear on the deposition tool.

In a preferred aspect of the present invention, at least about 90%, e.g., at least about 95%, or at least about 99% of the metal nanoparticles comprised in the present compositions are substantially spherical in shape. In another preferred aspect, the metal nanoparticle compositions are substantially free of particles in the form of flakes.

In yet another preferred aspect, the particles are substantially free of micron-size particles, i.e., particles having a size of about 1 micron or above. Even more preferably, the nanoparticles may be substantially free of particles having a size (=largest dimension, e.g., diameter in the case of substantially spherical particles) of more than about 500 nm, e.g., of more than about 200 nm, or of more than about 100 nm. In this regard, it is to be understood that whenever the size and/or dimensions of the metal nanoparticles are referred to herein and in the appended claims, this size and these dimensions refer to the nanoparticles without anti-agglomeration substance thereon, i.e., the metal cores of the nanoparticles. Depending on the type and amount of anti-agglomeration substance, an entire nanoparticle, i.e., a nanoparticle which has the anti-agglomeration substance thereon, may be significantly larger than the metal core thereof. Also, the term "nanoparticle" as used herein and in the appended claims encompasses particles having a size/largest dimension of the metal cores thereof of up to about 900 nm, preferably of up to about 500 nm, more preferably up to about 200 nm, or up to about 100 nm.

By way of non-limiting example, not more than about 5%, e.g., not more than about 2%, not more than about 1%, or not more than about 0.5% of the metal nanoparticles may be particles whose largest dimension (and/or diameter) is larger than about 200 nm, e.g., larger than about 150 nm, or larger than about 100 nm. In a particularly preferred aspect, at least about 90%, e.g., at least about 95%, of the metal nanoparticles will have a size of not larger than about 80 nm and/or at least about 80% of the metal nanoparticles will have a size of from about 20 nm to about 70 nm. For example, at least about 90%, e.g., at least about 95% of the nanoparticles may have a size of from about 30 nm to about 50 nm.

In another aspect, the metal nanoparticles may have an average particle size (number average) of at least about 10 nm, e.g., at least about 20 nm, or at least about 30 nm, but preferably not higher than about 80 nm, e.g., not higher than about 70 nm, not higher than about 60 nm, or not higher than about 50 nm. For example, the metal nanoparticles may have an average particle size in the range of from about 25 nm to about 75 nm.

In yet another aspect of the present invention, at least about 80 volume percent, e.g., at least about 90 volume percent of the metal nanoparticles may be not larger than about 2 times, e.g., not larger than about 1.5 times the average particle size (volume average).

As indicated above, nanoparticles may form agglomerates as a result of their relatively high surface energies, as compared to larger particles. Even in the presence of the anti-agglomeration substance the compositions of the present invention may contain a minor amount of agglomerates in the form of soft agglomerates, particularly after storage for extended periods of time. However it is known that such soft agglomerates may be dispersed easily by treatments such as exposure to ultrasound in a liquid medium, sieving, high shear mixing and 3-roll milling.

The average particle sizes and particle size distributions described herein may be measured by mixing samples of the powders in a liquid medium and exposing the resultant suspension to ultrasound through either an ultrasonic bath or horn. The ultrasonic treatment supplies sufficient energy to disperse the soft agglomerates into primary particles. The primary particle size and size distribution may then be measured by, e.g., SEM or TEM. Thus, the references to particle size herein refer to the primary particle size, such as after lightly dispersing soft agglomerates of the particles.

The nanoparticles that are useful in metal nanoparticle compositions according to the present invention preferably have a high degree of purity. For example, the particles (without anti-agglomeration substance) may include not more than about 1 atomic percent impurities, e.g., not more than about 0.1 atomic percent impurities, preferably not more than about 0.01 atomic percent impurities. Impurities are those materials that are not intended in the final product (e.g., the conductive feature) and that adversely affect the properties of the final product. For many electronic applications, the most critical impurities to avoid are Na, K, Cl, S and F.

The metal nanoparticles carrying an anti-agglomeration substance thereon for use in to the present invention may, of course, also be produced by processes which are different from the (modified) polyol process referred to above. By way of non-limiting example, particles coated with an anti-agglomeration substance may be produced by a spray pyrolysis process. One or more coating precursors can vaporize and fuse to the hot nanoparticle surface and thermally react resulting in the formation of a thin film coating by chemical vapor deposition (CVD). Preferred coatings deposited by CVD include metal oxides. Further, the coating can be formed by physical vapor deposition (PVD) wherein a coating material physically deposits on the surface of the particles. Preferred coatings deposited by PVD include organic materials. Alternatively, a gaseous coating precursor can react in the gas phase forming small particles, for example, less than about 5 nanometers in size, which then diffuse to the larger metal nanoparticle surface and sinter onto the surface, thus forming a coating. This method is referred to as gas-to-particle conversion (GPC). Another possible surface coating method is surface conversion of the particles by reaction with a vapor phase reactant to convert the surface of the nanoparticles to a different material than that originally contained in the particles.

In another aspect, the metal nanoparticles can be coated with an intrinsically conductive polymer (which at the same time may serve as an anti-agglomeration substance), preventing agglomeration in the composition and providing a conductive patch after solidification of the composition.

Vehicle

The vehicle for use in the compositions of the present invention is preferably a liquid which is capable of stably dispersing the metal nanoparticles carrying the anti-agglomeration substance thereon, e.g., are capable of affording a dispersion that can be kept at room temperature for several days or even one, two, three weeks or months or even longer without substantial agglomeration and/or settling of the metal nanoparticles. To this end, it is preferred for the vehicle and/or individual components thereof to be compatible with the surface of the nanoparticles, e.g., to be capable of interacting (e.g., electronically and/or sterically and/or by hydrogen bonding and/or dipole-dipole interaction, etc.) with the surface of the nanoparticles and in particular, with the anti-agglomeration substance.

It is particularly preferred for the vehicle to be capable of dissolving the anti-agglomeration substance to at least some extent, for example, in an amount (at 20° C.) of at least about 5 g of anti-agglomeration substance per liter of vehicle, particularly in an amount of at least about 10 g of anti-agglomeration substance, e.g., at least about 15 g, or at least about 20 g per liter of vehicle, preferably in an amount of at least about 100 g, or at least about 200 g per liter of vehicle. In this regard, it is to be appreciated that these preferred solubility values are merely a measure of the compatibility between the vehicle and the anti-agglomeration substance. They are not to be construed as indication that in the compositions of the present invention the vehicle is intended to actually dissolve the anti-agglomeration substance and remove it from the surface of the nanoparticles. On the contrary, the vehicle will usually not remove the anti-agglomeration substance from the surface of the nanoparticles to more than a minor extent, if at all.

In view of the preferred interaction between the vehicle and/or individual components thereof and the anti-agglomeration substance on the surface of the nanoparticles, the most advantageous vehicle and/or component thereof for a composition according to the present invention is largely a function of the nature of the anti-agglomeration substance. For example, an anti-agglomeration substance which comprises one or more polar groups such as, e.g., a polymer like polyvinylpyrrolidone will advantageously be combined with a vehicle which comprises (or predominantly consists of) one or more polar components (solvents) such as, e.g., a protic solvent, whereas an anti-agglomeration substance which substantially lacks polar groups will preferably be combined with a vehicle which comprises, at least predominantly, aprotic, non-polar components.

Particularly if the compositions of the present invention are intended for use in direct-write applications such as, e.g., ink-jet printing, the vehicle is preferably selected to also satisfy the requirements imposed by the direct-write method and tool such as, e.g., an ink-jet head, particularly in terms of viscosity and surface tension of the composition. These requirements are discussed in more detail further below. Another consideration in this regard is the compatibility of the nanoparticle composition with the substrate in terms of, e.g., wetting behavior (contact angle with the substrate).

In a preferred aspect, the vehicle of a composition according to the present invention may comprise a mixture of at least two solvents, preferably at least two organic solvents, e.g., a mixture of at least three organic solvents, or at least four organic solvents. The use of more than one solvent is preferred because it allows, inter alia, to adjust various properties of a composition simultaneously (e.g., viscosity, surface tension, contact angle with intended substrate etc.) and to bring all of these properties as close to the optimum values as possible.

The solvents comprised in the vehicle may be polar or non-polar or a mixture of both, mainly depending on the nature of the anti-agglomeration substance. The solvents should preferably be miscible with each other to a significant extent. Non-limiting examples of solvents that are useful for the purposes of the present invention include alcohols, polyols, amines, amides, esters, acids, ketones, ethers, water, saturated hydrocarbons, and unsaturated hydrocarbons.

Particularly in the case of an anti-agglomeration substance which comprises one or more heteroatoms which are available for hydrogen bonding, ionic interactions, etc. (such as, e.g., O and N), it is advantageous for the vehicle of a composition according to the present invention to comprise one or more polar solvents and, in particular, protic solvents. For example, the vehicle may comprise a mixture of at least two protic solvents, or at least three protic solvents. Non-limiting examples of such protic solvents include alcohols (e.g., aliphatic and cycloaliphatic alcohols having from 1 to about 12 carbon atoms such as, e.g., methanol, ethanol, n-propanol, isopropanol, 1-butanol, 2-butanol, sek.-butanol, tert-butanol, the pentanols, the hexanols, the octanols, the decanols, the dodecanols, cyclopentanol, cyclohexanol, and the like), polyols (e.g., alkanepolyols having from 2 to about 12 carbon atoms and from 2 to about 4 hydroxy groups such as, e.g., ethylene glycol, propylene glycol, butylene glycol, 1,3-propanediol, 1,3-butanediol, 1,4-butanediol, 2-methyl-2,4-pentanediol, glycerol, trimethylolpropane, pentaerythritol, and the like), polyalkylene glycols (e.g., polyalkylene glycols comprising from about 2 to about 5 $C_{2-4}$ alkylene glycol units such as, e.g., diethylene glycol, triethylene glycol, tetraethylene glycol, dipropylene gycol, tripropylene glycol and the like) and partial ethers and esters of polyols and polyalkylene glycols (e.g., mono($C_{1-6}$ alkyl)ethers and monoesters of the polyols and polyalkylene glycols with $C_{1-6}$ alkanecarboxylic acids, such as, e.g., ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether and diethylene glycol monobutyl ether (DEGBE), ethylene gycol monoacetate, diethylene glycol monoacetate, and the like).

In one aspect of the composition of the present invention, the vehicle may comprise at least two solvents, e.g., at least three solvents, which solvents are preferably selected from $C_{2-4}$ alkanols, $C_{2-4}$ alkanediols and glycerol. For example, the vehicle may comprise ethanol, ethylene glycol and glycerol such as, e.g., from about 35% to about 45% by weight of ethylene glycol, from about 30% to about 40% by weight of ethanol and from about 20% to about 30% by weight of glycerol, based on the total weight of the vehicle. In a preferred aspect, the vehicle may comprise about 40% by weight of ethylene glycol, about 35% by weight of ethanol and about 25% by weight of glycerol.

In another aspect of the composition of the present invention, the vehicle may comprise a $C_{1-4}$ monoalkyl ether of a $C_{2-4}$ alkanediol and/or of a polyalkylene glycol.

In yet another aspect, the vehicle may comprise not more than about 5 weight percent of water, e.g., not more than about 2 weight percent, or not more than about 1 weight percent of water, based on the total weight of the vehicle. For example, the vehicle may be substantially anhydrous.

Non-limiting further examples of organic solvents that may advantageously be used as the vehicle or a component thereof, respectively, of the compositions of the present invention include N,N-dimethylformamide, N,N-dimethylacetamide, ethanolamine, diethanolamine, triethanolamine, trihydroxymethylaminomethane, 2-(isopropylamino)-ethanol, 2-pyrrolidone, N-methylpyrrolidone, acetonitrile, the terpineols, ethylene diamine, benzyl alcohol, isodecanol, nitrobenzene and nitrotoluene.

As discussed in more detail below, when selecting a solvent combination for the vehicle of the composition of the present invention, it is desirable to also take into account the requirements, if any, imposed by the deposition tool (e.g., in terms of viscosity and surface tension of the composition) and the surface characteristics (e.g., hydrophilic or hydrophobic) of the intended substrate. In the case of preferred compositions of the present invention, particularly those intended for ink-jet printing with a piezo head, the preferred viscosity thereof (measured at 20° C.) is not lower than about 5 cP, e.g., not lower than about 8 cP, or not lower than about 10 cP, and not higher than about 30 cP, e.g., not higher than about 20 cP, or not higher than about 15 cP. Preferably, the viscosity shows only small temperature dependence in the range of from about 20° C. to about 40° C., e.g., a temperature dependence of not more than about 0.4 cP/° C. It has surprisingly been found that in the case of preferred vehicles for use in the present invention the presence of metal nanoparticles does not significantly change the viscosity of the vehicle, at least at relatively low loadings such as, e.g., up to about 20 weight percent. This may in part be due to the usually large difference in density between the vehicle and the nanoparticles which manifests itself in a much lower number of particles than the number of particles that the mere weight percentage thereof would suggest.

Further, the above preferred compositions of the present invention exhibit preferred surface tensions (measured at 20° C.) of not lower than about 20 dynes/cm, e.g., not lower than about 25 dynes/cm, or not lower than about 30 dynes/cm, and not higher than about 40 dynes/cm, e.g., not higher than about 35 dynes/cm.

In other embodiments, the composition of the present invention comprises water. The composition of the present invention may comprise up to 50% by weight of water. In one embodiment, the composition of the present invention may comprise from about 30% to about 50% by weight water; from about 45% to about 48% by weight water; or from about 30% to about 48% by weight water.

Optional Additives

Additives may optionally be present in the metal nanoparticle compositions of the present invention. Non-limiting examples of such additives will be discussed below. If the compositions of the present invention are intended for use in the production of conductive materials it should be taken into account that additives will in many cases have an adverse effect on the conductivity of the final material, in particular, if they can be removed from the material only with difficulty (e.g., by decomposition with the application of high temperatures) or not at all. Therefore it will usually be desirable to keep the amount of conductivity-impairing additives at a minimum in these cases. Of course, if the composition of the present invention is intended for a non-electrical use (for example, if the composition is to be used for decorative purposes, graphic applications, mirror applications etc.), the selection of the types and amounts of additives will not be influenced by considerations relating to conductivity.

The metal nanoparticle compositions of the present invention may include an adhesion promoter for improving the adhesion of the metal (e.g., conductive feature) to the underlying substrate. It has been found that metal structures made from the compositions according to the present invention show a satisfactory to excellent adhesion to various substrates without the presence of adhesion promoters. For example, in the case of preferred compositions such as those which comprise metal nanoparticles and in particular, silver nanoparticles and polyvinylpyrrolidone as anti-agglomeration substance it has been found that the anti-agglomeration substance itself may act as adhesion promoter, especially in the case of polymeric substrates. Further, the adhesive strength may be dependent, inter alia, on the processing temperature of the deposited composition. Particularly, even in the absence of separately added adhesion promoter the preferred compositions of the present invention have been found to exhibit very good adhesion to FR4 (glass fibers impregnated with epoxy resin) substrates when processed (cured) in the temperature range of from about 100° C. to about 180° C., satisfactory to very good adhesion to Mylar® substrates in the temperature range of from about 100° C. to about 180° C., satisfactory adhesion to Kapton® substrates at temperatures of about 200° C. and higher, and to glass substrates at temperatures of about 350° C. and higher. Good to excellent adhesion to ITO substrates has been observed at temperatures of about 350° C. and higher.

Especially in the case of glass surfaces the adhesion of silver nanoparticle compositions according to the present invention can be (significantly) improved by the addition of an adhesion promoter. Non-limiting examples of adhesion promoters for use in the present invention (with silver and other metals which would benefit from the use of an adhesion promoter) include metals as well as metal compounds which are oxides or can be converted to oxides by thermal decomposition, oxidation in an oxygen containing atmosphere, etc. Non-limiting examples of metals for the adhesion promoter include B, Si, Pb, Cu, Zn, Ni and Bi. Especially in the case of a glass substrate, a low melting point glass is yet another example of a suitable adhesion promoter. A specific example of a preferred adhesion promoter is bismuth nitrate (which decomposes to form bismuth oxide at a temperature of about 260° C.). By way of non-limiting example, an atomic ratio Ag:Bi in the range of from about 15:1 to about 7:1 may be particularly advantageous. The addition of bismuth nitrate results in a consistently good adhesion of deposited silver to glass surfaces over the entire tested temperature range of from about 100° C. to about 550° C.

In the case of, e.g., nickel, on the other hand, the adhesion to glass substrates is good even without the presence of an adhesion promoter. This may be due to the formation of nickel oxide during the thermal processing of a deposited nickel nanoparticle composition of the present invention.

Of course, in addition to bismuth nitrate and the other adhesion promoters mentioned above, there is a variety of other adhesion promoters that can afford desirable results when added to the compositions of the present invention. The effectiveness of a given adhesion promoter will usually depend, inter alia, on the metal of the nanoparticle, the substrate, the processing temperature, etc. The adhesion promoter is preferably soluble in the vehicle of the composition of the present invention but may also be present in the form of, e.g., ultrafine particles that are dispersed in the liquid vehicle. In other words, adhesion promoters can be added to the ink in particulate form (e.g., in the case Ni in the form of nickel nanoparticles). Further non-limiting examples of adhesion promoters for use in the present invention are disclosed in, e.g., U.S. Pat. No. 5,750,194, the entire disclosure whereof is incorporated by reference herein in its entirety. Furthermore, polymers such as, e.g., polyamic acid, acrylics and styrene acrylics can improve the adhesion of a metal to a polymer substrate, as can substances such as coupling agents, titanates and silanes.

An adhesion promoter can also be added to the ink in the form of a chemical precursor to a metal such as, e.g., in the form of a metal salt (e.g., a carboxylate or nitrate), a metal alkoxide, etc. Adhesion promoters can also be applied to the substrate prior to printing of a nanoparticle ink, preferably by the same printing method but optionally also by an alternative method such as, e.g., spin coating or dip coating.

It also is to be noted that, in certain cases the polymer which serves the function of an anti-agglomeration substance for the nanoparticles of, e.g., an ink, may also provide improved structural integrity on a variety of substrates when curing is performed at relatively low temperatures (e.g., from about 75° C. to about 350° C.). At such low temperatures, the polymer (shell) will not volatilize, but rather rearrange while allowing the metal cores of the particles to touch and sinter together. The polymer now can serve the function of adhesion promoter between the Ag particles and the substrate. In addition, it may also provide additional cohesive strength between individual particles.

The metal nanoparticle compositions of the present invention can also include rheology modifiers. Non-limiting examples of rheology modifiers that are suitable for use in the present invention include SOLTHIX 250 (Avecia Limited), SOLSPERSE 21000 (Avecia Limited), styrene allyl alcohol (SAA), ethyl cellulose, carboxy methylcellulose, nitrocellulose, polyalkylene carbonates, ethyl nitrocellulose, and the like. These additives can reduce spreading of a metal nanoparticle composition after deposition, as discussed in more detail below.

The metal nanoparticle compositions or—the present invention may include further additives such as, e.g., wetting angle modifiers, humectants, crystallization inhibitors and the like. Of particular interest are often crystallization inhibitors as they prevent crystallization and the associated increase in surface roughness and film uniformity during curing at elevated temperatures and/or over extended periods of time. However, it is preferred for the nanoparticle compositions of the present invention to be substantially free of metal precursor compounds such as those disclosed in, e.g., published U.S. Patent Application Nos. 2003/0148024 A1 and 2003/0180451 A1, the entire disclosures whereof are expressly incorporated by reference herein. Also, compositions in accordance with the present invention preferably do not comprise added binder, e.g., polymeric binder. In this regard it is to be noted that, in the case of polymeric anti-agglomeration substances such as, e.g., polyvinylpyrrolidone, the anti-agglomeration substance itself may serve as a binder, as explained in more detail below.

It is preferred for the total loading of metal nanoparticles in the compositions of the present invention to be not higher than about 75% by weight, such as from about 5% by weight to about 60% by weight, based on the total weight of the composition. Loadings in excess of the preferred amounts can lead to undesirably high viscosities and/or undesirable flow characteristics. Of course, the maximum loading which still affords useful results also depends on the density of the metal. In other words, the higher the density of the metal of the nanoparticles, the higher will be the acceptable and desirable loading in weight percent. In preferred aspects of the compositions of the present invention, the nanoparticle loading is at least about 10% by weight, e.g., at least about 15% by weight, at least about 20% by weight, or at least about 40% by weight. Depending on the metal, the loading will often not be higher than about 65% by weight, e.g. not higher than about 60% by weight. These percentages refer to the total weight of the nanoparticles, i.e., including any anti-agglomeration substance carried (e.g., adsorbed) thereon.

The metal nanoparticle compositions of the present invention can also include plasticizing agents. Without being bound by any particular theory, it is possible that plasticizing agents cause the anti-agglomeration substance on the surface of the metal nanoparticles to at least partially expose the metal nanoparticle core. In one embodiment, the exposing occurs at room temperature. Examples of plasticizing agents that may be used in the present invention include, but are not limited to water, phthalic esters (e.g., di-2-ethylhexyl phthalate, di-n-octyl phthalate, di-i-octyl phthalate, di-i-decyl phthalate, di-n-undecyl phthalate, and di-n-iridecyl phthalate), aromatic alkyl tricarboxylates (e.g., tri-2-ethylhexyl trimellitate), phosphate esters, aliphatic acid esters (e.g., dialkyl adipates like bis(1-butylpentyl) adipate and di-2-ethyhexyl adipate), sebacates (e.g., di-2-ethylhexyl sebacate), azelates (e.g., di-2-ethyhexyl azelate), benzoates, butylates, epoxy aliphatic acid esters, glycolic acid esters, propionic acid esters, sulfonates, carboxylates, succinic acid esters, maleates, fumaric acid esters, phthalic acid esters, stearic acid esters, amines (e.g., butylamine), sugars (e.g., glucose and xylose), amino acids (e.g., lysine), aldehydes (e.g., hexanal), carbonates (e.g., ethylene carbonate), amides, ethers, alcohols (e.g., ethanol, ethylene glycol, polyethylene glycol, and glycerol), lactones, and expoxidized oils (e.g., epoxidized linseed oil and epoxidized soya oil).

The metal nanoparticle compositions of the present invention can also include surfactants. Without being bound by any particular theory, it is possible that surfactants also cause the anti-agglomeration substance on the surface of the metal nanoparticles to at least partially expose the metal nanoparticle core. Examples of surfactants that may be used in the present invention include, but are not limited to fatty acid esters, fatty amines, glycerol, and glycerol esters.

Substrates

Preferred metal nanoparticle compositions according to the present invention can be deposited and converted to a conductive feature at low temperatures, thereby enabling the use of a variety of substrates having a relatively low softening (melting) or decomposition temperature.

Non-limiting examples of substrates that are particularly advantageous according to the present invention include substrates comprising one or more of fluorinated polymer, polyimide, epoxy resin (including glass-filled epoxy resin), polycarbonate, polyester, polyethylene, polypropylene, polyvinyl chloride, ABS copolymer, synthetic paper, flexible fiberboard, non-woven polymeric fabric, cloth and other textiles. Other particularly advantageous substrates include cellulose-based materials such as wood or paper, and metallic foil and glass (e.g., thin glass). The substrate may be coated. Although the compositions of the present invention can be used particularly advantageously for temperature-sensitive substrates, it is to be appreciated that other substrates such as, e.g., metallic and ceramic substrates can also be used in accordance with the present invention.

Of particular interest for display applications are glass substrates and ITO coated glass substrates. Other glass coatings that the metal features may be printed on in flat panel display applications include semiconductors such as c-Si on glass amorphous Si-on glass, poly-Si on glass, and organic conductors and semiconductors printed on glass. The glass may also be substituted with, e.g., a flexible organic transparent substrate such as PET or PEN. The metal (e.g., Ag) may also be printed on top of a black layer or coated with a black layer to improve the contrast of a display device. Other substrates of particular interest include printed circuit board substrates such as FR4, textiles including woven and non-woven textiles.

Another substrate of particular interest is natural or synthetic paper, in particular, paper that has been coated with specific layers to enhance gloss and accelerate the infiltration of ink solvent or ink vehicle. A preferred example of a glossy coating for inkjet paper includes alumina nanoparticles such as fumed alumina in a binder. Also, an Ag ink according to the present invention that is ink jet printed on EPSON glossy photo paper and heated for about 30 min at about 100° C. is capable of exhibiting highly conductive Ag metal lines with a bulk conductivity in the 10 micro-$\Omega$cm range.

According to a preferred aspect of the present invention, the substrate onto which the metal nanoparticle composition is deposited may have a softening and/or decomposition temperature of not higher than about 225° C., e.g., not higher than about 200° C., not higher than about 185° C., not higher than about 150° C., or not higher than about 125° C.

Deposition of Fine Features

A difficulty that may be encountered in the printing and processing of low viscosity metal nanoparticle compositions is that the composition can wet the surface and rapidly spread to increase the width of the deposit, thereby negating the advantages of fine line printing. This is particularly true when ink-jet printing is employed to deposit fine features such as interconnects, because ink jet technology puts relatively strict upper boundaries on the viscosity of the composition that can be employed. Nonetheless, ink-jet printing is a preferred low-cost, large-area deposition technology that can be used to deposit the metal nanoparticle compositions of the present invention. It has surprisingly been found that the preferred compositions of the present invention and in particular, compositions comprising silver nanoparticles carrying thereon polyvinylpyrrolidone as anti-agglomeration substance in a vehicle which comprises a mixture of protic solvents such as, e.g., a mixture of ethylene glycol, ethanol and glycerol, can be deposited on a variety of substrates without any significant spreading, thereby-enabling the production of very fine conductive features.

According to a preferred aspect of the present invention, the metal nanoparticle compositions can be confined on the substrate, thereby enabling the formation of features having a small minimum feature size, the minimum feature size being the smallest dimension in the x-y axis, such as the width of a conductive line. The preferred metal nanoparticle compositions of the present invention can be confined to regions having a width of not greater than about 200 µm, preferably not greater than about 150 µm, e.g., not greater than about 100 µm, or not greater than about 50 µm, even without the use of any anti-spreading additives and/or without resorting to any measures such as those discussed below.

In some cases it may, however, be advantageous to add small amounts of rheology modifiers such as styrene allyl alcohol (SAA) and other polymers to the metal nanoparticle composition to reduce spreading. Spreading can also be controlled by rapidly drying the compositions during printing by irradiating the composition during deposition.

Spreading can also be controlled by the addition of a low decomposition temperature polymer in monomer form. The monomer can be polymerized during deposition by thermal or radiation (e.g., ultraviolet) means, providing a network structure to maintain line shape. The resultant polymer can then be either retained or removed during subsequent processing of the conductor.

Another method comprises patterning an otherwise non-wetting substrate with wetting enhancement agents that control the spreading and also yield increased adhesion. By way of non-limiting example, this maybe achieved by functionalizing the substrate surface with functional groups such as, e.g., hydroxide or carboxylate groups.

The fabrication of features with feature widths of not greater than about 100 µm or features with a minimum feature size of not greater than about 100 µm from a low viscosity composition may require the confinement of the metal nanoparticle composition so that the composition does not spread over certain defined boundaries. Various methods can be used to confine the composition on a surface, including surface energy patterning by increasing or decreasing the hydrophobicity (surface energy) of the surface in selected regions corresponding to where it is desired to confine the metal nanoparticles or eliminate the metal nanoparticles. These methods can be classified as physical barrier, electrostatic barrier, magnetic barrier, surface energy difference, and process related methods such as increasing the metal nanoparticle viscosity to reduce spreading, for example by freezing or drying the composition very rapidly once it strikes the surface.

In physical barrier approaches, a confining structure is formed that keeps the metal nanoparticle composition from spreading. These confining structures may be trenches and cavities of various shapes and depths below a flat or curved surface which confine the flow of the metal nanoparticle composition. Such trenches can be formed by chemical etching or by photochemical means. The physical structure confining the metal nanoparticle composition can also be formed by mechanical means including embossing a pattern into a softened surface or means of mechanical milling, grinding or scratching features. Trenches can also be formed thermally, for example by locally melting a low melting point coating such as a wax coating. Alternatively, retaining barriers and patches can be deposited to confine the flow of a composition within a certain region. For example, a photoresist layer can be spin coated on a polymer substrate. Photolithography can be used to form trenches and other patterns in the photoresist layer. These patterns can be used to retain metal nanoparticle composition that is deposited onto these preformed patterns. After drying, the photolithographic mask mayor may not be removed with the appropriate solvents without removing the deposited metal. Retaining barriers can also be deposited with direct-write deposition approaches such as ink jet printing or any other direct-write approach, as disclosed herein.

For example, a polymer trench can be ink-jet printed onto a flat substrate by depositing two parallel lines with narrow parallel spacing. A metal nanoparticle composition of the present invention can be printed between the two polymer lines to confine the composition. Another group of physical barriers include printed lines or features with a certain level of porosity that can retain a low viscosity composition by capillary forces. The confinement layer may comprise particles applied by any of the techniques disclosed herein. The particles confine the metal nanoparticle composition that is deposited onto the particles to the spaces between the particles because of wetting of the particles by the metal nanoparticle composition.

Surface energy patterning can be classified by how the patterning is formed, namely by mechanical, thermal, chemical or photochemical means. In mechanical methods, the physical structure confining the metal nanoparticle composition is formed by mechanical means including embossing a pattern into a softened surface, milling features, or building up features to confine the composition. In thermal methods, heating of the substrate is used to change the surface energy of the surface, either across the entire surface or in selected locations, such as by using a laser or thermal print head. In chemical methods, the entire surface or portions of the surface are chemically modified by reaction with some other species. In one aspect, the chemical reaction is driven by local laser heating with either a continuous wave or pulsed laser. In photochemical methods, light from either a conventional source or from a laser is used to drive photochemical reactions that result in changes in surface energy.

The methods of confining metal nanoparticle compositions disclosed herein can involve two steps in series—first the formation of a confining pattern, that may be a physical or chemical confinement method, and second, the application of a metal nanoparticle composition to the desired confinement areas.

Offset printing or lithographic printing can be used to print high resolution patterns that correspond to at least two levels of surface energies. In one aspect, the printing is carried out on a hydrophobic surface and a hydrophilic material is printed. The regions where no printing occurs correspond to hydrophobic material. A hydrophobic metal nanoparticle composition can then be printed onto the hydrophobic regions thereby confining the composition. Alternatively, a hydrophilic nanoparticle composition can be printed onto the hydrophilic electrostatically printed regions. The width of the hydrophobic and hydrophilic regions may be not greater than about 100 µm, e.g., not greater than about 75 µm, not greater than about 50 µm, or not greater than about 25 µm.

The metal nanoparticle composition confinement may be accomplished by applying a photoresist and then laser patterning the photoresist and removing portions of the photoresist. The confinement may be accomplished by a polymeric resist that has been applied by another jetting technique or by any other technique resulting in a patterned polymer. In one aspect, the polymeric resist is hydrophobic and the substrate surface is hydrophilic. In that case, the metal nanoparticle composition utilized is hydrophilic resulting in confinement of the composition in the portions of the substrate that are not covered by the polymeric resist.

A laser can be used in various ways to modify the surface energy of a substrate in a patterned manner. The laser can be used, for example, to remove hydroxyl groups through local heating. These regions are converted to more hydrophobic regions that can be used to confine a hydrophobic or hydrophilic metal nanoparticle composition. The laser may also be used to remove selectively a previously applied surface layer formed by chemical reaction of the surface with a silanating agent.

In one aspect, a surface is laser processed to increase the hydrophilicity in regions where the laser strikes the surface. A polyimide substrate is coated with a thin layer of hydrophobic material, such as a fluorinated polymer. A laser, such as a pulsed yttrium aluminum garnet (YAG), excimer or other ultraviolet (UV) or shorter wavelength pulsed laser, can be used to remove the hydrophobic surface layer exposing the hydrophilic layer underneath. Translating (e.g., on an x-y axis) the laser allows patterns of hydrophilic material to be formed. Subsequent application of a hydrophilic metal nanoparticle composition to the hydrophilic regions allows confinement of the composition. Alternatively, a hydrophobic metal nanoparticle composition can be used and applied to the hydrophobic regions resulting in composition confinement.

In another aspect, a surface is laser processed to increase the hydrophobicity in regions where the laser strikes the surface. A hydrophobic substrate such as a fluorinated polymer can be chemically modified to form a hydrophilic layer on its surface. Suitable modifying chemicals include solutions of sodium naphthalenide. Suitable substrates include polytetrafluoroethylene and other fluorinated polymers. The dark hydrophilic material formed by exposing the polymer to the solution can be removed in selected regions by using a laser. Continuous wave and pulsed lasers can be used. Hydrophilic metal nanoparticle compositions, for example aqueous based compositions, can be applied to the remaining dark material. Alternatively, hydrophobic metal nanoparticle compositions, such as those based on solutions in non-polar solvents, can be applied to the regions where the dark material was removed leaving the hydrophobic material underneath. Ceramic surfaces can be hydroxylated by heating in moist air or otherwise exposing the surface to moisture. The hydroxylated surfaces can be silanated to create a monolayer of hydrophobic molecules. The laser can be used to selectively remove the hydrophobic surface layer exposing the hydrophilic material underneath. A hydrophobic patterned layer can be formed directly by micro-contact printing using a stamp to apply a material that reacts with the surface to leave exposed a hydrophobic material such as, e.g., an aliphatic hydrocarbon chain. The metal nanoparticle composition can be applied directly to the hydrophilic regions or hydrophobic regions using a hydrophilic or hydrophobic metal nanoparticle composition, respectively.

A surface with patterned regions of hydrophobic and hydrophilic regions can be formed by micro-contact printing. In this approach, a stamp is used to apply a reagent to selected regions of a surface. This reagent can form a self-assembled monolayer that provides a hydrophobic surface. The regions between the hydrophobic surface regions can be used to confine a hydrophilic metal nanoparticle composition.

Metal nanoparticle composition modification can also be employed to confine the composition on the substrate. Such methods restrict spreading of the compositions by methods other than substrate modification. A metal nanoparticle composition including a binder can be used for surface confinement. By way of non-limiting example, the binder can be chosen such that it is a solid at room temperature, but is a liquid suitable for ink-jet deposition at higher temperatures. These compositions are suitable for deposition through, for example, a heated ink-jet head.

Binders can also be used in the metal nanoparticle compositions of the present invention to provide mechanical cohesion and limit spreading of the composition after deposition, especially in non-electric and non-electronic applications. By way of non-limiting example, the binder may be a solid at room temperature. During ink-jet printing, the binder is heated and becomes flowable. In one aspect, the binder is a solid at room temperature, when heated to greater than about 50° C. the binder melts and flows allowing for ease of transfer and good wetting of the substrate, then upon cooling to room temperature the binder becomes solid again maintaining the shape of the deposited pattern. The binder can also react in some instances. Preferred binders include waxes, polymers such as, e.g., styrene allyl alcohols, polyalkylene carbonates and polyvinyl acetals, cellulose based materials, tetradecanol, trimethylolpropane and tetramethylbenzene. The preferred binders have good solubility in the vehicle used in the metal nanoparticle composition and should be processable in the melt form. For example, styrene allyl alcohol is soluble in dimethylacetamide, solid at room temperature and becomes fluid-like upon heating to about 80° C.

The binder in many cases should depart out of the ink-jet printed feature or decompose cleanly during thermal processing, leaving little or no residuals after processing the metal nanoparticle composition. The departure or decomposition can include vaporization, sublimation, unzipping, partial polymer chain breaking combustion, or other chemical reactions induced by a reactant present on the substrate material, or deposited on top of the material.

In a preferred aspect of the present invention, the anti-agglomeration substance will also serve the function of a binder. A non-limiting example of such an anti-agglomeration substance/binder is a polymer such as polyvinylpyrrolidone. For example, upon heating the deposited nanoparticle composition, the polymer may become mobile and form a polymeric matrix or the like in which the metal nanoparticles are embedded.

Other methods for controlling the spreading during printing of a low viscosity metal nanoparticle composition according to the present invention include depositing a composition onto a cooled substrate, freezing the composition as the droplets contact the substrate, removing at least the solvent without melting the composition, and converting the remaining components of the composition to the desired structure or material. The melting point of the composition is preferably less than about 25° C. Preferred solvents include higher molecular weight alcohols. It is preferred to cool the substrate to less than about 10° C.

Yet another method for controlling the spreading during printing according to the present invention comprises the steps of depositing a metal nanoparticle composition onto a porous substrate, thereby limiting the spreading of the composition, and converting the composition to a desired structure, e.g., a conductive feature. In one aspect, the porosity in the substrate is created by laser patterning. The porosity can be limited to the very surface of the substrate.

Yet another method for controlling the spreading of a low viscosity metal nanoparticle composition according to the present invention includes the steps of patterning the substrate to form regions with two distinct levels of porosity where the porous regions form the pattern of a desired structure. The metal nanoparticle composition can then be deposited, such as by ink-jet printing, onto the regions defining the pattern thereby confining the metal nanoparticle composition to these regions. And converting the deposited metal nanoparticle composition to a desired structure, e.g., a conductive feature. Preferred substrates are polyimide, and epoxy laminates. In one aspect the patterning may be carried out with a laser. In another aspect the patterning may be carried out using photolithography. In another aspect, capillary forces pull at least some portion of the composition into the porous substrate.

Spreading of the metal nanoparticle composition is influenced by a number of factors. A drop of liquid placed onto a surface will either spread or not depending on the surface tension of the liquid, the surface tension of the solid and the interfacial tension between the solid and the liquid. If the contact angle is greater than 90 degrees, the liquid is considered non-wetting and the liquid tends to bead or shrink away from the surface. For contact angles less than 90 degrees, the liquid can spread on the surface. For the liquid to completely wet, the contact angle must be zero. For spreading to occur, the surface tension of the liquid must be lower than the surface tension of the solid on which it resides.

In one aspect of the present invention, a metal nanoparticle composition may be applied, e.g., by ink-jet deposition, to an unpatterned substrate. Unpatterned refers to the fact that the surface energy (surface tension) of the substrate has not been intentionally patterned for the sole purpose of confining the composition. It is to be understood that variations in surface energy (used synonymously herein with surface tension) of the substrate associated with devices, interconnects, vias, resists and any other functional features may already be present. For substrates with surface tensions of less than about 30 dynes/cm, a hydrophilic metal nanoparticle composition may be based on ethanol, glycerol, ethylene glycol, and other solvents or liquids having surface tensions of greater than about 30 dynes/cm, more preferably greater than about 40 dynes/cm and preferably greater than about 50 dynes/cm and even greater than about 60 dynes/cm. For substrates with surface tensions of less than about 40 dynes/cm, the solvents should have surface tensions of greater than about 40 dynes/cm, preferably greater than about 50 dynes/cm and even more preferably greater than about 60 dynes/cm. For substrates with surface tensions of less than about 50 dynes/cm, the surface tension of the metal nanoparticle composition should be greater than about 50 dynes/cm, preferably greater than about 60 dynes/cm. Alternatively, the surface tension of the composition can for example be chosen to be at least about 5 dynes/cm, at least about 10 dynes/cm, at least about 15 dynes/cm, at least about 20 dynes/cm, or at least about 25 dynes/cm greater than that of the substrate. Continuous ink jet heads often require surface tensions of about 40 to about 50 dynes/cm. Bubble jet ink jet heads often require surface tensions of about 35 to about 45 dynes/cm. The previously described methods are particularly preferred for these types of deposition approaches.

In another aspect, a metal nanoparticle composition may be applied, e.g., by inkjet deposition, to an unpatterned low surface energy (hydrophobic) surface that has been surface modified to provide a high surface energy (hydrophilic). The surface energy can be increased by hydroxylating the surface by various means known to those of skill in the art including exposing to oxidizing agents and water, heating in moist air and the like. The surface tension of the metal nanoparticle composition can then, for example, be chosen to be at least about 5, at least about 10, at least about 15, at least about 20, or at least about 25 dynes/cm lower than that of the substrate. Piezo-jet ink jet heads operating with hot wax often require surface tensions of about 25 to about 30 dynes/cm. Piezo-jet inkjet heads operating with UV curable inks often require surface tensions of about 25 to about 30 dynes/cm. Bubble jet ink jet heads operating with UV curable inks often require surface tensions of about 20 to about 30 dynes/cm. Surface tensions of roughly about 20 to about 30 dynes/cm are usually required for piezo-based ink jet heads using solvents. The previously described methods are particularly preferred for these types of applications.

Most electronic substrates with practical applications have low values of surface tension, in the range of from about 18 (polytetrafluoroethylene) to about 45 dynes/cm, often from about 20 to about 40 dynes/cm. In one approach of confining a metal nanoparticle composition to a narrow line or other shape, a hydrophilic pattern corresponding to the pattern of the desired conductor feature may be formed on the surface of a substrate through the methods discussed herein. A particularly preferred method uses a laser. For example, a laser can be used to remove a hydrophobic surface layer exposing a hydrophilic layer underneath. In one aspect, the hydrophilic material pattern on the surface has a surface energy that is at least about 5, at least about 10, at least about 15, at least about 20, at least about 25, or at least about 30 dynes/cm greater than that of the surrounding substrate. In another aspect, the surface tension of the composition is chosen to be lower than the surface tension of the hydrophilic region but higher than the surface tension of the hydrophobic region. The surface tension of the composition can, for example, be chosen to be at least about 5, at least about 10, at least about 15, at least about 20 or at least about 25 dynes/cm smaller than that of the hydrophilic regions. The surface tension of the composition can be chosen to be about 5, about 10, about 15, about 20, or about 25 dynes/cm higher than that of the hydrophobic regions. In another approach, the surface energy of the composition is higher than the surface energy of both the hydrophobic and hydrophilic regions. The surface tension of the composition may, for example, be chosen to be at least about 5, at least about 10, at least about 15, at least about 20, or at least about 25 dynes/cm higher than that of the hydrophilic regions. The surface tension of the ink may, for example, be chosen to be at least about 5, at least about 10, at least about 15, at least about 20, or at least about 25 dynes/cm smaller than that of the hydrophilic regions. This approach is preferred for aqueous-based metal nanoparticle compositions and compositions with high surface tensions in general. Continuous ink jet heads often require surface tensions of from about 40 to about 50 dynes/cm. Bubble-jet ink jet heads often require surface tensions of from about 35 to about 45 dynes/cm. The previously described methods are particularly preferred for these types of applications that can handle compositions with high surface tensions.

In another approach to confining a composition to a narrow feature, a hydrophilic surface, or a hydrophobic surface that is rendered hydrophilic by surface modification, maybe patterned with a hydrophobic pattern. In one aspect, the hydrophobic pattern may, for example, have a surface energy that is at least about 5, at least about 10, at least about 15, at least about 20, at least about 25 or at least about 30 dynes/cm smaller than that of the surrounding substrate. This can be done by removing a hydrophilic surface layer using a laser to expose a hydrophobic region underneath. A hydrophobic metal nanoparticle composition may be applied to the hydrophobic surface regions to confine the composition. In another aspect, the hydrophobic composition may, for example, have a surface energy that is at least about 5, at least about 10, at least about 15, at least about 20, at least about 25 or at least about 30 dynes/cm lower than that of the surrounding substrate. In another aspect, the hydrophobic composition may, for example, have a surface energy that is at least about 5, at least about 10, at least about 15, at least about 20, at least about 25 or at least about 30 dynes/cm higher than that of the surrounding substrate. In another aspect, the hydrophobic metal nanoparticle composition may, for example, have a surface energy that is at least about 5, at least about 10, at least about 15, at least about 20, at least about 25 or at least about 30 dynes/cm lower than that of the hydrophobic surface pattern. In another aspect, the hydrophobic nanoparticle composition may, for example, have a surface energy that is at least about 5, at least about 10, at least about 15, at least about 20, at least about 25 or at least about 30 dynes/cm higher than that of the hydrophobic surface pattern. In another aspect, the surface tension of the composition may be smaller than that of the hydrophilic regions and greater than that of the hydrophobic regions. The hydrophilic surface may, for example, have a surface tension of greater than about 40, greater than about 50 or greater than about 60 dynes/cm. When the hydrophobic surface has a surface energy of greater than about 40 dynes/cm, it is preferred to use a composition with a surface tension of less than about 40, even less than about 30 dynes/cm, or less than about 25 dynes/cm. When the hydrophobic surface has a surface energy of greater than about 50 dynes/cm, it is preferred to use a composition with a surface tension of less than about 50, preferably less than about 40, even less than about 30 dynes/cm, and more preferably less than about 25 dynes/cm. When the hydrophobic surface has a surface tension of greater than about 40 dynes/cm, it is preferred to use a composition with a surface tension of less than about 40, less than about 35, less than about 30 and even less than about 25 dynes/cm.

For ink-jet heads and other deposition techniques that require surface tensions greater than about 30 dynes/cm, a particularly preferred method for confining a metal nanoparticle composition to a surface involves increasing the hydrophilicity of the surface to provide a surface tension greater than about 40; greater than about 45 or greater than about 50 dynes/cm and then providing a hydrophobic surface pattern with a surface tension that is lower than that of the surrounding surface. For example, the surface tension of the pattern may be at least about 5, at least about 10, at least about 15, at least about 20 or at least about 25 dynes/cm higher than the surface tension of the surrounding substrate.

Surfactants, i.e., molecules with hydrophobic tails corresponding to lower surface tension and hydrophilic ends corresponding to higher surface tension may be used to modify the compositions and substrates to achieve the required values of surface tensions and interfacial energies.

For the purposes of this application, hydrophobic means a material that repels water. Hydrophobic materials have low surface tensions. They also do not have functional groups for forming hydrogen bonds with water.

Hydrophilic means a material that has an affinity for water. Hydrophilic surfaces are wetted by water. Hydrophilic materials also have high values of surface tension. They can also form hydrogen bonds with water. The surface tensions for different liquids are listed in Table 1 and the surface energies for different solids are listed in Table 2.

TABLE 1

Surface Tensions of Various Liquids

| Liquid | Temp (° C.) | Surface Tension (dynes/cm) |
| --- | --- | --- |
| Water | 20 | 72.75 |
| Acetamide | 85 | 39.3 |
| Acetone | 20 | 23.7 |
| Acetonitrile | 20 | 29.3 |
| n-Butanol | 20 | 24.6 |
| Ethanol | 20 | 24 |
| Hexane | 20 | 18.4 |
| Isopropanol | 20 | 22 |
| Glycerol | 20 | 63.4 |
| Ethylene glycol | 20 | 47.7 |
| Tolulene | 20 | 29 |

TABLE 2

Surface Energies of Various Solids

| Material | Surface Energy (dynes/cm) |
| --- | --- |
| Glass | 30 |
| PTFE | 18 |
| Polyethylene | 31 |
| Plyvinychloride | 41 |
| Polyvinylidene fluoride | 25 |
| Polypropylene | 29 |
| Polystyrene | 33 |
| Polyvinylchloride | 39 |

TABLE 2-continued

Surface Energies of Various Solids

| Material | Surface Energy (dynes/cm) |
|---|---|
| Plysulfone | 41 |
| Polycarbonate | 42 |
| Polyethylene terephthalate | 43 |
| Polyacrylonitrile | 44 |
| Cellulose | 44 |

Deposition of Metal Nanoparticle Compositions

The metal nanoparticle compositions of the present invention can be deposited onto surfaces using a variety of tools such as, e.g., low viscosity deposition tools. As used herein, a low viscosity deposition tool is a device that deposits a liquid or liquid suspension onto a surface by ejecting the composition through an orifice toward the surface without the tool being in direct contact with the surface. The low viscosity deposition tool is preferably controllable over an x-y grid, referred to herein as a direct write deposition tool. A preferred direct-write deposition tool according to the present invention is an ink-jet device. Other examples of direct-write deposition tools include aerosol jets and automated syringes, such as the MICROPEN tool, available from Ohmcraft, Inc., of Honeoye Falls, N.Y.

For use in an ink-jet, the viscosity of the metal nanoparticle composition of the present invention preferably is not greater than about 50 cP, e.g., in the range of from about 10 to about 40 cP. For use in an aerosol jet atomization, the viscosity is preferably not greater than about 20 cP. Automated syringes can use compositions having a higher viscosity, such as up to about 5000 cP.

A preferred direct-write deposition tool for the purposes of the present invention is an ink-jet device. Ink-jet devices operate by generating droplets of the composition and directing the droplets toward a surface. The position of the ink-jet head is carefully controlled and can be highly automated so that discrete patterns of the composition can be applied to the surface. Ink-jet printers are capable of printing at a rate of about 1000 drops per jet per second or higher and can print linear features with good resolution at a rate of about 10 cm/sec or more, up to about 1000 cm/sec. Each drop generated by the ink-jet head includes approximately 25 to about 100 picoliters of the composition, which is delivered to the surface. For these and other reasons, ink-jet devices are a highly desirable means for depositing materials onto a surface.

Typically, an ink-jet device includes an ink-jet head with one or more orifices having a diameter of not greater than about 100 µm, such as from about 50 µm to about 75 µm. Droplets are generated and are directed through the orifice toward the surface being printed. Ink-jet printers typically utilize a piezoelectric driven system to generate the droplets, although other variations are also used. Ink-jet devices are described in more detail in, for example, U.S. Pat. Nos. 4,627,875 and 5,329,293, the disclosures whereof are incorporated by reference herein in their entireties.

It is also expedient to simultaneously control the surface tension and the viscosity of the metal nanoparticle composition to enable the use of industrial ink-jet devices. Preferably the surface tension is from about 10 to about 50 dynes/cm, such as from about 20 to about 40 dynes/cm, while the viscosity is maintained at a value of not greater than about 50 centipoise.

According to one aspect, the solids loading of particles in the metal nanoparticle composition is preferably as high as possible without adversely affecting the viscosity or other desired properties of the composition. As set forth above, a metal nanoparticle composition according to the present invention preferably has a particle loading of not higher than about 75 weight percent, e.g., from about 5 to about 50 weight percent.

The metal nanoparticle compositions of the present invention which are intended for use in an ink-jet device may also include surfactants to maintain the particles in suspension. Co-solvents, also known as humectants, can be used to prevent the metal nanoparticle composition from crusting and clogging the orifice of the ink-jet head. Biocides can also be added to prevent bacterial growth over time. Non-limiting examples of corresponding ink-jet liquid vehicle compositions are disclosed in, e.g., U.S. Pat. Nos. 5,853,470; 5,679,724; 5,725,647; 4,877,451; 5,837,045 and 5,837,041, the entire disclosures whereof are incorporated by reference herein. The selection of such additives is based upon the desired properties of the composition, as is known to those skilled in the art. As set forth above, if the composition is intended for the fabrication of electrically conductive features, care should be taken that the additives of the composition do not have a significant adverse effect on the conductivity of the final feature and/or can be removed easily.

The metal nanoparticle compositions according to the present invention can also be deposited by aerosol jet deposition. Aerosol jet deposition allows the formation of conductive features having a feature width of, e.g., not greater than about 200 µm, such as not greater than about 150 µm, not greater than about 100 µm and even not greater than about 50 µm. In aerosol jet deposition, the metal nanoparticle composition is aerosolized into droplets and the droplets are transported to the substrate in a flow gas through a flow channel. Typically, the flow channel is straight and relatively short.

The aerosol can be created using a number of atomization techniques. Examples include ultrasonic atomization, two-fluid spray head, pressure atomizing nozzles and the like. Ultrasonic atomization is preferred for compositions with low viscosities and low surface tension. Two-fluid and pressure atomizers are preferred for higher viscosity fluids. Solvent or can be added to the metal nanoparticle composition during atomization, if necessary, to keep the concentration of metal nanoparticle components substantially constant during atomization.

The size of the aerosol droplets can vary depending on the atomization technique. In one aspect, the average droplet size is not greater than about 10 µm, e.g., not greater than about 5 µm. Large droplets can be optionally removed from the aerosol, such as by the use of an impactor.

Low aerosol concentrations require large volumes of flow gas and can be detrimental to the deposition of fine features. The concentration of the aerosol can optionally be increased, such as by using a virtual impactor. The concentration of the aerosol may be greater than about $10^6$ droplets/cm$^3$, e.g., greater than about $10^7$ droplets/cm$^3$. The concentration of the aerosol can be monitored and the information can be used to maintain the mist concentration within, for example, about 10% of the desired mist concentration over a period of time.

The droplets may be deposited onto the surface of the substrate by inertial impaction of larger droplets, electrostatic deposition of charged droplets, diffusional deposition of submicron droplets, interception onto non-planar surfaces and settling of droplets, such as those having a size in excess of about 10 µm.

Examples of tools and methods for the deposition of fluids using aerosol jet deposition include those disclosed in U.S. Pat. Nos. 6,251,488; 5,725,672 and 4,019,188, the entire disclosures whereof are incorporated by reference herein.

The metal nanoparticle compositions of the present invention can also be deposited by a variety of other techniques including intaglio, roll printer, spraying, dip coating, spin coating, and other techniques that direct discrete units of fluid or continuous jets, or continuous sheets of fluid to a surface. Other examples of advantageous printing methods for the compositions of the present invention include lithographic printing and gravure printing. For example, gravure printing can be used with metal nanoparticle compositions having a viscosity of up to about 5,000 centipoise. The gravure method can deposit features having an average thickness of from about 1 μm to about 25 μm and can deposit such features at a high rate of speed, such as up to about 700 meters per minute. The gravure process also comprises the direct formation of patterns onto the surface.

Lithographic printing methods can also be utilized with the nanoparticle compositions of the present invention. In the lithographic process, the inked printing plate contacts and transfers a pattern to a rubber blanket and the rubber blanket contacts and transfers the pattern to the surface being printed. A plate cylinder first comes into contact with dampening rollers that transfer an aqueous solution to the hydrophilic nonimage areas of the plate. A dampened plate then contacts an inking roller and accepts the ink only in the oleophilic image areas.

Using one or more of the foregoing deposition techniques, it is possible to deposit the metal nanoparticle composition on one side or both sides of a substrate. Further, the processes can be repeated to deposit multiple layers of the same or different metal nanoparticle compositions on a substrate.

An optional first step may comprise a surface modification of the substrate as is discussed above. The surface modification may be applied to the entire substrate or may be applied in the form of a pattern, such as by using photolithography. The surface modification may, for example, include increasing or decreasing the hydrophilicity of the substrate surface by chemical treatment. For example, a silanating agent can be used on the surface of a glass substrate to increase the adhesion and/or to control spreading of the metal nanoparticle composition through modification of the surface tension and/or wetting angle. The surface modification may also include the use of a laser to clean the substrate. The surface may also be subjected to mechanical modification by contacting with another type of surface. The substrate may also be modified by corona treatment.

For example a line of polyimide can be printed prior to deposition of a metal nanoparticle composition, such as a silver metal nanoparticle composition, to prevent infiltration of the composition into a porous substrate, such as paper. In another example, a primer material may be printed onto a substrate to locally etch or chemically modify the substrate, thereby inhibiting the spreading of the metal nanoparticle composition being deposited in the following printing step. In yet another example, a via can be etched by printing a dot of a chemical that is known to etch the substrate. The via can then be filled in a subsequent printing process to connect circuits being printed on the front and back of the substrate.

As is discussed above, the deposition of a metal nanoparticle composition according to the present invention can be carried out, for example, by pen/syringe, continuous or drop on demand ink-jet, droplet deposition, spraying, flexographic printing, lithographic printing, gravure printing, other intaglio printing, and others. The metal nanoparticle composition can also be deposited by dip-coating or spin-coating, or by pen dispensing onto rod or fiber type substrates. Immediately after deposition, the composition may spread, draw in upon itself, or form patterns depending on the surface modification discussed above. In another aspect, a method is provided for processing the deposited composition using 2 or more jets or other ink sources. An example of a method for processing the deposited composition is using infiltration into a porous bed formed by a previous fabrication method. Another exemplary method for depositing the composition is using multi-pass deposition to build the thickness of the deposit. Another example of a method for depositing the composition is using a heated head to decrease the viscosity of the composition.

The properties of the deposited metal nanoparticle composition can also be subsequently modified. This can include freezing, melting and otherwise modifying the properties such as viscosity with or without chemical reactions or removal of material from the metal nanoparticle composition. For example, a metal nanoparticle composition including a UV-curable polymer can be deposited and immediately exposed to an ultraviolet lamp to polymerize and thicken and reduce spreading of the composition. Similarly, a thermoset polymer can be deposited and exposed to a heat lamp or other infrared light source.

After deposition, the metal nanoparticle composition may be treated to convert the metal nanoparticle composition to the desired structure and/or material, e.g., a conductive feature. The treatment can include multiple steps, or can occur in a single step, such as when the metal-nanoparticle composition is rapidly heated and held at the processing temperature for a sufficient amount of time to form a conductive feature.

An optional, initial step may include drying or subliming of the composition by heating or irradiating. In this step, material (e.g., solvent) is removed from the composition and/or chemical reactions occur in the composition. Non-limiting examples of methods for processing the deposited composition in this manner include methods using a UV, infrared (IR), laser or a conventional light source. Heating rates for drying the metal nanoparticle composition are preferably greater than about 10° C./min, more preferably greater than about 100° C./min and even more preferably greater than about 1000° C./min. The temperature of the deposited metal nanoparticle composition can be raised using hot gas or by contact with a heated substrate. This temperature increase may result in further evaporation of vehicle and other species. A laser, such as an IR laser, can also be used for heating. An IR lamp, a hot plate or a belt furnace can also be utilized. It may also be desirable to control the cooling rate of the deposited feature.

The metal nanoparticle compositions of the present invention can be processed for very short times and still provide useful materials. Short heating times can advantageously prevent damage to the underlying substrate. For example, thermal processing times for deposits having a thickness on the order of about 10 μm may be not greater than about 100 milliseconds, e.g., not greater than about 10 milliseconds, or not greater than about 1 millisecond. The short heating times can be provided using laser (pulsed or continuous wave), lamps, or other radiation. Particularly preferred are scanning lasers with controlled dwell times. When processing with belt and box furnaces or lamps, the hold time may often be not longer than about 60 seconds, e.g., not longer than about 30 seconds, or not longer than about 10 seconds. The heating time may even be not greater than about 1 second when processed with these heat sources, and even not greater than about 0.1 second while still providing conductive materials that are useful in a variety of applications. The preferred heating time and temperature will also depend on the nature of the desired feature, e.g., of the desired electronic feature. It will be appreciated that short heating times may not be beneficial if the solvent or other constituents boil rapidly and form porosity or other defects in the feature.

By way of non-limiting example, a printed feature in accordance with the present invention may be cured by a number of different methods including thermal, UV and pressure-based curing. The thermal curing can be effected by removing the solvents at low temperatures and creating a reflective print. On some substrates such as paper, no thermal curing step may be necessary at all, while in others a mild thermal curing step such as short exposure to an IR lamp may be sufficient. In this particular embodiment, the metallic ink has a higher absorption cross-section for the IR energy derived from the lamp than the surrounding substrate and so the printed metallic feature is preferentially thermally cured.

In cases where the ink contains a photoactive reagent a printed metallic feature in accordance with the present invention may also be cured by irradiation with UV light. The photoactive reagent may, for example, be a monomer or low molecular weight polymer which polymerizes on exposure to UV light resulting in a robust, insoluble metallic layer. In cases where electric conductivity is important, a photoactive metal species may, for example, be incorporated into the ink to provide good connectivity between the nanoparticles in the ink after curing. In this embodiment, the photoactive metal-containing species is photochemically reduced to form the corresponding metal.

In a further aspect of the present invention, the printed metallic ink may be cured by compression. This can be achieved by exposing the substrate containing the printed feature to any of a variety of different processes that "weld" the nanoparticles in the ink. Non-limiting examples of these processes include stamping and roll pressing. For example, for applications in the security industry, subsequent processing steps in the construction of a secure document are likely to include intaglio printing which will result in the exposure of the substrate containing the printed metallic feature to high pressure and temperatures in the range of from about 50° C. to about 100° C. The temperature or the pressure or both combined will usually be sufficient to cure the metallic ink and create a reflective and/or conductive feature. Of course, any combination of heating, pressing and UV-curing may be used for curing a printed feature in accordance with the present invention.

In one aspect of the present invention, the deposited metal nanoparticle composition may be converted to an electrically conductive feature at temperatures of not higher than about 300° C., e.g., not higher than about 250° C., not higher than about 225° C., not higher than about 200° C., or even not higher than about 185° C. In many cases it will be possible to achieve substantial conductivity at temperatures of not higher than about 150° C., e.g., at temperatures of not higher than about 125° C., or even at temperatures of not higher than about 100° C. Any suitable method and device and combinations thereof can be used for the conversion, e.g., heating in a furnace or on a hot plate, irradiation with a light source (UV lamp, IR or heat lamp, laser, etc.), combinations of any of these methods, to name just a few.

By way of non-limiting example, after heating to a temperature of about 200° C., or even to a temperature of about 150° C., a deposited composition of the present invention may show a resistivity which is not higher than about 30 times, e.g., not higher than about 20 times, not higher than about 10 times, or not higher than about 5 times the resistivity of the pure bulk metal.

The particles in the metal nanoparticle composition may optionally be (fully) sintered. The sintering can be carried out using, for example, furnaces, light sources such as heat lamps and/or lasers. In one aspect, the use of a laser advantageously provides very short sintering times and in one aspect the sintering time is not greater than about 1 second, e.g., not greater than about 0.1 seconds, or even not greater than about 0.01 seconds. Laser types include pulsed and continuous wave lasers. In one aspect, the laser pulse length is tailored to provide a depth of heating that is equal to the thickness of the material to be sintered.

It will be appreciated from the foregoing discussion that two or more of the latter process steps (drying, heating and sintering) can be combined into a single process step. Also, one or more of these steps may optionally be carried out in a reducing atmosphere (e.g., in an $H_2/N_2$ atmosphere for metals that are prone to undergo oxidation, especially at elevated temperature, such as e.g., Ni) or in an oxidizing atmosphere.

The deposited and treated material, e.g., a conductive feature may be post-treated. The post-treatment can, for example, include cleaning and/or encapsulation of the conductive feature (e.g., in order to protect the deposited material from oxygen, water or other potentially harmful substances) or other modifications. The same applies to any other metal structures that may be formed (e.g., deposited) with a nanoparticle composition of the present invention.

One exemplary process flow includes the steps of forming a structure by conventional methods such as lithographic, gravure, flexo, screen printing, photo patterning, thin film or wet subtractive approaches; identifying locations requiring addition of material; adding material by a direct deposition of a low viscosity composition; and processing to form the final product. In a specific aspect, a circuit may be prepared by, for example, screen-printing and then be repaired by localized printing of a low viscosity metal nanoparticle composition of the present invention.

More specifically, the present invention also provides a method for the repair of a feature by, e.g., ink-jet printing or syringe dispensing. In one aspect, the method includes the steps of ink-jet printing a metal nanoparticle composition of the present invention onto a repair region and heating to temperatures sufficient to convert the metal nanoparticle composition to a conductor. According to one aspect of the present invention, the repair feature is a ball grid array (BGA). According to another aspect, the feature is a circuit pattern in a low temperature co-fire ceramic (LTCC) layer. In one aspect, the pattern is not yet sintered while in another aspect the pattern is already sintered. In one aspect, a laser can be used to heat the repair section. The repair can be carried out prior to processing of the part. The repair can be made to a metallic conductor or other electronic feature. The repaired portion can have been formed by screen-printing or photo-patterning of a particle-containing composition. In one aspect, laser trimming is used to further define the repair region after ink-jet deposition.

According to one aspect of the present invention, the repaired feature preferably has a minimum feature size that is not greater than about 250 µm and more preferably is not greater than about 100 µm. According to one aspect, the repaired feature has a minimum feature size not greater than about 10 µm. The repair can be made to features derived from various processes such as chemical vapor deposition, evaporation, sputtering or other thin film techniques.

In another aspect, features larger than approximately 100 µm are first prepared by screen-printing. Features not greater than about 100 µm are then deposited by a direct deposition method using a metal nanoparticle composition of the present invention.

Preferably, a conductive feature made with a composition of the present invention has a resistivity that is not greater than about 20 times the bulk resistivity of the pure metal, e.g., not greater than about 10 times the bulk resistivity, not greater than about 5 times the bulk resistivity, or even not greater than about 2 times the bulk resistivity of the pure metal.

In accordance with the direct-write processes, the present invention comprises the formation of features for devices and components having, a small minimum feature size. For example, the method of the present invention can be used to fabricate features having a minimum feature size (the smallest feature dimension in the x-y axis) of not greater than about 200 µm, e.g., not greater than about 150 µm, or not greater than about 100 µm. These feature sizes can be provided using ink-jet printing and other printing approaches that provide droplets or discrete units of composition to a surface. The small feature sizes can advantageously be applied to various components and devices, as is discussed below.

Ink Curing and Processing

A nanoparticle composition of the present invention which has been applied (e.g., printed) on a substrate may be cured by a number of different methods including, but not limited to thermal, UV and pressure-based curing. By way of non-limiting example, thermal curing can be effected by removing the vehicle (solvents) at low temperatures and creating a reflective print. On some substrates such as paper, no thermal curing step may be necessary, while in others a mild thermal curing step such as, e.g., short exposure to an infra-red lamp may be sufficient. In this particular embodiment, the metallic ink may have a higher absorption cross-section for the IR energy derived from the heat lamp compared to the surrounding substrate and so the applied composition may be preferentially thermally cured.

The applied composition (e.g., a printed feature) may also be cured by irradiation with UV light where the ink contains a photoreactive reagent. The photoreactive reagent may, for example, be a monomer or low molecular weight polymer which polymerizes on exposure to UV light resulting in a robust, insoluble metallic layer. In cases where electronic conductivity is important, a photoreactive metal species may be incorporated into the ink to provide good connectivity between the nanoparticles in the ink after curing. In this particular embodiment, the photoactive metal-containing species is photochemically reduced to form the corresponding metal.

According to a further non-limiting example, the applied (e.g., printed) composition may be cured by compression. This may be achieved, for example, by exposing the article comprising the applied composition to any of a variety of different processes that "weld" the nanoparticles in the composition (ink). Non-limiting examples of corresponding processes include stamping and roll pressing. In particular, for applications in the security industry (discussed in detail below), subsequent processing steps in the construction of a secure document may include intaglio printing which will result in the exposure of a substrate comprising a deposited metallic feature to high pressure and temperatures in the range of from, e.g., about 50° C. to about 100° C. The temperature or the pressure or both combined should be sufficient to cure the metallic ink and create a reflective and/or conductive feature.

It will be appreciated by those skilled in the art that any combination of heating, pressing, UV-curing or any other type of radiation curing may be useful in creating desired properties of a (e.g., printed) feature.

A metal nanoparticle composition (ink) of the present invention comprises two basic components; particles and a liquid vehicle. The liquid vehicle provides the-liquid properties to the ink, enabling it to be printed and dispensed onto the substrate. The nanoparticles have two main components: a metal core and a preferably organic surface material in the faun of, e.g., a surface layer, capping, coating, or shell (anti-agglomeration substance). The organic surface material preferably stabilizes the particles, preventing agglomeration in the liquid phase and providing surface functionality that enables a stable dispersion in the liquid vehicle. After printing, the liquid vehicle is removed (evaporated) and the organic surface material no longer is needed for any of these functions. In fact, the organic material can now be considered an obstacle for sintering of the metallic particles, inhibiting charge transport. In a particularly preferred aspect of the present invention, the organic surface material is attached to (adsorbed on) the metal nanoparticle in a dative manner, allowing sintering at very low temperatures (for example, in the range of from about 100° C. to about 150° C.). This means that the organic surface material will not evaporate or otherwise become volatile and leave the printed feature at these low temperatures. Instead, the organic material is assumed to move out of the way, allowing the metal particles to touch and sinter together, while a substantial amount of the organic material remains present as part of the printed feature. In another preferred aspect, the organic material (polymer) may assume a new function: it may promote adhesion of the printed metal structure to a range of organic and polymeric substrates such as, e.g., paper, FR4 or Mylar® (PET) and provide structural strength. As a result of the low-temperature sintering mechanism, a continuous percolation network may be formed that provides continuous channels for the conduction of electrons to flow throughout the printed structure without obstacles.

When high conductivity and a dense, high metal-content material are desired, a higher-temperature sintering may be performed (for example, in the range of from about 300° C. to about 550° C.). During such treatment the organic surface material may—at least in part—volatilize. As a result, sintering will occur more rapidly and a much denser metal structure may be formed as compared to a low-temperature structure.

After an ink is printed on the substrate, it may be heated to yield the desired electrical performance, adhesion, and abrasion resistance. This heating can be accomplished in a variety of ways such as hot plate, convection oven, infrared radiation, laser radiation, UV exposure, etc. In general, the resistivity of a printed structure will drop with curing temperature and curing time. In one aspect, the detailed time temperature profile may play a role in the final electrical performance of the printed line or feature: by way of non-limiting example, drying the ink at about 80° C. before heating it to about 120° C. may in some cases result in a feature with a significantly lower conductivity than that of a feature that was printed and immediately heated to about 120° C. without allowing it to dry.

The electrical performance of a cured printed line is often described in terms of the bulk resistivity of the cured line. These values are obtained by measuring the resistance (R) of the printed line, the length (l), and the average cross sectional area (width times thickness: w·d). The bulk resistivity ($\rho$) is calculated using the equation: $\rho(\Omega cm) = R(\Omega) \times w \cdot d/l \text{ (cm)}$. The most accurate data are obtained when using the ratiometric resistance measurement procedure which eliminates contact resistance. When adequate sensing probes are used that do not damage the printed metal, in combination with printed contact pads, a two-point probe measurement can also be used to provide reliable data.

In a preferred aspect of the present invention the peak curing temperature and the curing time are the main factors that determine the ultimate electrical performance of the printed metals. In addition, secondary parameters such as heating profile (ramp rate, drying or no drying prior to heating), substrate type (e.g., coated paper, PET, glass, etc.) curing ambient, and heating method (e.g., oven, laser, IR, etc.) may also play a role.

In a preferred aspect of the present invention, high conductivity can be achieved after very short curing times at temperatures above about 200° C. For example, a 60 second cure at 300° C. may yield a printed Ag line with a bulk resistivity value of about 3.8 $\mu\Omega$cm. In another example, high electrical conductivity can be accomplished with curing times in the single digit second range at temperatures of from about 250° C. to about 550° C. Curing processes such as in-line RTP (rapid thermal processing) can be used to cure the printed features after printing and achieve the desired electrical properties. This will enable a significant reduction in tact time in a manufacturing process when compared to competing materials and processes.

In another preferred aspect of the present invention, the organic material may be attached to the metal nanoparticles in a dative manner. When low temperature sintering is performed (e.g., in the range of from about 75° C. to about 250° C.), the organic material will usually not evaporate or otherwise become volatile and leave the printed feature. Instead, it is assumed that the organic material moves out of the way, allowing the metal particles to touch and sinter together, while a substantial amount of the organic material remains present as part of the printed feature. In a preferred aspect of the present invention, the resulting material may be a nanocomposite which comprises a substantially uniform mixture of metal and organic material. Both phases (metal, organic material) may form substantially uniform inclusions with a size in the range of from, e.g., about 5 nm to about 60 nm. In an even more preferred aspect, the metal inclusions may be physically necked together, forming an interconnected percolation network. The organic component of the composite may, for example, represent not more than about 50% by volume of the nanocomposite, e.g., not more than about 45% by volume, not more than about 40% by volume, not more than about 35% by volume, or not more than about 25% by volume of the total nanocomposite.

In one embodiment, the invention relates to an ink, comprising a liquid vehicle; and metallic nanoparticles in an amount greater than about 40 weight percent, based on the total weight of the ink. Such an ink is suitable for direct write printing applications. In some embodiments, the nanoparticles comprise nanoparticles prepared by a process which comprises a reduction of a metal compound by a polyol. In other embodiments, the ink comprises at least about 10 weight percent of the nanoparticles.

In some embodiments, at least about 90% of the nanoparticles in the ink are of substantially spherical shape. In other embodiments, at least about 90% of the nanoparticles in the ink have a particle size of not more than about 80 nm. In still other embodiments, at least about 80% of the nanoparticles in the ink have a particle size in the range of from about 10 nm to about 70 nm. In yet other embodiments, the ink is substantially free of particles having a particle size of more than about 100 nm. In one embodiment, the metallic nanoparticles in the ink have an average particle size of less than about 500 nm or less than about 100 nm.

In some embodiments, the metallic nanoparticles in the ink comprise a metal selected from the group consisting of silver, gold, platinum, palladium, iron, nickel, copper, rhodium and alloys thereof. Preferably, the ink comprises silver.

In some embodiments, the ink comprises the metallic nanoparticles in an amount greater than about 50 weight percent or in an amount greater than about 60 weight percent, based on the total weight of the ink. In other embodiments, the ink comprises the metallic nanoparticles in an amount greater than about 40 weight percent and less than about 90 weight percent or in an amount from about 50 to about 80 weight percent, based on the total weight of the ink. In a preferred embodiment, the ink has a surface tension of from about 25 to about 70 dynes/cm.

In one embodiment, the liquid vehicle has a surface tension, in the absence of the nanoparticles, of from about 25 to about 70 dynes/cm. In other embodiments, the ink has a surface tension at 20° C. of not higher than about 30 cPs. In still other embodiments, the ink has a surface tension at 20° C. of not higher than about 40 dynes/cm.

In one embodiment, the ink has a viscosity of from about 8 to about 25 centipoise. In one embodiment, the liquid vehicle has a viscosity, in the absence of the nanoparticles, of from about 1 to about 25 cPs.

In a preferred embodiment, the ink has substantially no sedimentation after 7 days at room temperature.

In some embodiments, the ink may further comprise an agglomeration-preventing substance, the agglomeration-preventing substance comprising an organic substance. In some embodiments, the agglomeration-preventing substance comprises a polymer. In some embodiments, the polymer comprises a polymer of vinyl pyrrolidone (e.g., vinyl pyrrolidone homopolymer).

In other embodiments, the vehicle in the ink is capable of dissolving the agglomeration-preventing substance. In one embodiment, the vehicle capable of dissolving the agglomeration-preventing substance comprises water. In other embodiments, the vehicle comprises in the ink comprises ethanol, ethylene glycol and glycerol. In such cases, the vehicle comprises from about 35% to about 45% by weight of ethylene glycol, from about 30% to about 40% by weight of ethanol and from about 20% to about 30% by weight of glycerol, based on a total weight of the vehicle.

Conductor Properties and Structure

The conductors formed by the compositions and methods of the present invention may have combinations of various characteristics. The conductive features preferably have a high purity, a high electrical conductivity and/or high electromigration resistance. High conductivity can, for example, be provided through compositions comprising nanoparticles of, e.g., silver, platinum, palladium, gold, nickel and/or copper.

It will be appreciated that the properties of the conductive feature may vary depending upon the particular application. For example, where a relatively low conductivity is acceptable it may be desirable for some applications to process the deposited feature at a very low temperature. According to one aspect, a metal nanoparticle composition may be deposited and processed at a temperature of not greater than about 125° C., where the resistivity of the feature is not greater than about 100 times the resistivity of the pure bulk metal, more preferably not greater than about 50 times the resistivity of the-bulk metal and even more preferably not greater than about 30 times the resistivity of the bulk metal.

After heating, the compositions of the present invention may yield solids with specific bulk resistivity values. As a background, bulk resistivity values of a number of solids are provided in Table 3.

TABLE 3

Bulk Resistivity of Various Materials

| Material | Bulk Resistivity (micro-Ω cm) |
|---|---|
| Silver (Ag - thick film material fired at 850° C.) | 1.59 |
| Copper (Cu) | 1.68 |
| Gold (Au) | 2.24 |
| Aluminum (Al) | 2.64 |
| Ferro CN33-246 (Ag + low melting glass, fired at 150° C.) | 2.7-3.2 |
| SMP Ag flake + metal nanoparticle formulation, 250° C. | 4.5 |
| Molybdenum (Mo) | 5.2 |
| Tungsten (W) | 5.65 |
| Zinc (Zn) | 5.92 |
| Nickel (Ni) | 6.84 |
| Iron (Fe) | 9.71 |
| Palladium (Pd) | 10.54 |
| Tin (Sn) | 11 |
| Solder (Pb-Sn; 50:50) | 15 |
| Lead | 20.64 |
| Titanium nitrate (TiN transparent conductor) | 20 |
| 5029 (state of the art Ag filled polymer, 150° C.) | 18-50 |
| DuPont Polymer Thick Film (Cu filled polymer) | 75-300 |
| ITO ($In_2O_3$:Sn) | 100 |
| Zinc oxide (ZnO doped-undoped) | 120-450 |
| Carbon (C-graphite) | 1375 |
| KIA SCC-10 (doped silver phosphate glass, 330° C. soft point) | 3000 |
| Ruthenium oxide $RuO_2$ type conductive oxides | 5000-10,000 |
| Bayer conductive polymer Baytron-P | 1,000,000 |

The compositions and methods of the present invention advantageously allow the fabrication of various unique structures.

In one aspect, the average thickness of the deposited structure (feature) may be greater than about 0.01 μm, e.g., greater than about 0.05 μm, greater than about 0.1 μm, or greater than about 0.5 μm. The thickness can even be greater than about 1 μm, such as greater than about 5 μm. These thicknesses can be obtained by ink jet deposition or deposition of discrete units of material in a single pass or in two or more passes. For example, a single layer can be deposited and dried; followed by one or more repetitions of this cycle, if desired.

Vias can also be filled with the metal nanoparticle compositions of the present invention. For example, the via can be filled, dried to remove the volume of the solvent, filled further and two or more cycles of this type can be used to fill the via. The via may then be processed to convert the material to its final composition. After conversion, it is also possible to add more metal nanoparticle composition, dry and then convert the material to product to replace the volume of material lost upon conversion to the final product.

The compositions and methods of the present invention can also be used to form dots, squares and other isolated regions of material. The regions can have a minimum feature size of not greater than about 250 μm, such as not greater than about 100 μm, and even not greater than about 50 μm, such as not greater than about 25 μm, or not greater than about 10 μm. These features can be deposited by ink-jet printing of a single droplet or multiple droplets at the same location with or without drying in between deposition of droplets or periods of multiple droplet deposition. In one aspect, the surface tension of the metal nanoparticle composition on the substrate material may be chosen to provide poor wetting of the surface so that the composition contracts onto itself after printing. This provides a method for producing deposits with sizes equal to or smaller than the droplet diameter.

The compositions and methods of the present invention can also be used to form lines. In one aspect, the lines can advantageously have an average width of not greater than about 250 μm, such as not greater than about 200 μm, not greater than about 150 μm, not greater than about 100 μm, or not greater than about 50 μm.

In one aspect of the present invention a line may be formed on a substrate by depositing a metal nanoparticle composition (e.g., a composition comprising silver nanoparticles) on a substrate in not more than two passes of an ink-jet printing head, e.g., in a single pass of the head, which line can be rendered electrically conductive by heating and/or irradiating the line.

The compositions and methods of the present invention produce features that have good adhesion to substrates of many different materials, e.g., polymeric materials, cellulose-based materials, textiles, glass, metal and ceramic.

In one aspect, the compositions of the present invention can be used to ink jet print structures with a specifically targeted structure thickness and sheet resistivity, (expressed in Ω/sq). An exact amount of metal (e.g., Ag) per unit area can be printed by adjusting the dots per inch (dpi) data contained in the print file, the inkjet drop volume, and the solid loading of the ink. Multiple pass printing can also be used to print thicker layers. Continuous conductive features can be ink jet printed by adequate drop placement, and by controlling dpi, drop volume, and wetting behavior on the substrate.

The schematic in the FIGURE shows the basic principle of continuous feature ink-jet printing by adequate drop placement, taking into account ink drop volume and wetting behavior on the substrate. Table 4 provides an example of how to control the Ag ink thickness and sheet resistivity of an inkjet printed line.

TABLE 4

Control Ag Ink Thickness and Sheet Resistivity

| | parameter | value | |
|---|---|---|---|
| A | Xdpi (print file) | 500 | (19.7 d/mm) |
| B | Ydpi (print file) | 508 | (20.0 d/mm) |
| C | drop volume (head specific) | 44.3 | pl |
| D | ink volume per unit area (A × B × C) | 1.74 | μl per $cm^2$ |
| E | Ag loading in ink (vol %) | 2.2% | |
| F | Ag volume per unit area (D × E) | 38 | $10^{-6}$ $cm^3$ per $cm^2$ |
| G | Layer thickness (D × E, assuming 100% density) | 0.38 | μm |
| H | sheet resistivity (assuming dense Ag) | 43 | mΩ/□ |
| I | measured sheet resistivity (100C cure on photo-paper) | 181 | mΩ/□ |
| J | correction factor (H/I) | 4.2 | |

In this specific example, lines were ink-jet printing with a Spectra SE-128 head on a photo-paper substrate. The performance of the printed trace compared to the equivalent fully dense feature (optimum performance) yields a correction factor for this particular application. Using this general approach, an application specific scaling factor can be calculated for any application by measuring the sheet resistivity value of a printed feature and correlating it to the other parameters. The application specific formula of the form (0.016×4.2 X μm×Ω/sq)/(A×B×C×E) can then be used to accurately predict the performance of printed features for a specific ink (volume loading), a specific print file (dpi), print head parameters (drop volume), substrate, and curing process (correction factor).

In another aspect, the compositions and methods of the present invention can also be used to print multilayer structures. For example, an adhesion material/promoter can be printed prior to printing of the metal structure. By way of non-limiting example, in a preferred aspect of the present invention, a metal, metal oxide, or low melting point glass structure may be ink-jet printed on a glass substrate followed by ink-jet printing of a metal (e.g., silver) structure on top of the first printed structure. After heating, the adhesion material/promoter will improve the adhesion of the metal. (Ag) structure to the glass structure may be ink jet printed on an ITO coated glass substrate followed by ink jet printing of a metal (e.g., silver) structure on top of the first printed structure. After heating, the adhesion material/promoter structure will improve adhesion of the metal structure to the glass substrate.

In another non-limiting example, a black structure may be printed prior to the printing of a metal structure. In a preferred aspect, a carbon containing material and/or a metal oxide (chromium oxide, ruthenium oxide, cobalt oxide, etc.) may be printed in a line on a glass substrate or an ITO coated glass substrate, followed by ink-jet printing of a metal (e.g., silver) line on top of the first printed line. These two printed lines will appear black when viewed through the glass substrate. This is an important feature for flat panel display applications such as plasma displays, where a high contrast ratio between light and dark is required during viewing of the display. In addition, this black structure may in some preferred aspects also enhance the adhesion of the silver layer to the substrate which may be, for example, glass or ITO coated glass.

In yet another non-limiting example, a diffusion barrier material may be printed prior to the printing of the metal (e.g., Ag) structure. By way of non-limiting example, a Ni nanoparticle ink layer-may be ink jet printed on top of a Si substrate (crystalline Si, poly Si, or amorphous Si), for example, an amorphous Si electrode or a poly-Si source or drain of a thin film transistor device in an active matrix backplane of a LCD display. A metal (preferably, silver) line or electrode may be subsequently printed on top of the Ni layer. The Ni layer will provide a diffusion barrier for diffusion of Ag into the Si material. This is important as Si contamination is known to interfere with proper Si transistor device operation. It will be appreciated by those skilled in the art that other diffusion barrier materials can be selected, including materials that react with the silicon layer and form a silicide which acts as a diffusion barrier.

In yet another non-limiting example, a protective layer may be printed on top of the printed metal (e.g., Ag) structure. This protective layer provides protection against, e.g., chemical agents that are present in the gas or liquid to which the printed structure may be exposed after it is printed. For example, a glass or polymer overcoat may be printed on top of a metal (e.g., Ag) structure to prevent oxidation or blackening of the metal due to exposure to the ambient. In another example, a Ni layer may be printed on top of an AG structure to prevent corrosion of the AG during subsequent processing steps. Such processing steps may include liquid etching, gas plasma etching, or other processes which are commonly used in the manufacture of transistors and flat panel displays. It will be appreciated by those skilled in the art that other protective overcoat layer materials may be selected as well.

Applications

The metal nanoparticle compositions and methods of the present invention may advantageously be used, for example, for the fabrication of printed metallic features which may be electrically conductive or non-conductive, and may be transparent, semitransparent and/or reflective in the visible light range and/or in any other range such as, e.g., in the UV and/or IR ranges. (The terms "feature" and "structure" as used herein and in the appended claims include any two- or three-dimensional structure including, but not limited to, a line, a dot, a patch, a continuous or discontinuous layer (e.g., coating) and in particular, any structure that is capable of being formed on any substrate.) In particular, the metal nanoparticle compositions and methods of the present invention can be used in a variety of electronic and non-electronic applications such as, e.g., RF ID antennas and tags, digitally printed multi-layer circuit boards, printed membrane keyboards, smart packages, security documents, "disposable electronics" printed on plastics or paper stock, interconnects for applications in printed logic, passive matrix displays, and active matrix backplanes for applications such as OLED displays and TFT AMLCD technology. In the following some non-limiting examples of the types of devices and components to which the methods and compositions of the present invention are applicable will be described in more detail.

The compositions and methods of the present invention can be used to fabricate antennas for RF (radio frequency) tags and smart cards. In one aspect, the antenna comprises a material with a sheet resistivity of from about 10 to about 100,000 ohms/square. In another aspect, the antenna comprises a silver conductor with a resistivity that is not greater than three times the resistivity of substantially pure silver.

The compositions can also serve as solder replacements. Such compositions can include silver, lead or tin.

The compositions and methods can be utilized to provide connection between chips and other components in smart cards and RF tags.

In one aspect, the surface to be printed onto is not planar and a non-contact printing approach is used. The non-contact printing approach can be ink jet printing or another technique providing deposition of discrete units of fluid onto the surface. Examples of surfaces that are non-planar include in windshields, electronic components, electronic packaging and visors.

The compositions and methods provide the ability to print disposable electronics such as for games included in magazines. The compositions can advantageously be deposited and reacted on cellulose-based materials such as paper or cardboard. The cellulose-based material can be coated if necessary to prevent bleeding of the metal nanoparticle composition into the substrate. For example, the cellulose-based material could be coated with a UV curable polymer.

The compositions and methods can be used to form underbump metallization, redistribution patterns and basic circuit components.

The compositions and methods of the present invention can also be used to fabricate microelectronic components such as multichip modules, particularly for prototype designs or low-volume production.

Another technology where the direct-write deposition of electronic features according to the present invention provides significant advantages is for flat panel displays, such as plasma display panels. Ink-jet deposition of metal powders is a particularly useful method for forming the electrodes for a plasma display panel. The nanoparticle compositions and methods according to the present invention can advantageously be used to form the electrodes, as well as the bus lines and barrier ribs, for the plasma display panel. Typically, a metal paste is printed onto a glass substrate and is fired in air at from about 450° C. to about 600° C. Direct-write deposition of metal nanoparticle compositions offers many advantages over paste techniques including faster production time and the flexibility to produce prototypes and low-volume production applications. The deposited features will have high resolution and dimensional stability, and will have a high density.

Another type of flat panel display is a field emission display (FED). The compositions and methods of the present invention can advantageously be used to deposit the microtip emitters of such a display. More specifically, a direct-write deposition process such as an ink-jet deposition process can be used to accurately and uniformly create the microtip emitters on the backside of the display panel.

The present invention is also applicable to inductor-based devices including transformers, power converters and phase shifters. Examples of such devices are illustrated in, e.g., U.S. Pat. Nos. 5,312,674; 5,604,673 and 5,828,271, the entire disclosures whereof are incorporated by reference herein. In such devices, the inductor is commonly formed as a spiral coil of an electrically conductive trace, typically using a thick-film paste method. To provide the most advantageous properties, the metallized layer, which is typically silver, must have a fine pitch (line spacing). The output current can be greatly increased by decreasing the line width and decreasing the distance between lines. The direct-write process of the present invention is particularly advantageous for forming such devices, particularly when used in a low-temperature co-fired ceramic package (LTCC).

The present invention can also be used to fabricate antennas such as antennas used for cellular telephones. The design of antennas typically involves many trial and error iterations to arrive at the optimum design. The direct-write process of the present invention advantageously permits the formation of antenna prototypes in a rapid and efficient manner, thereby reducing a product development time. Examples of microstrip antennas are illustrated in, e.g., U.S. Pat. Nos. 5,121,127; 5,444,453; 5,767,810 and 5,781,158, the entire disclosures whereof are incorporated herein by reference. The methodology of the present invention can be used to form the conductors of an antenna assembly.

Additional applications of the metal nanoparticle compositions and methods of the present invention include low cost or disposable electronic devices such as electronic displays, electrochromic, electrophoretic and light-emitting polymer-based displays. Other applications include circuits embedded in a wide variety of devices such as low cost or disposable light-emitting diodes, solar cells, portable computers, pagers, cell phones and a wide variety of interne compatible devices such as personal organizers and web-enabled cellular phones.

The compositions and methods of the present invention can also produce conductive patterns that can be used in flat panel displays. The conductive materials used for electrodes in display devices have traditionally been manufactured by commercial deposition processes such as etching, evaporation, and sputtering onto a substrate. In electronic displays it is often necessary to utilize a transparent electrode to ensure that the display images can be viewed. Indium tin oxide (ITO), deposited by means of vacuum deposition or a sputtering process, has found widespread acceptance for this application. For rear electrodes (i.e., the electrodes other than those through which the display is viewed) it is often not necessary to utilize transparent conductors. Rear electrodes can therefore be formed from conventional materials and by conventional processes. Again, the rear electrodes have traditionally been formed using costly sputtering or vacuum deposition methods. The compositions according to the present invention allow the direct deposition of metal electrodes onto low temperature substrates such as plastics. For example, a silver metal nanoparticle composition can be ink-jet printed and heated at 150° C. to form ISO μm by ISO pm square electrodes with good adhesion and sheet resistivity values.

In one aspect, the metal nanoparticle compositions of the present invention may be used to interconnect electrical elements on a substrate, such as non-linear elements. Non-linear elements are defined herein as electronic devices that exhibit nonlinear responses in relationship to a stimulus. For example, a diode is known to exhibit a nonlinear output-current/input-voltage response. An electroluminescent pixel is known to exhibit a non-linear light-output/applied-voltage response. Nonlinear devices also include, but are not limited to, transistors such as TFTs and organic field effect transistors (OFETs), emissive pixels such as electroluminescent pixels, plasma display pixels, field emission display (FED) pixels and organic light emitting device (OLEO) pixels, non emissive pixels such as reflective pixels including electrochromic material, rotatable microencapsulated microspheres, liquid crystals, photovoltaic elements, and a wide range of sensors such as humidity sensors.

Nonlinear elements, which facilitate matrix addressing, are an essential part of many display systems. For a display of M×N pixels, it is desirable to use a multiplexed addressing scheme whereby M column electrodes and N row electrodes are patterned orthogonally with respect to each other. Such a scheme requires only M×N address lines (as opposed to M×N lines for a direct-address system requiring a separate address line for each pixel). The use of matrix addressing results in significant savings in terms of power consumption and cost of manufacture. As a practical matter, the feasibility of using matrix addressing usually hinges upon the presence of a non-linearity in an associated device. The nonlinearity eliminates crosstalk between electrodes and provides a thresholding function. A traditional way of introducing nonlinearity into displays has been to use a backplane having devices that exhibit a nonlinear current/voltage relationship. Examples of such devices include thin-film transistors (TFT) and metal-insulator-metal (MIM) diodes. While these devices achieve the desired result, they involve thin-film processes, which suffer from high production costs as well as relatively poor manufacturing yields.

The present invention allows the direct printing of the conductive components of nonlinear devices including—the source, the drain and the gate. These nonlinear devices may include directly printed organic materials such as OFET or organic thin film transistors (OTFT), directly printed inorganic materials and hybrid organic/inorganic devices such as a polymer based field effect transistor with an inorganic gate dielectric. Direct printing of these conductive materials will enable low cost manufacturing of large area flat displays.

The compositions and methods of the present invention are capable of producing conductive patterns that can be used in flat panel displays to form, e.g., the address lines or data lines. The present invention provides ways to form address and data lines using deposition tools such as an ink-jet device. The metal nanoparticle compositions of the present invention allow printing on large area flexible substrates such as plastic substrates and paper substrates, which are particularly useful for large area flexible displays. Address lines may additionally be insulated with an appropriate insulator such as a non-conducting polymer or other suitable insulator. Alternatively, an appropriate insulator may be formed so that there is electrical isolation between row conducting lines, between row and column address lines, between column address lines or for other purposes. By way of non-limiting example, these lines can be printed with a thickness of, e.g., about one mm and a line width of about 100 μm by ink-jet printing the metal nanoparticle composition. These data lines can be printed continuously on large substrates with an uninterrupted length of several meters. Surface modification can be employed, as is discussed above, to confine the composition and to enable printing of lines as narrow as about 10 μm. The deposited lines can be heated to about 200° C. to form metal lines with a bulk conductivity that is not less than about 10 percent of the conductivity of the equivalent pure metal.

Flat panel displays may incorporate emissive or reflective pixels. Some examples of emissive pixels include electroluminescent pixels, photoluminescent pixels such as plasma display pixels, field emission display (FED) pixels and organic light emitting device (OLED) pixels. Reflective pixels include contrast media that can be altered using an electric field. Contrast media may be electrochromic material, rotatable microencapsulated microspheres, polymer dispersed liquid crystals (PDLCs), polymer stabilized liquid crystals, surface stabilized liquid crystals, smectic liquid crystals, ferroelectric material, or other contrast media well known in art. Many of these contrast media utilize particle-based non-emissive systems. Examples of particle-based non-emissive systems include encapsulated electrophoretic displays (in which particles migrate within a dielectric fluid under the influence of an electric field); electrically or magnetically driven rotating-ball displays as disclosed in, e.g., U.S. Pat. Nos. 5,604,027 and 4,419,383, which are incorporated herein by reference in their entireties; and encapsulated displays based on micromagnetic or electrostatic particles as disclosed in, e.g., U.S. Pat. Nos. 4,211,668, 5,057,363 and 3,683,382, which are incorporated by reference herein in their entireties. A preferred particle non-emissive system is based on discrete, microencapsulated electrophoretic elements, examples of which are disclosed in U.S. Pat. No. 5,930,026 which is incorporated by reference herein in its entirety.

In another aspect, the present invention relates to the direct printing of conductive features, such as electrical interconnects and electrodes for addressable, reusable, paper-like visual displays. Examples of paper-like visual displays include "gyricon" (or twisting particle) displays and forms of electronic paper such as particulate electrophoretic displays (available from E-ink Corporation, Cambridge, Mass.). A gyricon display is an addressable display made up of optically anisotropic particles, with each particle being selectively rotatable to present a desired face to an observer. For example, a gyricon display can incorporate "balls" where each ball has two distinct hemispheres, one black and the other white. Each hemisphere has a distinct electrical characteristic (e.g., zeta potential with respect to a dielectric fluid) so that the ball is electrically as well as optically anisotropic. The balls are electrically dipolar in the presence of a dielectric fluid and are subject to rotation. A ball can be selectively rotated within its respective fluid-filled cavity by application of an electric field, so as to present either its black or white hemisphere to an observer viewing the surface of the sheet.

In a preferred aspect, a metal electrode may be printed for the purpose of charge injection into a conducting or semiconducting polymer layer. For many applications, it is preferred that this metal electrode has a work function that is matched to the work function of the polymer. In a preferred aspect, a printed Ni electrode with a work function of more that 5 eV is used to ink-jet charge carriers into a conducting polymer layer, for example a source electrode or a drain electrode layer.

In another aspect, the present invention relates to electrical interconnects and electrodes for organic light emitting displays (OLEDs). Organic light emitting displays are emissive displays consisting of a transparent substrate coated with a transparent conducting material (e.g., ITO), one or more organic layers and a cathode made by evaporating or sputtering a metal of low work function characteristics (e.g., calcium or magnesium). The organic layer materials are chosen so as to provide charge injection and transport from both electrodes into the electroluminescent organic layer (EL), where the charges recombine to emit light. There may be one or more organic hole transport layers (HTL) between the transparent conducting material and the EL, as well as one or more electron injection and transporting layers between the cathode and the EL. The metal nanoparticle compositions according to the present invention allow the direct deposition of metal electrodes onto low temperature substrates such as flexible large area plastic substrates that are particularly preferred for OLEDs. For example, a metal nanoparticle composition of the present invention may be ink jet printed and heated at 150° C. to form a 150 μm by 150 μm square electrode with good adhesion and a sheet resistivity. The compositions and printing methods of the present invention also enable printing of row and column address lines for OLEDs. These lines can be printed with a thickness of about one μm and a line width of about 100 μm using ink-jet printing. These data lines can be printed continuously on large substrates with an uninterrupted length of several meters. Surface modification can be employed, as is discussed above, to confine the metal nanoparticle composition and to enable printing of such lines as narrow as about 10 μm. The printed ink lines can be heated to, e.g., about 150° C. and form metal lines with a bulk conductivity that is at least about 5 percent of the conductivity of the equivalent pure metal.

In a particularly preferred aspect of the present invention, an optically reflective metal anode may be ink-jet printed using a silver nanoparticle ink. The top emission anode may be printed on top of an organic layer and processed at a temperature below about 180° C. and for a period of less than 5 minutes so that the organic layer does not get damaged. A layer comprising a light-emitting polymer may be printed on top of this electrode. This emission anode may be less than about 200 micrometer wide and may be used for charge injection into said light emitting polymer. The electrode may be reflective to ensure that light generated in the OLED device stack is reflected back towards the viewer.

In another aspect, the present invention relates to electrical interconnects and electrodes for liquid crystal displays (LCDs), including passive-matrix and active-matrix. Particular examples of LCDs include twisted nematic (TN), supertwisted nematic (STN), double supertwisted nematic (DSTN), retardation film supertwisted nematic (RFSTN), ferroelectric (FLCD), guest-host (GHLCD), polymer-dispersed (PD), polymer network (PN).

Thin film transistors (TFTs) are well known in the art, and are of considerable commercial importance. Amorphous silicon-based thin film transistors are used in active matrix liquid crystal displays. One advantage of thin film transistors is that they are inexpensive to make, both in terms of the materials and the techniques used to make them. In addition to making the individual TFTs as inexpensively as possible, it is also desirable to inexpensively make the integrated circuit devices that utilize TFTs. Accordingly, inexpensive methods for fabricating integrated circuits with TFTs, such as those of the present invention, are an enabling technology for printed logic.

For many applications, conductive polymers are not adequately conductive to achieve the desired switching speeds of an integrated circuit due to high RC time constants.

Printed pure metals, as enabled by the metal nanoparticle compositions of the present invention, achieve the required performance. By way of non-limiting example, a metal interconnect printed by using a silver metal nanoparticle composition as provided by the present invention may result in a reduction of the resistance (R) and an associated reduction in the time constant (RC) by a factor of about 100,000, or even by a factor of about 1,000,000, as compared to current conductive polymer interconnect materials used to connect polymer transistors.

Field-effect transistors (FETs), with organic semiconductors as active materials, are the key switching components in contemplated organic control, memory, or logic circuits, also referred to as plastic-based circuits. An expected advantage of such plastic electronics is the ability to fabricate them more easily than traditional silicon-based devices. Plastic electronics thus provide a cost advantage in cases where it is not necessary to attain the performance level and device density provided by silicon-based devices. For example, organic semiconductors are expected to be much more readily printable than vapor-deposited inorganics, and are also expected to be less sensitive to air than recently proposed solution-deposited inorganic semiconductor materials. For these reasons, there have been significant efforts expended in the area of organic semiconductor materials and devices.

Organic thin film transistors (TFTs) are expected to become key components in the plastic circuitry used in display drivers of portable computers and pagers, and memory elements of transaction cards and identification tags. A typical organic TFT circuit contains a source electrode, a drain electrode, a gate electrode, a gate dielectric, an interlayer dielectric, electrical interconnects, a substrate, and semiconductor material. The metal nanoparticle compositions of the present invention may be used to deposit several of the components of this circuit.

One of the most significant factors in bringing organic TFT circuits into commercial use is the ability to deposit all the components on a substrate quickly, easily and inexpensively as compared with silicon technology (i.e., by reel-to-reel printing). The metal nanoparticle compositions of the present invention enable the use of low cost deposition techniques, such as ink-jet printing, for depositing these components.

The metal nanoparticle compositions of the present invention are particularly useful for the direct printing of electrical connectors as well as antennae of smart tags, smart labels, and a wide range of identification devices such as radio frequency identification (RFID) tags. In a broad sense, the metal nanoparticle compositions can be utilized for electrical connection of semiconductor radio frequency transceiver devices to antenna structures and particularly to radio frequency identification device assemblies. A radio frequency identification device ("RFID") by definition is an automatic identification and data capture system comprising readers and tags. Data is transferred using electric fields or modulated inductive or radiating electromagnetic carriers. RFID devices are becoming more prevalent in such configurations as, for example, smart cards, smart labels, security badges, and livestock tags.

The present invention also comprises a wide variety of security and authentication applications. For example, with the advent and growth of desktop publishing and color-photocopiers, the opportunities for document and coupon fraud have increased dramatically. The present invention has utility in a variety of areas including coupon redemption, inventory security, currency security, compact disk security and driver's license and passport security. The present invention can also be utilized as an effective alternative to magnetic strips. Presently, magnetic strips include identification numbers such as credit card numbers that are programmed at the manufacturer. These strips are prone to failure and are subject to fraud because they are easily copied or modified. To overcome these shortcomings, circuits can be printed on the substrate and encoded with specific consumer information. Thus, the present invention can be used to improve the security of credit cards, ATM cards and any other tracking card, which uses magnetic strips as a security measure.

In another security application aspect of the present invention, metallic features can be printed on various articles to produce overt security features. For example, such features are useful in applications that provide security to currency (e.g. bank notes) or brand protection to branded goods. By way of non-limiting example, a unique metallic, reflective feature may be digitally printed on a surface to provide an easily recognizable and reflective metallic feature. The combination of the reflective, metallic nature of the feature and the digital nature of the information printed by, e.g., ink-jet printing, can provide multiple levels of security to the substrate. The security provided by such features may be further enhanced by combining the printed metallic feature with other security features such optically variable features, embossing, watermarks, holograms, as well as with other features of the metallic ink itself such as electrical conductivity and magnetism.

By way of non-limiting example, a metallic nanoparticle composition according to the present invention can be printed in such a way as to produce a semi-transparent feature in the visible region of the electromagnetic spectrum. The semi-transparency of this feature enables multiple security features to be combined in unique combinations, one being visible through the other. The extent of optical semi-transparency compared to reflectivity of this feature can be adjusted according to the layer characteristics and the processing conditions. By way of example, a reflective semi-transparent feature can be printed over the surface of other overt features such as color images, watermarks, holograms and the like, or combined with covert features such as, e.g., luminescent materials such as UV or anti-stokes phosphors as well as other covert features. The semi-transparent coating may also optionally be electronically conductive or magnetic adding an additional level of covert security to these features. A semi-transparent coating can also be created in a way that results in selective transparency in other regions of the electromagnetic spectrum such as, e.g., the ultraviolet and infrared regions.

In another non-limiting aspect, layers comprising different nanoparticle compositions of the present invention may be printed to achieve selective transparency according to the physical characteristics of the nanoparticle metals that are printed. For example, by printing two different nanoparticle inks over a color feature, optical transparency of a specific color may be achieved.

A semi-transparent metal nanoparticle coating according to the present invention may be achieved by a number of different methods. By way of non-limiting example, the digital resolution of a feature that is printed can be reduced to reduce the quantity of material printed on a substrate surface, resulting in an increase of the optical transparency by reducing the amount of surface area that is covered. For example, the nanoparticle ink can be diluted to reduce the metal nanoparticle content and printed to result in a thinner layer that fully covers the surface.

The curing process of the deposited (printed) nanoparticle composition of the present invention may also have a strong influence on the level of transparency compared to its reflectivity. Usually a higher loading of metal nanoparticles, a higher curing temperature and a longer curing time will all contribute to higher reflectivity and lower optical transparency of printed feature. A lower curing temperature will usually lead to lower reflectivity, but increased transparency. Optimum conditions for achieving a combination of increased optical transparency and increased reflectivity usually include thinner layers of complete coverage of nanoparticles cured to give a more continuous film.

In another security application aspect of the present invention, the metal nanoparticle composition (ink) may contain a coloring pigment and/or a dye such that when the ink is printed and cured, the feature has a metallic luster and in addition is of a color that is not characteristic of the metal itself. By way of non-limiting example, a gold luster may be achieved by mixing a yellow dye with a silver nanoparticle ink. In a further aspect, a fluorescent or phosphorescent additive may be incorporated in the metal nanoparticle composition of the present invention, in which case a feature produced therefrom may have a combination of properties that include metallic luster (an overt feature) and luminescence (a covert feature) which can be detected by exposure to electromagnetic radiation of suitable wavelength, for example, by UV light of short (e.g., about 254 nm) or long (e.g., about 365 nm) wavelengths. In a further aspect, the pigment or dye may also be luminescent, resulting in a combination of characteristics where the printed metallic feature has a metallic luster, the color of which (in ordinary light) is determined by the nature of the pigment or dye, but under irradiation with, e.g., UV light, a visible light emission is observed.

In another security application aspect, the metal nanoparticle composition of the present invention may be printed onto a substrate that is subsequently used to produce security threads. In this embodiment, the composition may be printed onto, for example, paper or an organic polymer substrate together with a number of additional security features. The additional use of digital printing assists in providing variable information that creates an additional barrier to counterfeiting of the article. In a typical application, the thread may be used to provide an added level of security to bank notes.

In yet another security application aspect of the present invention, a printed metallic feature may be used as part of a security feature that has unique optical characteristics such as an optically variable feature. By way of non-limiting example, the metal nanoparticle composition of the present invention may be used to print a metallic feature in a certain pattern that is highly reflective after curing. This reflective metallic feature can be used as the base layer in a series of printed layers to create an optical feature. A second layer can be added over the surface of the reflective metallic layer, the second layer being optically transparent. A non-limiting example of the second layer is a magnesium fluoride layer. A third layer may then be printed over the surface of the second layer such that it has the properties of being semi-transparent and reflective with respect to visible light. A non-limiting example of this third layer is another coating of the metal nanoparticle ink that is printed and cured in a way that provides for a very thin layer. The effect created by this three layer stack (sandwich) is an optical interference pattern between the light that is reflected by the top layer (the third layer) and the base layer (the first reflective metal ink layer), resulting in a unique color as the article on which these layers are printed is tilted (changed in angle) with respect to the viewer. The optical variations that may be created by this kind of structure can be varied by the composition of the layers that comprise this structure and the thickness of the printed layers, in addition to the unique optical interference patterns created by the stack.

The material of the second, middle layer of the sandwich can be almost any material that is optically transparent by virtue of either its inherent physical absorption spectrum and/or by the fact that it is comprised of particles with a size in the range that reduces light scattering. The material may be inorganic organic (such as, e.g., an organic polymer) or a mixture of both. Materials with high refractive index such as, e.g., $TiO_2$ provide for enhanced effects. The material may also have some other functional characteristics such as be comprised of luminescent particles such that the feature has a combination of overt and covert properties.

In another security application aspect of the present invention, the conductivity of a printed metal layer may provide a security feature in an article. By way of non-limiting example, a printed metallic feature may be cured under conditions that result in electrical conductivity, thus providing an additional level of security. The presence of electrical conductivity can be determined, for example, by a contact method such as, e.g., 2-point or 4-point probe measurements, or by contact-less methods in which the presence of a conductive feature is determined in an electric or magnetic field. For example, the printed metallic feature can be constructed with dimensions (thickness, width and length) in which the electrical conductivity of the feature may vary as a function of the position within the feature where the measurement is made. This provides for an additional level of security in this feature.

A printed metallic-feature made from the compositions and by the methods of the present invention can be combined with other security features to create additional levels of security. The additional security features may be overt or covert. Non-limiting examples of additional overt features include optically variable features, holograms, embossing, water marks and the like. Non-limiting examples of additional covert features include luminescent materials such as UV excitable phosphors or up-conversion phosphors.

It has recently been demonstrated that silver and gold metal nanoparticles increase the emission characteristics of luminescent materials by acting as a sensitizer or "antenna". A metal nanoparticle composition of the present invention printed over the surface of a phosphor powder layer may improve the luminescence characteristics of that layer to achieve luminescent characteristics that are unique in terms of brightness and emission spectral features for that combination of materials. By way of non-limiting example, gold nanoparticles in combination with $Gd_2O_3$:Tb phosphor particles lead to enhanced emission. The same applies to silver nanoparticles in combination with $Eu^{3+}$ doped glasses.

The metal nanoparticle compositions of the present invention also enable the low cost, high volume, highly customizable production of electronic labels. Such labels can be formed in various sizes and shapes for collecting, processing, displaying and/or transmitting information related to an item in human or machine readable form. The metal nanoparticle compositions of the present invention can be used to print the conductive features required for forming, e.g., the logic circuits, electronic interconnections and antennae in electronic labels. The electronic labels can be an integral part of a larger printed item such as a lottery ticket structure with circuit elements disclosed in a pattern as disclosed in U.S. Pat. No. 5,599,046, the entire disclosure whereof is incorporated by reference herein.

In another aspect of the present invention, the conductive patterns made in accordance with the present invention can be used as electronic circuits for making photovoltaic panels. Screen-printing is conventionally used in mass scale production of solar cells. Typically, the top contact pattern of a solar cell consists of a set of parallel narrow finger lines and wide collector lines deposited essentially at a right angle to the finger lines on a semiconductor substrate or wafer. Such front contact formation of crystalline solar cells is performed with standard screen-printing techniques. Direct printing of these contacts with the metal nanoparticle compositions of the present invention provides the advantages of production simplicity, automation, and low production cost.

Low series resistance and low metal coverage (low front surface shadowing) are basic requirements for the front surface metallization in solar cells. Minimum metallization widths of about 100 to about 150 μm are obtained using conventional screen-printing. This causes a relatively high shading of the front solar cell surface. In order to decrease the shading, a large distance between the contact lines, i.e., 2 to 3 mm is required. On the other hand, this implies the use of a highly doped, conductive emitter layer. However, the heavy emitter doping induces a poor response to short wavelength light. Narrower conductive lines may be printed using the metal nanoparticle compositions and printing methods of the present invention. The metal nanoparticle compositions of the present invention may enable direct printing of finer features down to about 50 μm. The metal nanoparticle compositions of the present invention further may enable the printing of pure metals with resistivity values of the printed features as low as 2 times the bulk resistivity after processing at temperatures as low as about 200° C.

The low processing and direct-write deposition capabilities according to the present invention are suitable also for large area solar cell manufacturing on organic and flexible substrates. This is particularly useful in manufacturing novel solar cell technologies based on organic photovoltaic materials such as organic semiconductors and dye sensitized solar cell technology as disclosed in U.S. Pat. No. 5,463,057, the entire disclosure whereof is incorporated by reference herein. The metal nanoparticle compositions according to the present invention can be directly printed and heated to yield a bulk conductivity that may be no less than about 10 percent of the conductivity of the equivalent pure metal, and achieved by heating the printed features at temperatures below about 200° C. on polymer substrates such as plexiglass (PMMA).

Another aspect of the present invention comprises the production of an electronic circuit for making printed wiring board (PWBs) and printed circuit boards (PCBs). In conventional subtractive processes used to make printed-wiring boards, wiring patterns are formed by preparing pattern films. The pattern films are prepared by means of a laser plotter in accordance with wiring pattern data outputted from a CAD (computer-aided design system), and are etched on copper foil by using a resist ink or a dry film resist. In such conventional processes, it is necessary to first form a pattern film, and to prepare a printing plate in the case when a photo-resist ink is used, or to take the steps of lamination, exposure and development in the case when a dry film resist is used.

Such methods can be said to be methods in which the digitized wiring data are returned to an analog image-forming step. Screen-printing has a limited work size because of the printing precision of the printing plate. The dry film process is a photographic process and, although it provides high precision, it requires many steps, resulting in a high cost especially for the manufacture of small lots.

The metal nanoparticle compositions and methods of the present invention offer solutions to overcome the limitations of the current PWB formation process. For example, they do not generate any waste. The methods of the present invention may be a single step direct printing process and are compatible with small-batch and rapid turn around production runs.

For example, a copper nanoparticle composition can be directly printed onto FR4 (an epoxy resin impregnated fiberglass) to form interconnection circuitry. These features are formed by heating printed copper nanoparticles in an $N_2$ ambient at about 150° C. to form copper lines with a line width of not greater than about 100 μm, a line thickness of not greater than about 5 μm, and a bulk conductivity that is at least about 10 percent of the conductivity of the pure copper metal.

In another non-limiting example, Ag may be ink-jet printed on a PCB (printed circuit board) and used as a seed layer for Cu electroplating or electroless deposition of Cu. Ag may also be used to ink-jet print electrodes for embedded passives for PCBs.

Patterned electrodes obtained by one aspect of the present invention can also be used for screening electromagnetic radiation or earthing electric charges, in making touch screens, radio frequency identification tags, electrochromic windows and in imaging systems, e.g., silver halide photography or electrophotography. A device such as the electronic book described in U.S. Pat. No. 6,124,851, the entire disclosure whereof is incorporated by reference herein, can also be formed using the compositions of the present invention.

In addition, metal nanoparticles (e.g., silver nanoparticles) having a size of less than about 100 nm have outstanding optical characteristics in that they are perfectly reflective, i.e., do not diffract incident light, resulting in a perfect mirror finish on articles onto which they are applied. This is a valuable property for, e.g., graphic and mirror applications.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description making apparent to those skilled in the art how the several forms of the present invention may be embodied in practice.

The present invention is further illustrated with reference to an exemplary embodiment thereof wherein silver is the metal of the nanoparticles and polyvinylpyrrolidone is the anti-agglomeration substance.

Example 1

Preparation of Silver Nanoparticles Carrying PVP Thereon

In a mixing tank a solution of 1000 g of PVP (M.W. 10,000, Aldrich) in 2.5 L of ethylene glycol is prepared and heated to 120° C. In a second mixing tank, 125 g of silver nitrate is dissolved in 500 ml of ethylene glycol at 25° C. These two solutions are rapidly combined (within about 5 seconds) in a reactor, in which the combined solutions (immediately after combination at a temperature of about 114° C.) are stirred at 120° C. for about 1 hour. The resultant reaction mixture is allowed to cool to room temperature and about 0.25 L of ethylene glycol is added thereto to replace evaporated ethylene glycol. This mixture is stirred at high speed for about 30 minutes to resuspend any particles that have settled during the reaction. The resultant mixture is transferred to a mixing tank where 12 L of acetone and about 1 L of ethylene glycol are added. The resultant mixture is stirred thoroughly and then transferred to a centrifuge where it is centrifuged for about 20 minutes at 1,500 g to separate the silver nanoparticles from the liquid phase. This affords 70 g of nanoparticles which have PVP adsorbed thereon. The particles are subsequently suspended in 2,000 ml of ethanol to remove, inter alia, excess PVP, i.e., PVP that is not adsorbed on the nanoparticles but is present merely as a contaminant. At this point, the ethanol suspension of particles is preferably filtered through a 1.5 μm nylon filter, thus filtering out particles that are larger than 1.5 μm. The filtrate is subsequently centrifuged and the resulting cake is dried in a vacuum oven at about 35° C. and about 10-2 torr to afford dry nanoparticles. These nanoparticles exhibit a PVP content of about 4 to about 8 weight percent, depending on the time the nanoparticles have been in contact with the ethanol.

Alternatively, the ethanol suspension may be centrifuged without first filtering through a 1.5 μm nylon filter. The resultant filter cake of nanoparticles is dried in a vacuum oven at about 35° C. and about $10^{-2}$ torr to afford dry nanoparticles. These nanoparticles, like the particles obtained after filtering through a 1.5/lm filter, exhibit a P\1>'content of about 4 to about 8 weight percent, depending on the time the nanoparticles have been in contact with the ethanol.

ICP (inductively coupled plasma) data indicates that the longer the particles are in contact with the ethanol, the more of the acetone and ethylene glycol present in the PVP matrix is displaced by ethanol, resulting in particles with an increasingly higher silver content.

It is believed that several characteristics of the reagents that are used in the process described above may ultimately affect the particle size distribution (PSD) of the nanoparticles produced by the process. At least four such characteristics are the water content of the PVP, the 2-pyrrolidone content of the PVP (PVP inherently contains 2-pyrrolidone), the formic acid content of the PVP and the water content of the ethylene glycol used.

Although the reasons are not entirely clear at this time, it has been observed that the water content of the PVP may have an effect on the PSD of the nanoparticles produced by the process described above. PVP is a hygroscopic substance that typically has a residual amount of water contained therein. In some cases, the presence of water in the PVP leads to the production of nanoparticles with a desirable PSD. In other cases, however, when the water content in the PVP is reduced, the same result is observed. Thus, it is not entirely clear if it is preferable to have PVP where the residual water content has been reduced or PVP where the residual water content is not reduced. In one embodiment, the water content of the PVP is about 1-10% by weight, or about 1-8% by weight, or about 2-10% by weight or preferably about 2-7% by weight. The water content of the PVP may be reduced by heating the PVP at about 70-80° C. overnight (e.g., 8-14 hours). The PVP may optionally be stirred while it is heated. In addition, the heating may be optionally performed under an inert atmosphere (e.g., argon and nitrogen) or in vacuo.

Although the reasons are not entirely clear at this time, it has also been observed that the presence of 2-pyrrolidone in the PVP may have an effect on the PSD of the nanoparticles produced by the process described above. 2-pyrrolidone is a contaminant comprised in the PVP that results from the synthesis of PVP. In one embodiment, the 2-pyrrolidone content of the PVP is about 1-10% by weight, or about 1-8% by weight, or about 1-5% by weight or preferably about 5% by weight.

In addition, although the reasons are not entirely clear at this time, it has also been observed that the presence of formic acid in the PVP may have an effect on the PSD of the nanoparticles produced by the process described above. Formic acid is a contaminant that may be comprised in the PVP that results from the synthesis of PVP. In some cases, the presence of formic acid in the PVP leads to the production of nanoparticles with a desirable PSD. In other cases, however, when the formic acid content in the PVP is reduced, the same result is observed. Thus, it is not clear if it is preferable to have PVP where the formic acid content has been reduced or PVP where the formic acid content is not reduced. In one embodiment, the formic acid content of the PVP is about 0-2% by weight, or about 0-1% by weight, or about 0-0.8% by weight or preferably about 0.3% by weight. The formic acid content of the PVP may be reduced by heating the PVP at about 70-80° C. overnight (e.g., 8-14 hours). The PVP may optionally be stirred while it is heated. In addition, the heating may be optionally performed under an inert atmosphere (e.g., argon and nitrogen) or in vacuo.

Finally, although the reasons are not entirely clear at this time, it has also been observed that the presence of water in the ethylene glycol may have an effect on the PSD of the nanoparticles produced by the process described above. It is possible that some water must be present in the ethylene glycol in order to produce nanoparticles with a desirable PSD. Without being bound by any particular theory, it is possible that the presence of water content in ethylene glycol influences the equilibrium between ethylene glycol and its decomposition product, acetaldehyde, according to the reaction shown below:

$$HOCH_2CH_2OH \rightleftharpoons H_2O + H_3CC(O)H$$

Even though it is possible that it is produced in an extremely small quantity (i.e., the equilibrium favors ethylene glycol), the acetaldehyde produced, in turn, acts as a reducing agent for the silver nitrate, thereby effecting the reduction of silver ions in silver nitrate to silver metal. The silver metal, in turn, can precipitate out of the ethylene glycol solution prior to mixing the silver nitrate/ethylene glycol solution with the PVP/ethylene glycol solution. It is possible that the precipitation of silver metal in the silver nitrate/ethylene glycol solution, prior to mixing with the PVP/ethylene glycol solution, could lead to the production of nanoparticles once the solutions are mixed, where the nanoparticles have an undesirable PSD (e.g., a polydisperse powder fraction with an increased amount of large particles and agglomerates). In one embodiment, the water content of the ethylene glycol is about 0.01-0.10% by weight, or about 0.01-0.05% by weight, or about 0.01-0.04% by weight or preferably about 0.04% by weight.

Example 2

Effect of PVP Molecular Weight on Resistivity and Curing Temperature

Silver nanoparticles can be synthesized using 58,000 g/mol PVP using a process substantially the same as the process used to synthesize silver nanoparticles using 10,000 g/mol PVP by mixing a PVP/ethylene glycol solution with a silver nitrate/ethylene glycol solution. Once the reaction is complete, 250 mL of ethylene glycol is mixed into the reaction solution after cooling down. The resulting solution is equally divided into five 4-L Nalgene® bottles. 200 mL of ethylene glycol and 3 L of acetone are added to each plastic bottle. The bottles are sealed with lids and shaken up to create a black precipitate suspension in the solvent mixture. The suspensions are transferred to centrifuge bottles and centrifuged at 2,200 RPM for 10 minutes. The clear, light orange supernatants are discarded to leave behind a reflective, silver cake. More black suspension is added to the same bottles and the separation steps are repeated until all of the silver nanoparticles are caked in the bottom of the centrifuge bottles. 600 mL of ethanol are added to each centrifuge bottle to remove, inter alia, excess PVP. At this point, the ethanol suspension of particles is preferably filtered through a 1.5 μm nylon filter, thus filtering out particles that are larger than 1.5 μm. The filtrate is subsequently centrifuged and the resulting cake is dried in vacuo for 2-3 hours.

Alternatively, the ethanol suspension may be centrifuged without filtering through a 1.5 μm nylon filter. In this case, the bottles are centrifuged at 2,200 RPM overnight, and the clear, dark orange supernatants are discarded to leave behind a highly reflective, bluish-silver cake. The silver nanoparticles are then dried in vacuo for 2-3 hours to form gold-colored granules.

Silver nanoparticle inks are spin coated onto glass and tested to ascertain the electrical properties. Liquid crystal display (LCD) glass slides are cut into 2" squares and given 5 minutes of UV-Ozone treatment. This is followed by wiping the slides with a lint-free cloth wetted with acetone and then another lint-free cloth wetted by denatured ethanol. In succession, each slide is secured to a 2" vacuum chuck on the spin coater. The slide is spun at 500 RPM for 10 seconds while 0.8 mL of silver ink is dispensed using a micropipette, after which the slide is spun at 1,000 RPM for 20 seconds. After spin coating, slides are placed in a pre-heated Despatch oven set to either 100 or 120° C. for 60 minutes to cure the silver ink films. Then the silver-coated slides are removed and allowed to cool. Each slide is placed on the four-point probe station, and five resistance measurements are taken near the center of the silver films. After the measurements are taken, a 1-2 nm wide, 0.5-1 cm long scratch is made in the center of each film using a stainless steel scalpel. When making the scratch, enough pressure is applied to remove the ink layer but not enough to significantly scratch the glass substrate. Then the layer thickness is measured across five locations along the scratch, using the scratch as a reference, on the Zygo profilometer. Finally, the resistance and thickness measurements are used to calculate the resistivity for each silver film.

The electrical testing of six silver inks formulated from different silver nanoparticles made with the 10,000 g/mol PVP it was observed that the average resistivity of the samples cured at 100° C. is 101× bulk silver over a range of 22.1-234× bulk silver. For curing at 120° C., the average resistivity of the samples is 17.8× bulk silver over a range of 14.3-24.2× bulk silver. Unexpectedly, for the ink sample made with silver nanoparticles formed in the presence of 58,000 g/mol PVP, the average resistivity is 12.8× bulk silver when cured at 100° C. and 7.20× bulk silver when cured at 120° C. It is evident from the data given above that, relative to inks that employ 10,000 g/mol PVP, the ink that employs 58,000 g/mol PVP results in superior electrical performance at a relatively low curing temperature. The ability of achieving such superior electrical performance at relatively low curing temperatures with inks comprising 58,000 g/mol PVP facilitates printing such inks on flexible substrates.

Example 3

Preparation and Testing of Composition for Ink-Jet Printing

Silver nanoparticles prepared according to the process described in Example 1 (ranging from about 30 nm to about 50 nm in size) are suspended in a solvent mixture composed of, in weight percent based on the total weight of the solvent mixture, 40% of ethylene glycol, 35% of ethanol and 25% of glycerol to produce an ink for ink-jet printing. The concentration of the silver particles in the ink is 20% by weight.

The ink had the following properties:

| | |
|---|---|
| Viscosity* (22° C.) | 14.4 cP |
| Surface tension** (25° C.) | 31 dynes/cm |
| Density | 1.24 g/cc |

*measured at 100 rpm with a Brookfield DVII+ viscometer (spindle no. 18)
**measured with a KSV Sigma 703 digital tensiometer with a standard Du Nouy ring method The ink is chemically stable for 6 months, some sedimentation occurring after 7 days at room temperature.

Printing and Properties of Printed Features

A Spectra SE 128 head (a commercial piezo ink-jet head) is loaded with the ink of Example 3 and the following optimized printing parameters are established:

| Optimized Jetting Parameters (at 22-23° C.): | | |
|---|---|---|
| Pulse Voltage | 120 | Volts |
| Pulse Frequency | 500 | Hz (for up to one 1 hour of continuous operation) |
| Pulse Rise Time | 2.5 | μs |
| Pulse Width | 12.0 | μs |
| Pulse Fall Time | 2.5 | μs |
| Meniscus Vacuum | 3.0 | inches of water |
| Performance Summary: | | |
| Drop Size | 39 | μm (calculated volume 31 pL) |
| Drop Velocity | 0.33 | m/s |
| Spot Size (average) | 70 | μm (on Kapton ®; measured using optical microscope) |

The deposited ink can be rendered conductive after curing in air at temperatures as low as 100° C. The ink exhibits a high metal yield, allowing single pass printing.

Using the above optimized jetting parameters, the ink of Example 3 is deposited in a single pass with a Spectra SE 128 head on a Kapton® substrate and on a glass substrate to print a line. The line has a maximum width of about 140 μm (Kapton®) and about 160 μm (glass) and a parabolic cross-section. The thickness of the line at the edges averages about 275 nm (Kapton®) and about 240 nm (glass) and the maximum height of the line is about 390 nm (Kapton® and glass). The differences between Kapton® and glass reflect the different wetting behavior of the ink on these two types of substrate materials.

Single pass printing with the ink of Example 3 affords a sheet resistivity of from about 0.1 to about 0.5 Ω/sq. The printed material shows a bulk resistivity in the fully sintered state of from about 4 to about 5 μΩ·cm (about 2.5-3 times the bulk resistivity of silver).

The polymer (polyvinylpyrrolidone (PVP)) on the surface of the silver nanoparticles allows the sintering of a deposited ink at very low temperatures, e.g., in the range of from about 100° C. to about 150° C. The PVP does not volatilize or significantly decompose at these low temperatures. Without wishing to be bound by any theory, it is believed that at these low temperatures the polymer moves out of the way, allowing the cores of the nanoparticles to come into direct contact and sinter together (necking). In comparison to its anti-agglomeration effect in the printing ink prior to printing, the polymer in the deposited and heat-treated ink assumes a new function, i.e., it promotes the adhesion of the printed material to a range of polymeric substrates such as, e.g., FR4 (fiberglass-epoxyresin) and Mylar® (polyethylene terephthalate) and provides structural strength. As a result of the low-temperature sintering mechanism a continuous percolation network is formed that provides continuous channels for the conduction of electrons to flow throughout the material without obstacles. This is fundamentally different from the traditional polymer thick film approach, where electrical conductivity is established during thermal curing as a result of polymer matrix shrinkage, inducing compressive stress on the flake particles and causing a reduction in their large contact resistance.

When higher-temperature sintering is performed (at about 300° C. to about 550° C.), the polymer volatilizes. As a result, sintering will occur and in comparison to low-temperature sintering a much denser metal material is formed. This leads to a better conductivity (close to the conductivity of the bulk metal), better adhesion to substrates such as glass, and better structural integrity and/or scratch resistance.

In the low temperature sintering range (from about 100° C. to about 150° C.), the present ink can advantageously be employed for applications such as, e.g., printed RFID antennas and tags, digitally printed circuit boards, smart packages, "disposable electronics" printed on plastics or paper stock, etc. In the medium temperature range (from about 150° C. to about 300° C.) the ink may, for example, be used for printing interconnects for applications in printed logic and printed active matrix back panes for applications such as polymer electronics, OLED displays, AMLCD technology, etc. In the high temperature range (from about 300° C. to about 550° C.) its good performance and adhesion to glass make it useful for printed display applications such as, e.g., plasma display panels.

Electric Performance

After the ink is printed on the substrate, it needs to be treated thermally and/or by irradiation to yield the desired electrical performance, adhesion and abrasion resistance. This treatment can be accomplished in a variety of ways such as hot plate, convection oven, infrared radiation, laser radiation, UV exposure, etc.

As a general rule, the resistivity of a printed feature will drop with curing temperature and curing time. The detailed time-temperature profile may also playa role. For example, drying the ink at a temperature of not higher than about 80° C., e.g., not higher than about 70° C., or not higher than about 60° C. before heating it to a temperature of at least about 100° C., e.g., at least about 110° C., or at least about 120° C. may result in a feature with lower conductivity than that of a line that was immediately heated to a temperature of at least about 100° C., e.g., at least about 110° C., or at least about 120° C. without allowing it to dry first.

The peak curing temperature and the curing time are main factors that determine the ultimate performance of a feature made from an ink of the present invention. In addition, secondary parameters such as heating profile (ramp rate, drying prior to curing), substrate type (coated paper, PET, glass etc.), curing ambient and heating method (oven, laser, IR etc.) may also play a role.

In one experiment, a line was printed on a Kapton® substrate using the ink of Example 3 under ambient conditions and then immediately transferred to an oven at a predetermined temperature without drying the ink. At oven temperatures above about 200° C. high conductivity could be achieved after very short curing times. For example, a 60 second cure at an oven temperature of 300° C. yielded a printed silver line exhibiting a bulk resistivity of 3.8 $\mu\Omega$cm. After 60 seconds at 250° C. and after about 15 minutes at 200° C. the resistivity was about 10 $\mu\Omega$cm. After about 60 minutes at 150° C. a resistivity of about 13 $\mu\Omega$cm was obtained and remained substantially constant thereafter. From an extrapolation of the obtained data it is expected that in the temperature range from about 350° C. to about 400° C. a full curing can be accomplished in less than 10 seconds, which will enable curing processes such as in-line RTP (rapid thermal processing), and the associated reduction in tact time in a manufacturing process.

In this regard, it is to be noted that using the bulk resistivity value of a printed silver conductor and comparing it to the bulk resistivity of a fully dense silver object of the same geometry (length, width and layer thickness) does not usually provide a reliable indication of the actual conductivity of the printed metal. This applies particularly to low curing temperatures (e.g., below about 150° C.). In these cases, the final deposit has a significant amount of residual porosity and contains a significant amount of polymer. For example, the actual metal content may be less than 50 weight percent. Conductivity in these materials is accomplished through necking of the Ag particles which results in an efficient percolation network. It is therefore more straightforward to compare the sheet resistivities (expressed as $\Omega$/sq) of a printed feature and a fully dense feature that has the same silver content per unit area as the printed feature.

Adhesion to the Substrate

The silver nanoparticles of the composition of Example 3 carry polymer (PVP) on the surfaces thereof. This polymer may provide improved structural integrity of a printed feature on a variety of substrates when curing is carried omit at relatively low temperatures (e.g., at temperatures of from about 100° C. to about 250° C.). As set forth above, since at these temperatures the polymer will not volatilize/decompose, it is believed that the polymer merely rearranges to allow the metal cores of the particles to come into contact with each other and sinter together. In this case, the polymer can serve as adhesion promoter between the silver particles and the substrate. In addition, the polymer may provide additional cohesive strength between individual particles.

A stringent adhesion test according to ASTM D3359-02 was performed to evaluate the adhesion performance of the silver ink on a variety of substrates as a function of the curing temperature. In this test, adhesion is rated on a scale from 0 (poor) to 5 (good) based on the percentage of flaking from a cross-cut area. Using a sharp blade, horizontal and vertical lines are made with 1 mm spacing. Scotch adhesive tape is applied under pressure and peeled off under an angle of 180°. The results obtained were as follows:

On an FR4 substrate the adhesion was rated almost 4 in the curing temperature range of from 100° C. to 175° C.

On a Mylar® substrate the adhesion was between about 2 and 3.5 in the curing temperature range of from 100° C. to 175° C. On a Kapton® substrate the adhesion was about 1.5 at curing temperatures of 200° C. and 250° C. On an ITO substrate the adhesion was between about 1.5 and about 4.5 in the curing temperature range of from 350° C. to 550° C. On a glass substrate the adhesion was between about 1 and about 2 in the curing temperature range of from 350° C. to 550° C. An addition to the ink of bismuth nitrate in a weight ratio of Ag:Bi of about 12:1 afforded an adhesion rating on glass between about 3 and about 4 in the temperature range of from 100° C. to 550° C.

Example 4

Conductivity Testing of Compositions on Various Paper Substrates

It was found that the Ag ink composition of Example 3 yields ink-jet printed lines on Epson Gloss IJ ink-jet paper that exhibit an electric resistance after annealing at 100° C. which is comparable to that of the same ink printed on Kapton and annealed at 200° C.

In one set of tests, the following experiments were carried out:

An aqueous silver ink was jetted onto glossy IJ photo paper (Canon), producing three groups of 4 lines; 1 set as single pass, 1 set as double pass, and 1 set as triple pass. All three sets were annealed on a hot plate set to 200° C. for 30 minutes. After the anneal, the lines were tested for electrical conductivity; all lines failed to exhibit conductivity.

The solvent-based Ag ink of Example 3' was printed on EPSON 5041286 Gloss photo paper to produce samples for comparison testing with a commercially available Ag ink sample (Nippon Paint) printed on Cannon gloss paper (model not known). Two samples were printed, 1 coupon with a single print pass and 1 coupon with a double print pass.

The double pass print was annealed at 100° C. for 60 minutes.

The commercial Ag ink sample was cured at 100° C. for 60 minutes.

The single pass print was annealed at 100° C. for 110 minutes.

Both samples produced with the ink of Example 3 exhibited very good conductivity, comparable to the same silver ink: printed on Kapton, and annealed at 200° C. for 30 minutes.

The commercially available ink yielded a conductivity much worse than that of the ink samples according to the present invention.

The ink of Example 3 was printed on four different substrates: (a) Kapton HN-300, (b) Hammermill 05502-0 gloss color copy paper, (c) Canon Bubblejet Gloss Photo Paper GP-301 and (d) Epson Gloss Photo Paper for ink-jet S041286.

The results listed in Table 5 confirm the superior performance of the Example 3 ink/Epson paper combination.

TABLE 5

Example 3 Results

| Ink | Substrate | Cure Temp/Time | Approx. Resistivity ($\mu\Omega$ * cm)[1] | pH of Substrate[3] |
|---|---|---|---|---|
| Example 3 | Kapton | 200° C./30 min | 21 | N/A |
| Example 3 | Kapton | 100° C./60 min | 180 | N/A |
| Example 3 | Epson Photo Paper | 100° C./60 min | 16 | 4-5 |
| Example 3 | Xerox High Gloss | 100° C./60 min | No Conductivity | N/A |
| Example 3 | Canon Photo Paper | 100° C./60 min | 525 | 6.5-7 |
| Commercial | Canon Photo Paper | 100° C./60 min | 5400[2] | 6.5-7 |
| N/A | HP Premium satin Gloss | N/A | N/A | 5.0 |
| N/A | HP Premium Gloss | N/A | N/A | 5.0 |
| N/A | Kodak Premium Gloss | N/A | N/A | 5.5 |
| N/A | Kodak Ultima | N/A | N/A | 5.0-5.5 |
| N/A | Canon PP101 | N/A | N/A | 6.5 |
| N/A | Canon PR101 | N/A | N/A | 6.5-7.0 |
| N/A | Fuji | N/A | N/A | 7.0 |

[1]assuming 1-micron line thickness
[2]average based on fewer measurements than ink of Example 3
[3]pH of the substrate determined using solution indicator kit: VWR VW 5704-1 Universal Indicator solution (isopropanol 50% (v/v), NaOH, $H_2O$).

The results shown in Table 5 suggest that it is possible that the pH of the substrate may have an effect on the resistivity of the inks printed thereon. It is contemplated that an ink that is printed on an acidic substrate will have a lower resistivity than an ink printed on a relatively more basic substrate (compare Example 3 ink printed on Epson photo paper versus the same ink printed on Canon photo paper).

It is known that Canon photo paper is coated with basic alumina, while Epson photo paper is coated with silica. See, e.g., Blum, A. E. and Eberl, E. E., *Clays and Clay Minerals* 52: 589-602 (2004), the contents of which are incorporated herein by reference in their entirety. Other coatings, e.g., alumina doped silica, are also known in the art. See, e.g., European Patent Application EP0995718, the contents of which are incorporated herein by reference in their entirety. It is possible that the silica coating on the Epson paper imparts acidic properties in the paper. Likewise, it is possible that the alumina coating on the Canon paper imparts less acidic properties in that paper.

The reasons for the apparent effect of substrate pH on the resistivity of the ink printed thereon are not entirely clear at this time. It is possible that, in addition to the substrate pH, other substrate characteristics, alone, or in conjunction with the presence of certain materials found in the ink formulation, may be the actual factors that cause inks printed on certain substrates to have lower resistivities than when they are printed on other substrates. Such characteristics may include the nature of coatings on the substrate and substrate porosity.

As mentioned above, Epson paper is coated with silica, while the Canon paper is coated with basic alumina. Without being bound by any particular theory, it is possible that the PVP on the nanoparticles adsorbs to some extent on the silica coating on the Epson paper, thereby exposing the silver nanoparticle surface. Adsorption of the PVP on silica may be expected, since it is known that silica has a high affinity for PVP. See, e.g., Blum, A. E. and Eberl, E. E., *Clays and Clay Minerals* 52: 589-602 (2004), the contents of which are incorporated herein by reference in their entirety. When the ink is subsequently cured, the exposed silver nanoparticles may be in closer contact with one another and may sinter to form a network with decreased resistivity.

It is also possible that the substrate porosity may lead to inks with decreased resistivity upon curing. Without being bound by any particular theory, it is possible that the substrate porosity, in conjunction with the presence of plasticizing agents (e.g., glycerol) in the ink formulation may be aiding in the adsorption of PVP on the substrate, thereby exposing the silver of the nanoparticles. Without being bound by any particular theory, it is possible that plasticizing agents sufficiently soften PVP such that the PVP can migrate onto the substrate and away from the silver nanoparticles. When the ink is subsequently cured, the exposed silver nanoparticles may be in closer contact with one another and may sinter to form a network with decreased resistivity.

Example 5

Aqueous Ink Formulation

An ink-jet printable ink is prepared by combining 16 parts by weight of silver nanoparticles similar to those prepared in Example 1, 42 parts by weight of ethylene glycol and 42 parts by weight of water. The ink shows the following properties;

| | |
|---|---|
| Viscosity (25° C.) | 3.9 cPs |
| Surface Tension (20° C.) | 58.3 dynes/cm |
| Density (RT) | 1.2 g/cm³ |

It is noted that the foregoing examples have been provided merely for the purpose of explanation and are in no way to be construed as limiting of the present invention. While the present invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claim.

What is claimed is:

1. A composition for the fabrication of an electrically conductive feature, wherein the composition comprises:
    metal nanoparticles which carry thereon a polymer for substantially preventing an agglomeration of the nanoparticles, wherein the nanoparticles exhibit a metal-polymer weight ratio of 100:1 to 10:1; and
    a vehicle for forming a dispersion with the metal nanoparticles, the composition being suitable for the fabrication of an electrically conductive feature by using a direct-write tool.

2. The composition of claim 1, wherein the nanoparticles comprise at least one of silver, gold, copper, nickel, rhodium, palladium and platinum.

3. The composition of claim 1, wherein the nanoparticles comprise silver.

4. The composition of claim 1, wherein at least about 90% of the nanoparticles are of substantially spherical shape.

5. The composition of claim 1, wherein the nanoparticles exhibit a metal-polymer weight ratio of 30:1 to 15:1.

6. The composition of claim 1, wherein at least about 80% of the nanoparticles have a particle size in the range of from about 10 nm to about 70 nm.

7. The composition of claim 1, wherein the composition further comprises an adhesion promoter.

8. The composition of claim 1, wherein the composition comprises at least about 20 weight percent of the nanoparticles.

9. The composition of claim 1, wherein the composition further comprises bismuth.

10. The composition of claim 1, wherein the nanoparticles exhibit a metal-polymer weight ratio of 100:1 to 15:1.

11. The composition of claim 10, wherein the polymer comprises units of a monomer which comprises at least one heteroatom selected from O and N.

12. The composition of claim 10, wherein the polymer comprises units of a monomer which comprises one or more of a hydroxyl group, a carbonyl group, an ether group and an amino group.

13. The composition of claim 10, wherein the polymer comprises units of at least one monomer which comprises a structural element selected from —COO—, —O—CO—O—, —C—O—C—, —CO—O—CO—, —CONR—, —NR—CO—O—, —NR$^1$—CO—NR$^2$—, —CO—NR—CO—, —SO$_2$—NR— and —SO$_2$—O—, wherein R, R$^1$ and R$^2$ each independently represent hydrogen or an organic radical.

14. The composition of claim 10, wherein the polymer comprises a polymer of vinyl pyrrolidone.

15. The composition of claim 14, wherein the polymer of vinyl pyrrolidone comprises a homopolymer.

16. The composition of claim 1, wherein the nanoparticles exhibit a polymer content of about 4 to about 8 weight percent.

17. The composition of claim 1, wherein the vehicle comprises from 35% to 45% by weight of ethylene glycol, from 30% to 40% by weight of ethanol and from 20% to 30% by weight of glycerol, based on total weight of the vehicle.

18. The composition of claim 1, wherein the vehicle comprises at least one of water, ethylene glycol, ethanol, methanol, and glycerol.

19. The composition of claim 18, wherein the composition comprises the metallic nanoparticles in an amount greater than about 50 weight percent, based on the total weight of the composition.

20. The composition of claim 19, wherein the composition comprises the metallic nanoparticles in an amount greater than about 60 weight percent, based on the total weight of the composition.

* * * * *